Inventors:
Harold W. Gegenheimer
Carl O. Siebke
by Furman Rinehart
Att'y

Inventors:
Harold W. Gegenheimer
Carl O. Siebke
by Furman Rinehart
Att'y

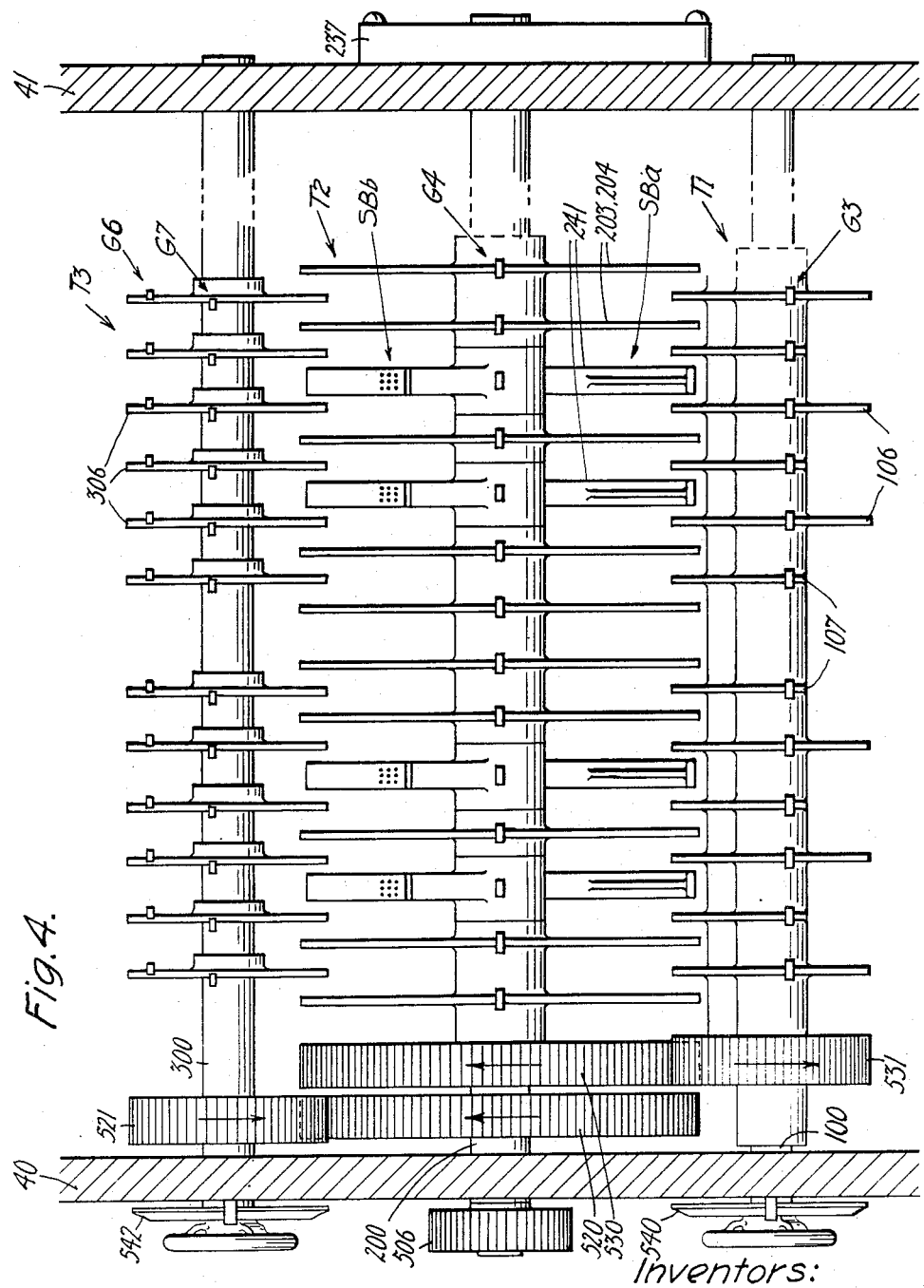

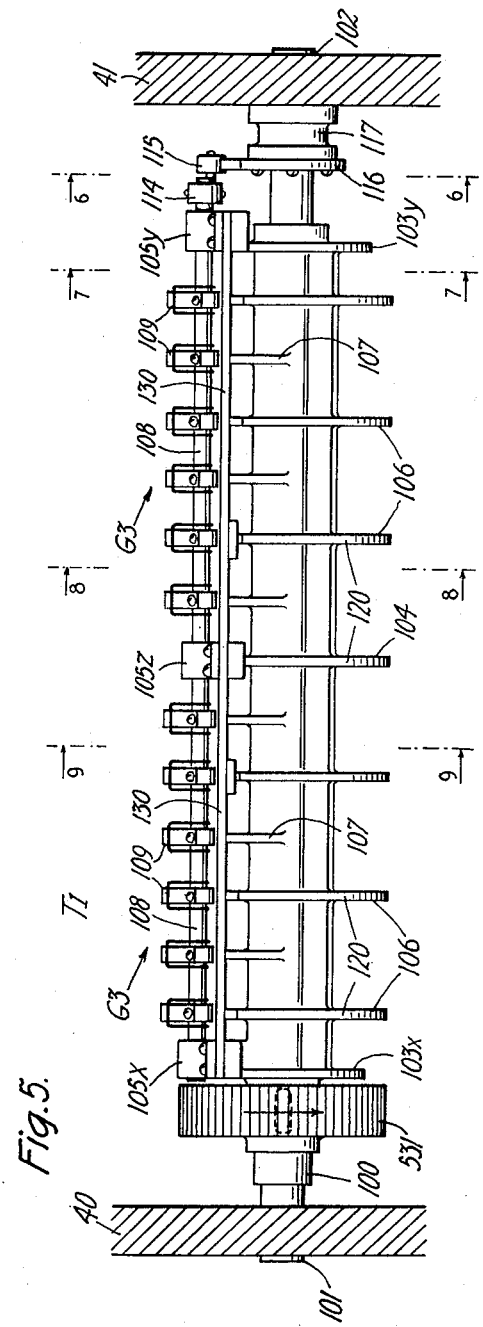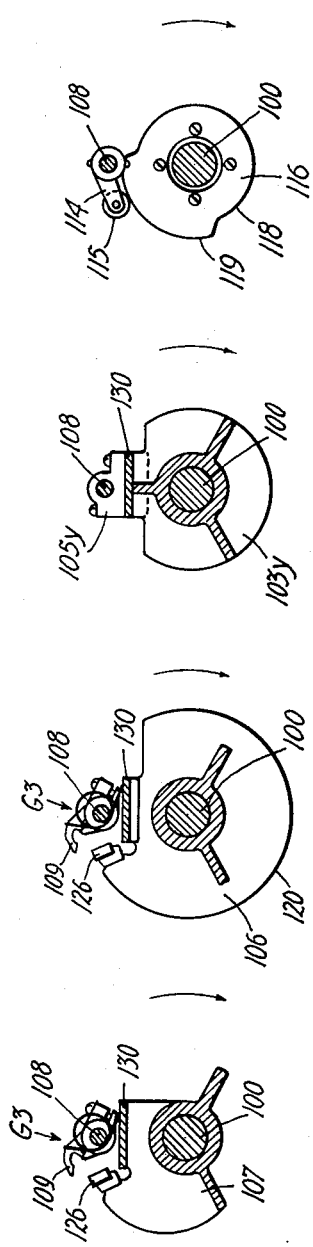

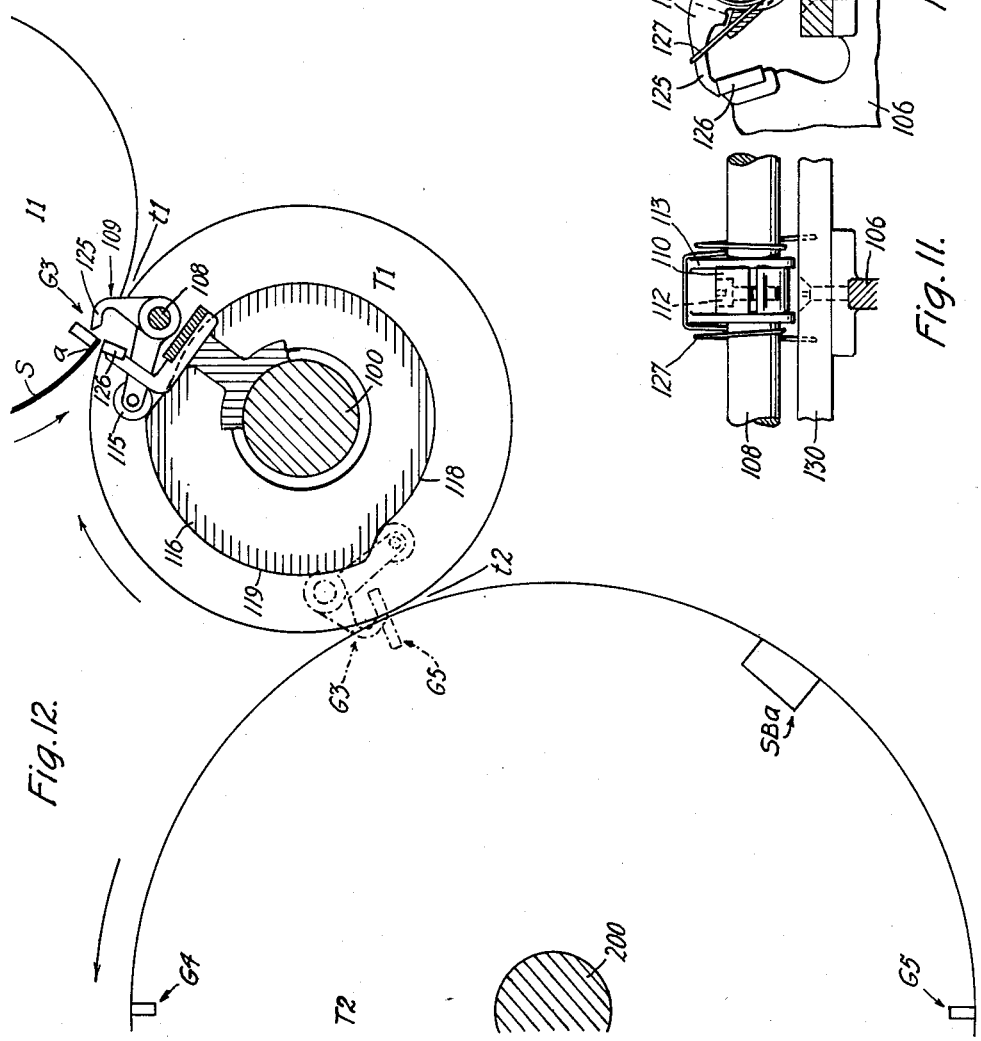

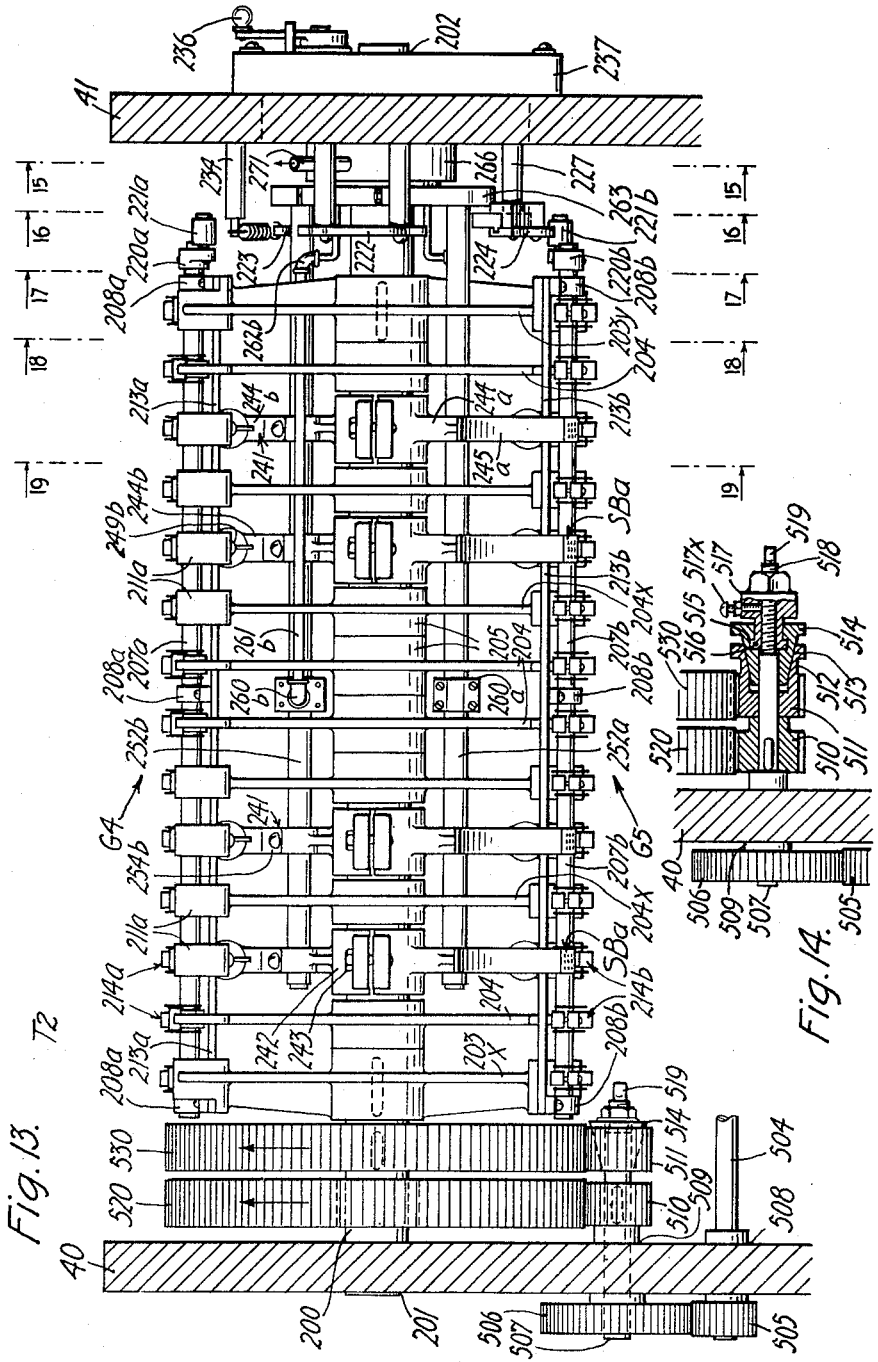

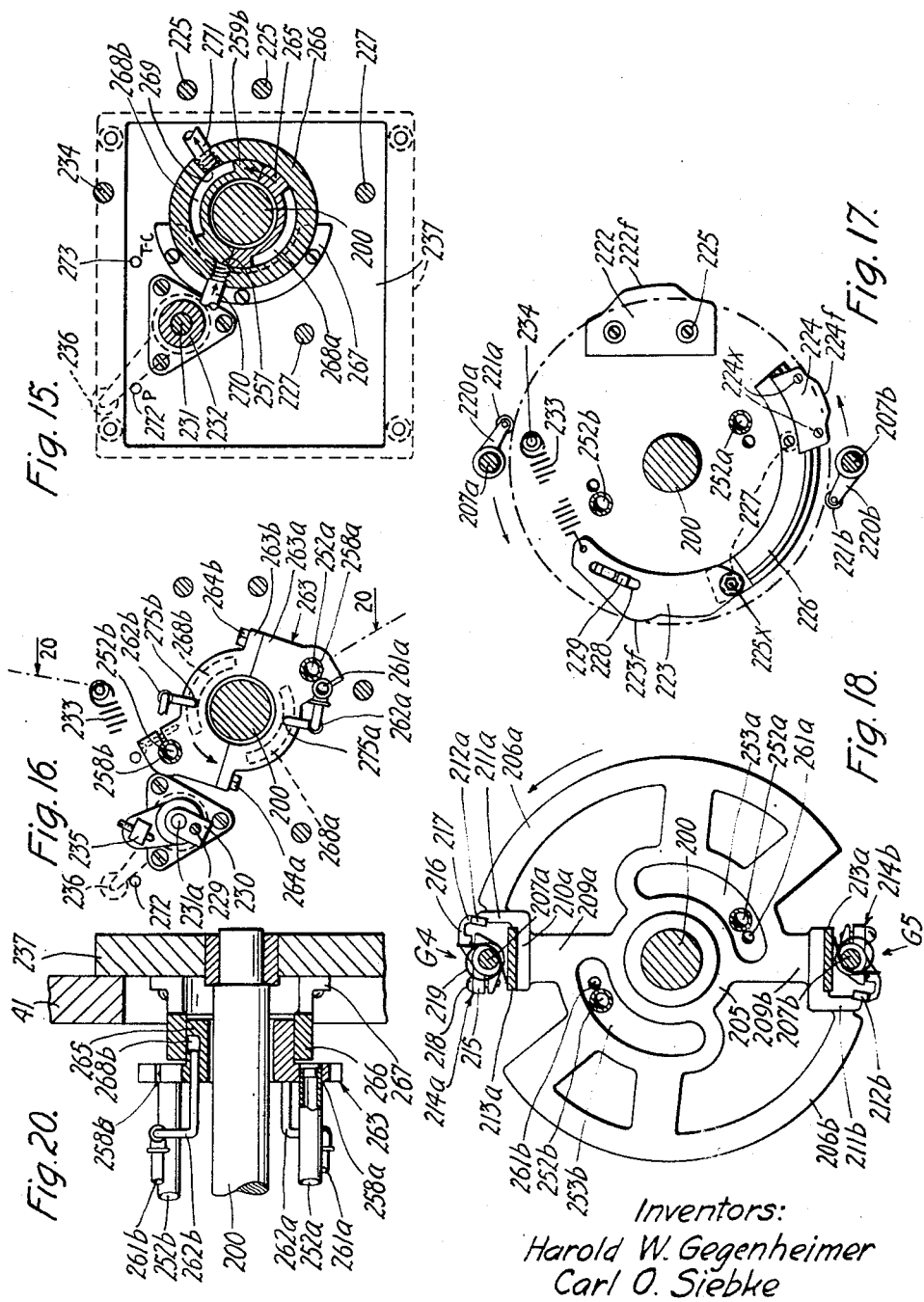

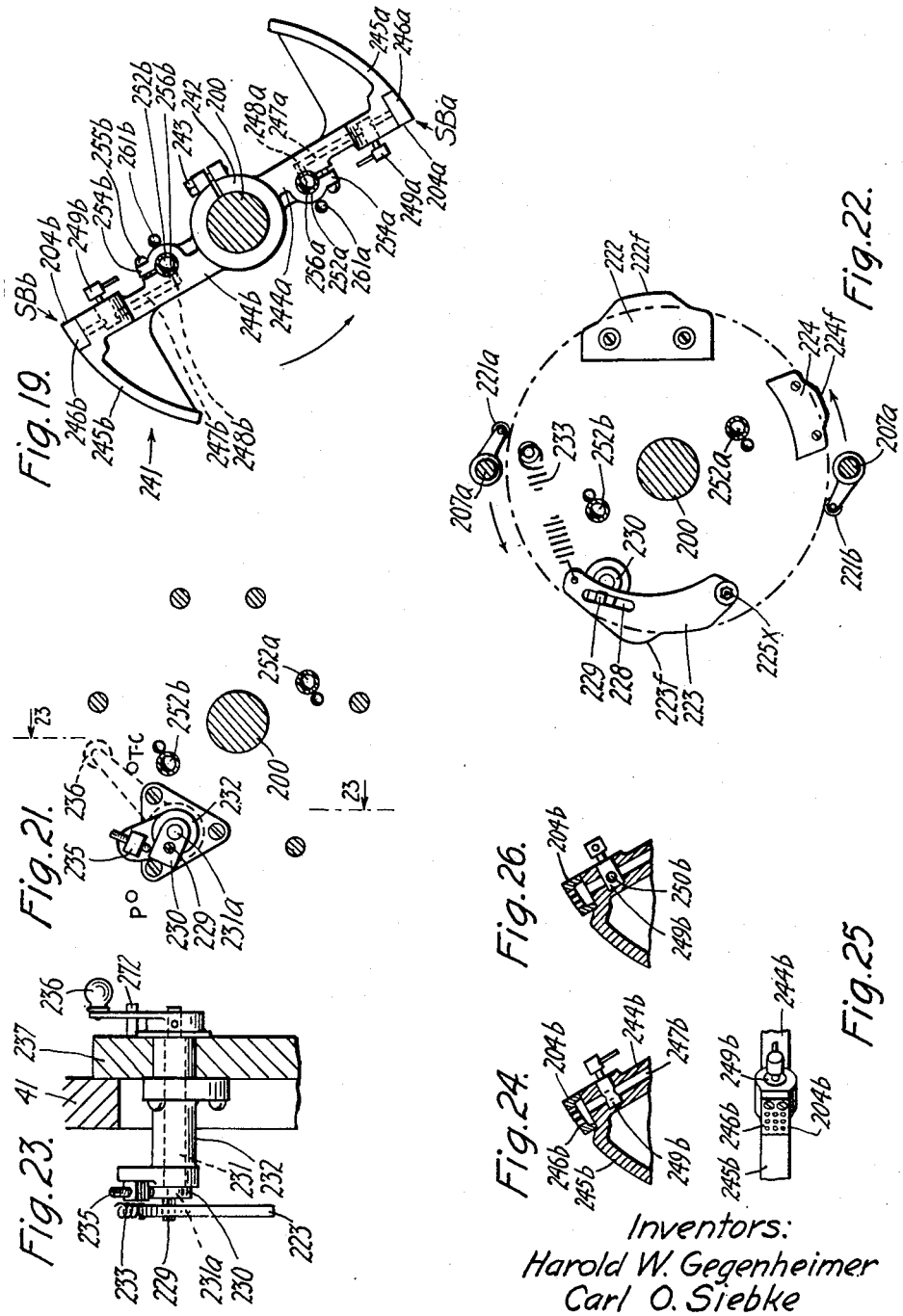

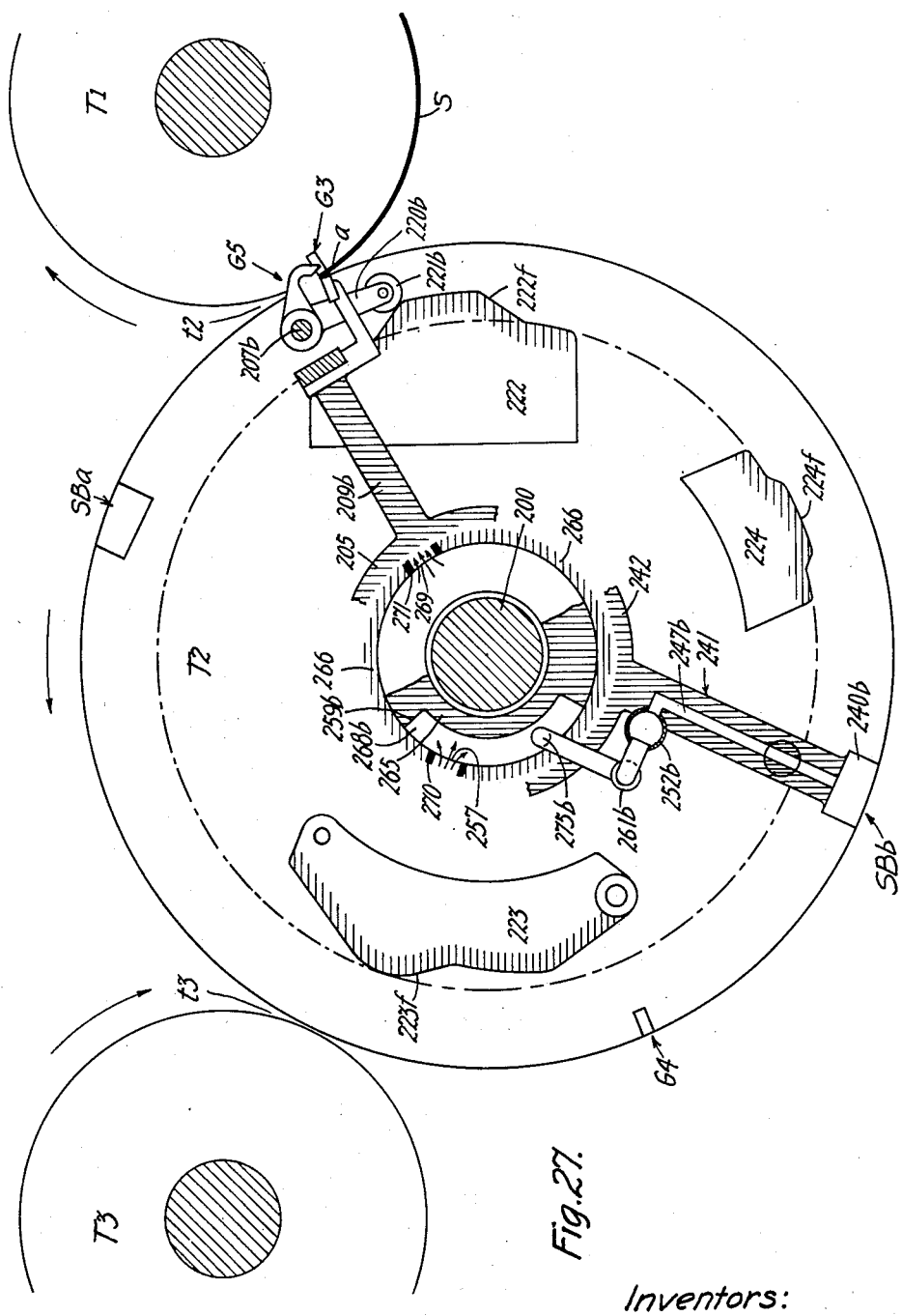

Inventors:
Harold W. Gegenheimer
Carl O. Siebke

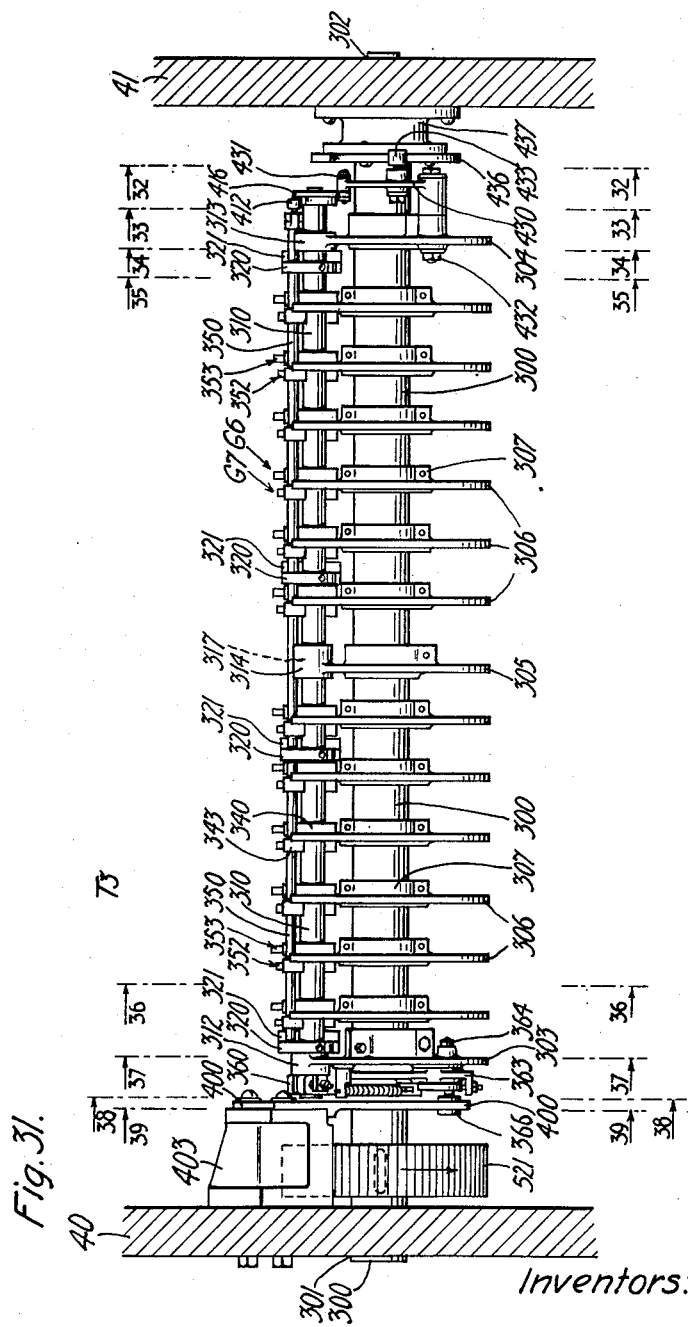

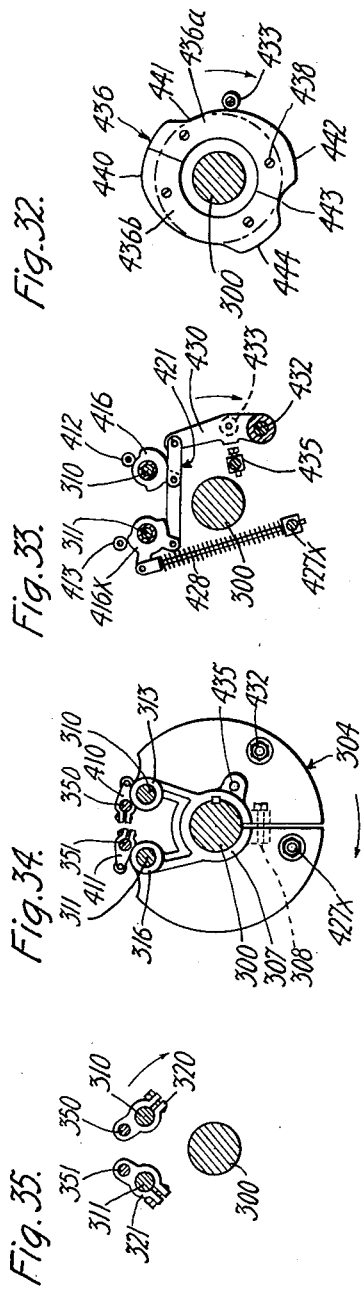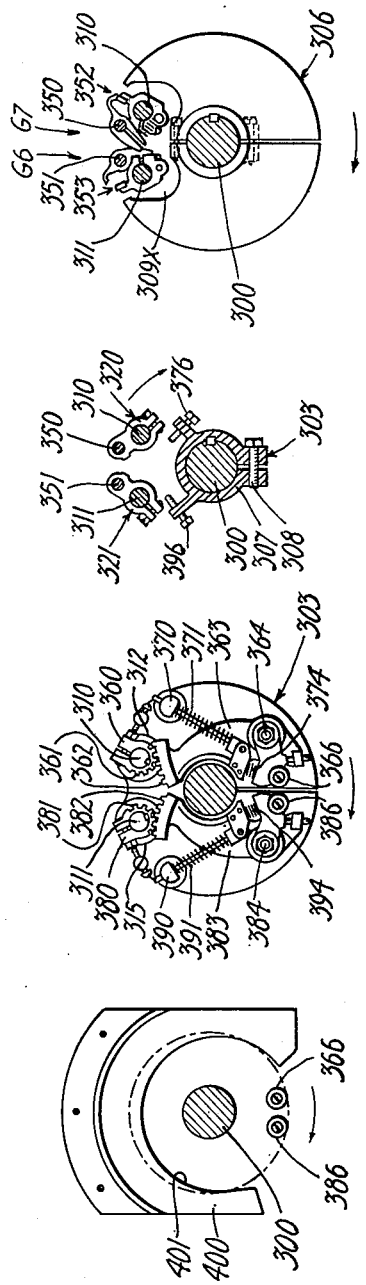

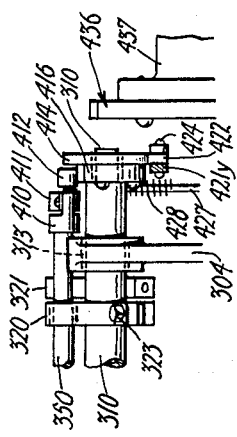

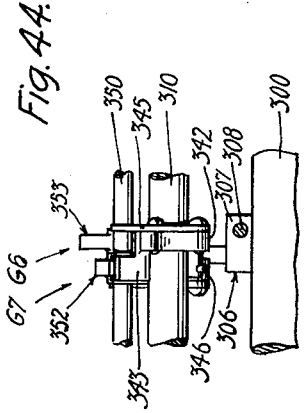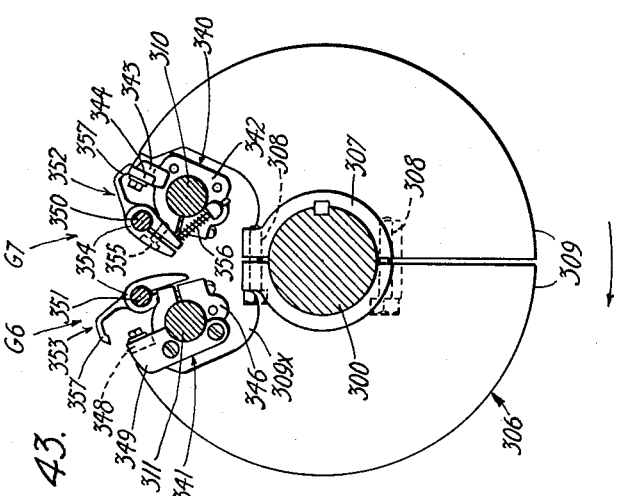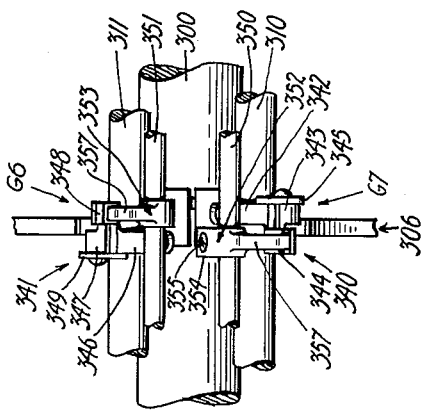

Inventors:
Harold W. Gegenheimer
Carl O. Siebke

Aug. 7, 1956     H. W. GEGENHEIMER ET AL     2,757,610
SHEET HANDLING MECHANISM AND METHOD
FOR MULTI-COLOR PERFECTOR PRESS
Filed March 18, 1952     26 Sheets-Sheet 19
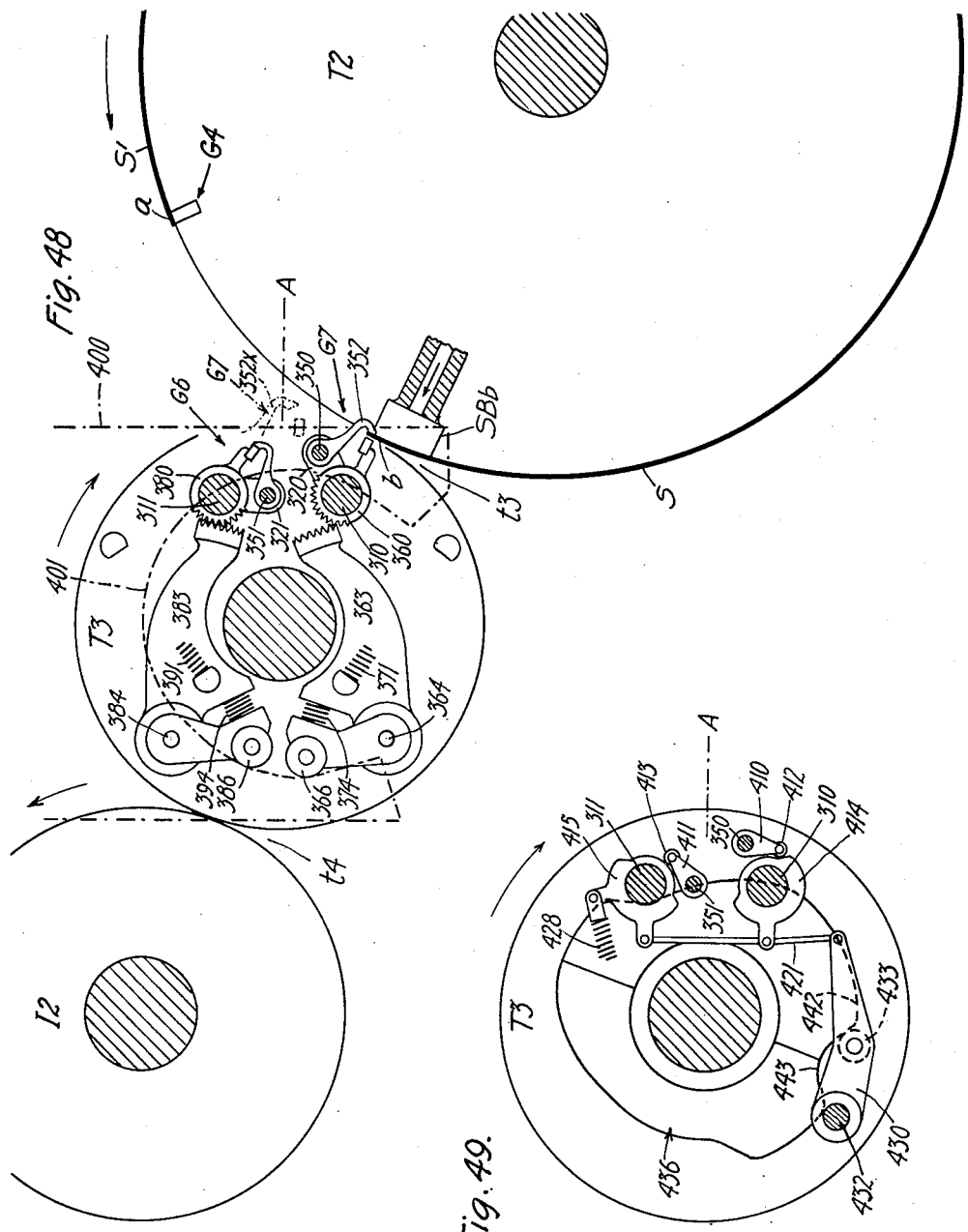
Inventors:
Harold W. Gegenheimer
Carl O. Siebke
by Furman Rinehart
Att'y.

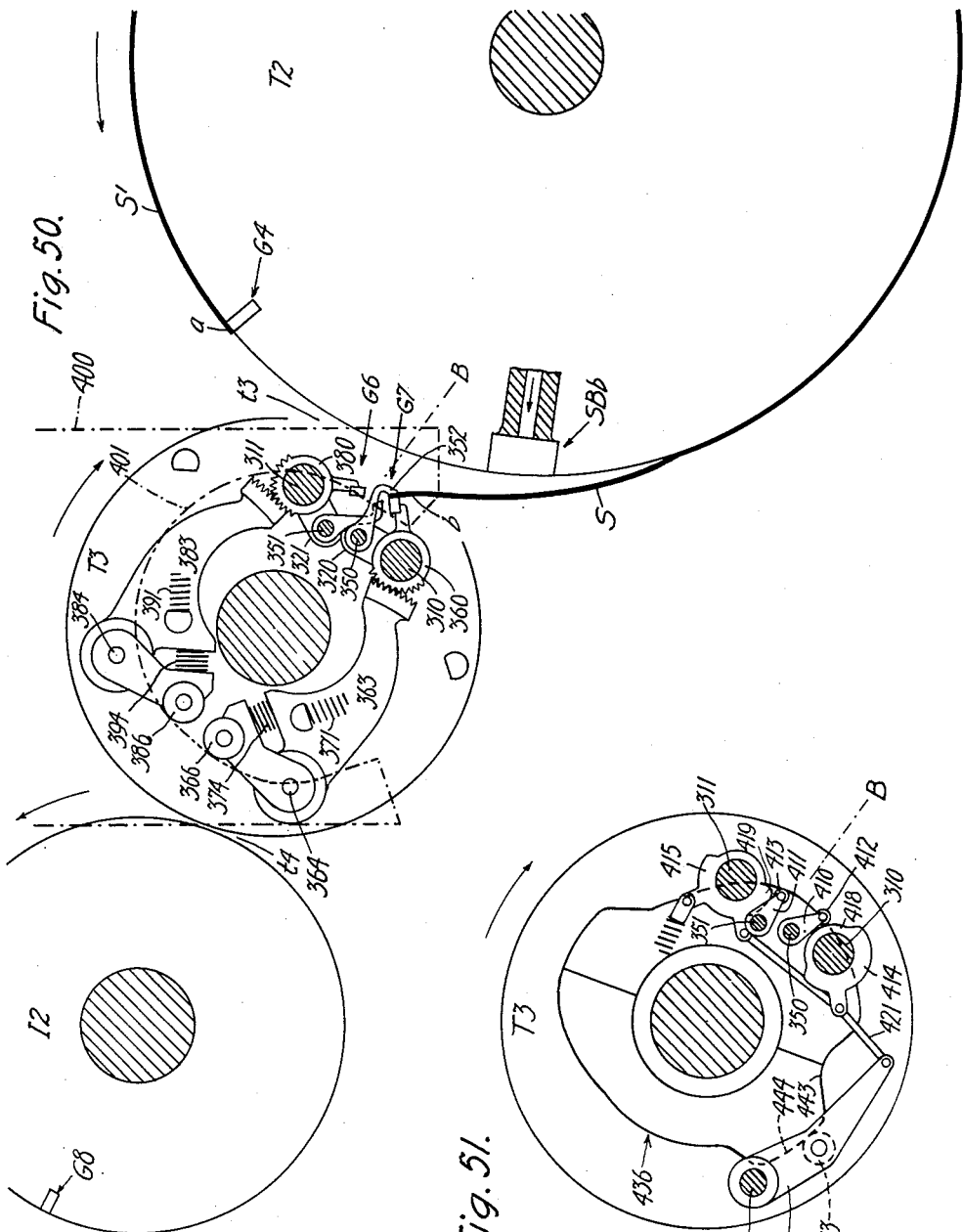

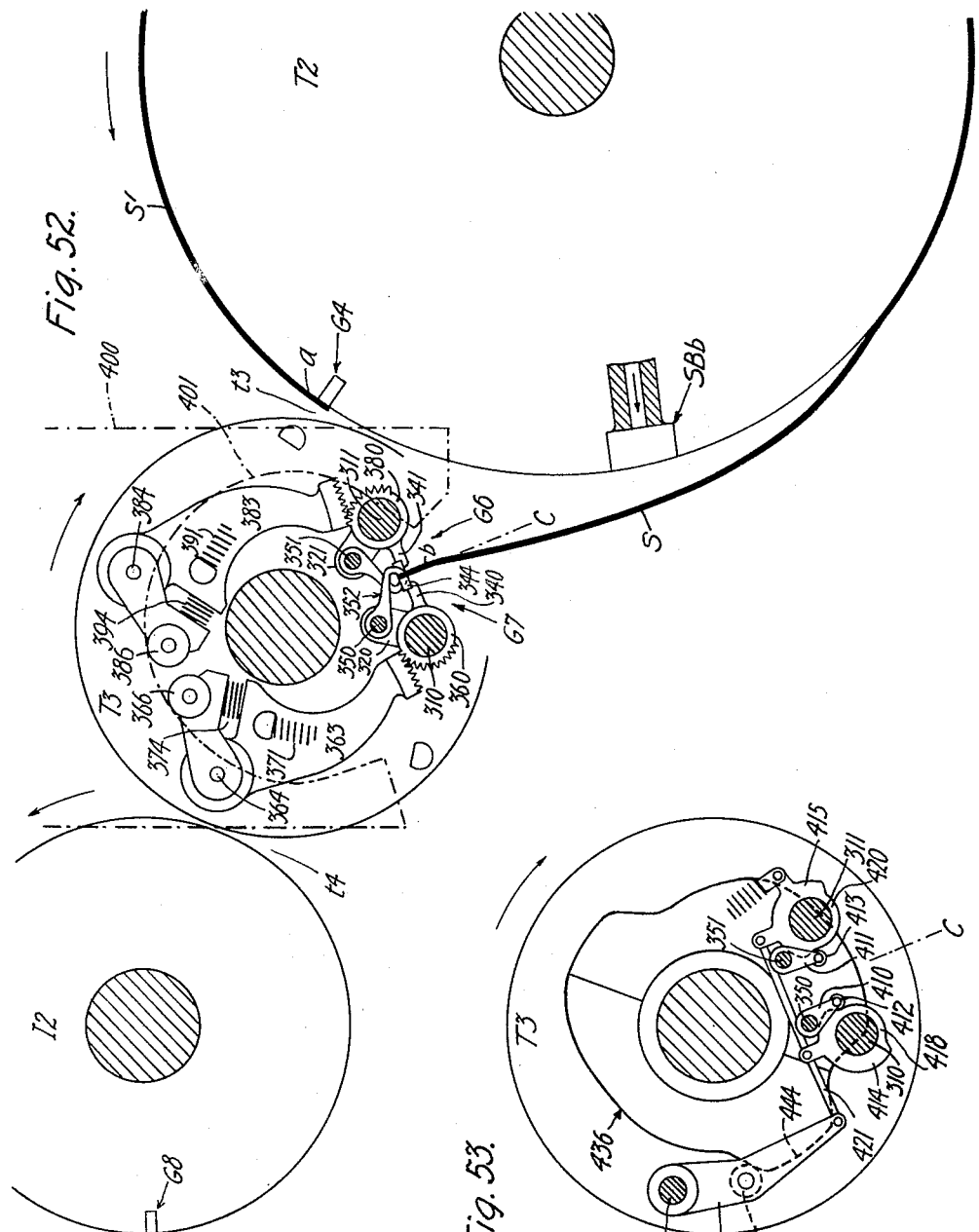

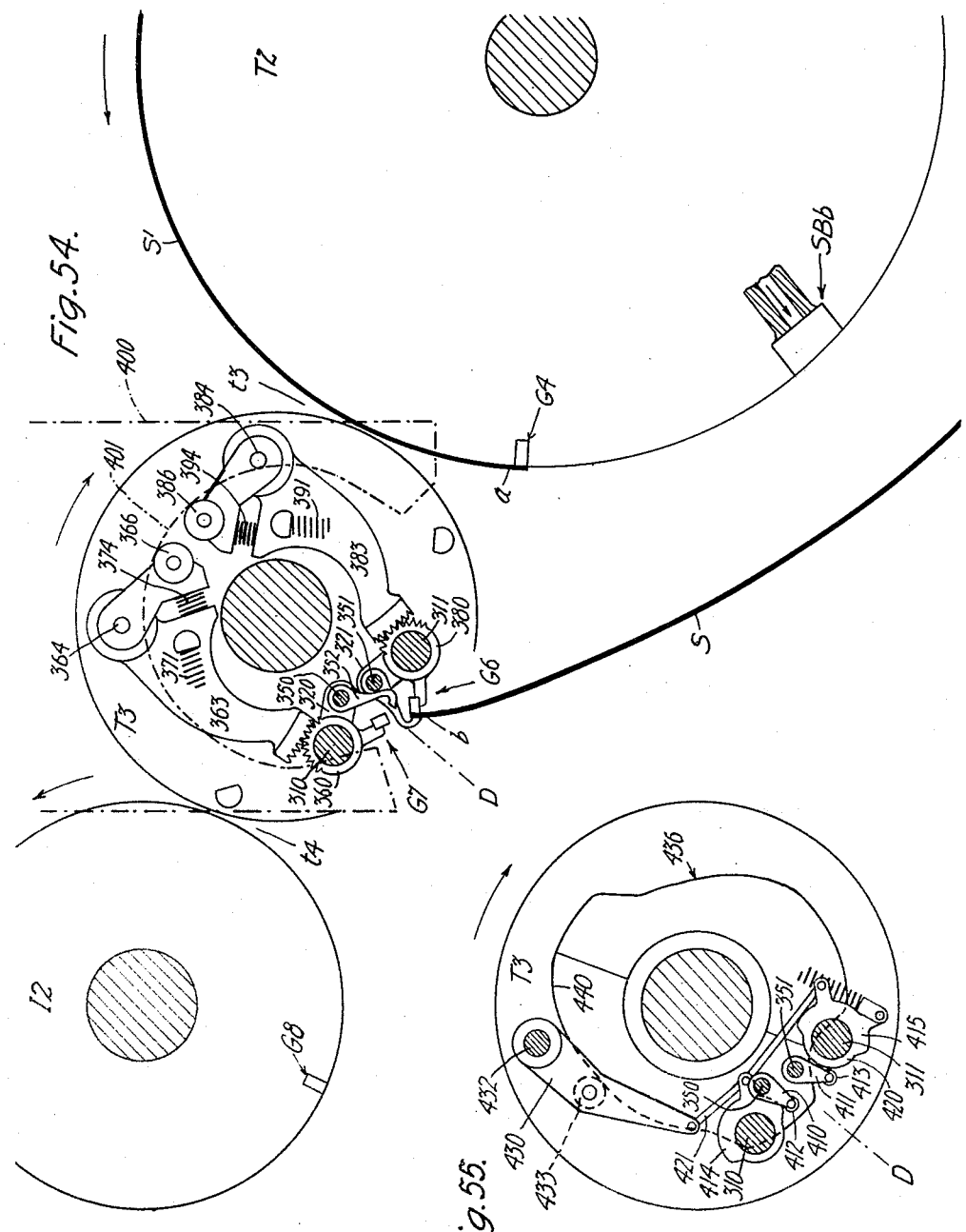

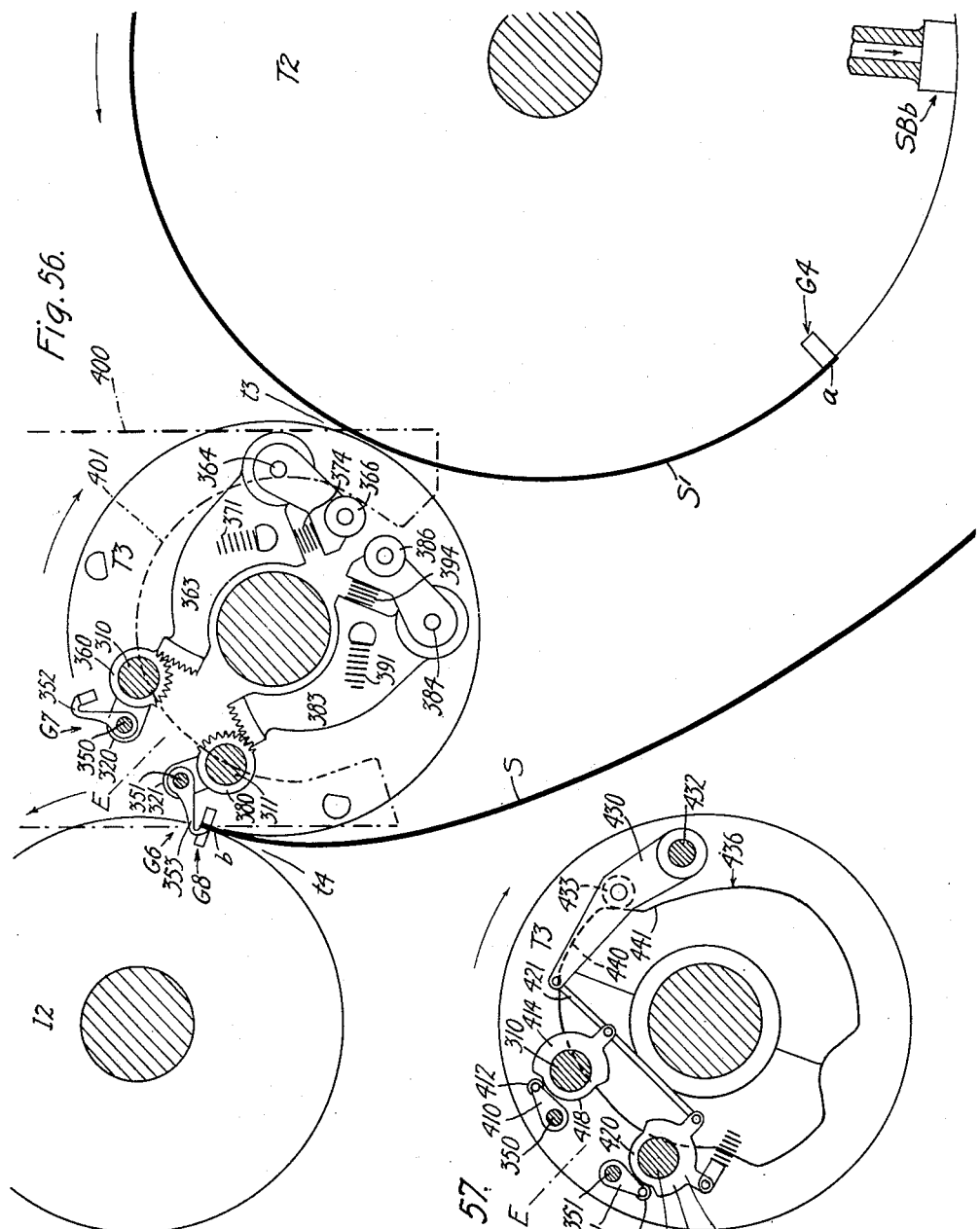

Inventors:
Harold W. Gegenheimer
Carl O. Siebke
by Furman Reinhart.
Att'y.

Inventors:
Harold W. Gegenheimer
Carl O. Siebke
by Furman Rinehart
Att'y.

Inventors:
Harold W. Gegenheimer
Carl O. Siebke

United States Patent Office 2,757,610
Patented Aug. 7, 1956

2,757,610

SHEET HANDLING MECHANISM AND METHOD FOR MULTI-COLOR PERFECTOR PRESS

Harold W. Gegenheimer, Darien, and Carl O. Siebke, Mystic, Conn., assignors, by mesne assignments, to Miller Printing Machinery Co., Pittsburgh, Pa., a corporation of Pennsylvania Application March 18, 1952, Serial No. 277,171

34 Claims. (Cl. 101—183)

This invention relates to sheet-fed printing presses and more particularly to rotary printing presses in which two or more printing units or couples are connected whereby sheets may be printed with two or more colors. Still more particularly the invention relates to the above-mentioned type of press so arranged that sheets may be printed on only one side or on both sides, either with the same color or different colors. That is, the press is adjustable to be used as a multi-color press or as a perfector press.

Generally speaking, a multi-color press can be considered as one that prints successive colors on one side of a sheet of paper. A perfector press may be considered as one that prints one or more colors on two sides of a sheet of paper. For convenience of description, one side of the sheet of paper will be referred to hereinafter as the "obverse" side and the other as the "reverse" side.

An object of the invention is the provision of a rotary press of the type above-mentioned which is so arranged that it can be quickly adjusted to operate either as a multi-color press or as a perfecting press.

The invention provides mechanism in which the printing couples are arranged and connected in such fashion that each printing unit can be optionally adjusted to print on either side of a sheet of paper entirely independent from which side of the sheet was printed on in the preceding color unit.

According to the invention, mechanism is provided for selectively transferring sheets being printed from the first to the second of any two consecutive printing units of a multi-color sheet-fed press whereby the sheets are delivered to the second of the two printing units with the first printed surface (the obverse side) presented for the second impression, or with the other surface or reverse side of the sheet presented to the second unit for the second impression. That is, the first unit prints on the obverse side and the mechanism can be adjusted so that the second unit of any two consecutive units will print on the same obverse side, if desired, or on the reverse side of the sheet, if desired. In other words, the first unit can be used to print one color on the obverse side and the second to print the same or a different color on the obverse side or on the reverse side of the sheet; or, the second unit can be used to print the same or a different color on the reverse side of the sheet, that is to say, it can be adjusted to operate as a perfector press.

According to one embodiment of the invention which is illustrated in the drawings, a first printing unit prints on the obverse side of a sheet. The sheet is then delivered to a first transfer cylinder which delivers it to a second transfer cylinder. The second transfer cylinder delivers the sheet to a third transfer cylinder. The third transfer cylinder then takes the sheet and the arrangement is such that the third transfer cylinder takes the leading edge of the sheet from the second transfer cylinder if the sheet is to be printed on the second printing unit on the same side; or, depending on the adjustment of the mechanism, the third transfer cylinder takes the trailing edge of the sheet from the second transfer cylinder if the sheet is to be printed on the reverse side on the second printing unit. In this latter case the press is set up for perfecting.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 4 is a simplified top plan view of the three cylinders used for transfer of sheets from the first to the second printing unit;

Fig. 5 is a side view in elevation of the first one of the three transfer cylinders shown in Fig. 4, and is viewed from the feeding end of the press;

Figs. 6, 7, 8, 9 are cross-sectional views of the first transfer cylinder taken on the corresponding lines 6—6, 7—7, 8—8, 9—9, in Fig. 5;

Figs. 10 and 11 are detail views of gripper fingers and pads and their mountings, as used in the first and second transfer cylinders in Figs. 5 and 13.

Fig. 12 is a simplified operational end view of the first transfer cylinder showing its cooperation with the first impression roller and the second transfer cylinder in the transfer of a sheet;

Fig. 13 is a side view in elevation of the second one of the three transfer cylinders shown in Fig. 4, and is viewed from the feeding end of the press;

Fig. 14 is a detail view of a stub shaft interposed between the two trains of driving gears for the two printing units, and adapted to be manually separated for relative adjustments of the two printing units;

Figs. 15, 16, 17, 18, 19, are cross-sectional views of the second transfer cylinder taken on the corresponding lines 15—15, 16—16, 17—17, 18—18, 19—19, in Fig. 13; of these views Figs. 16 and 17 specifically show certain elements adjusted for perfector operation;

Fig. 20 is a cross-sectional view taken along line 20—20 in Fig. 16;

Figs. 21 and 22 are views corresponding to Figs. 16 and 17 but specifically showing the elements adjusted for two-color operation;

Fig. 23 is a cross-sectional view taken along line 23—23 in Fig. 21;

Figs. 24, 25 and 26 are detail views of the suction heads shown in Fig. 19; Fig. 26 particularly shows a valve adjustment for inoperative condition of a suction head;

Figure 1:
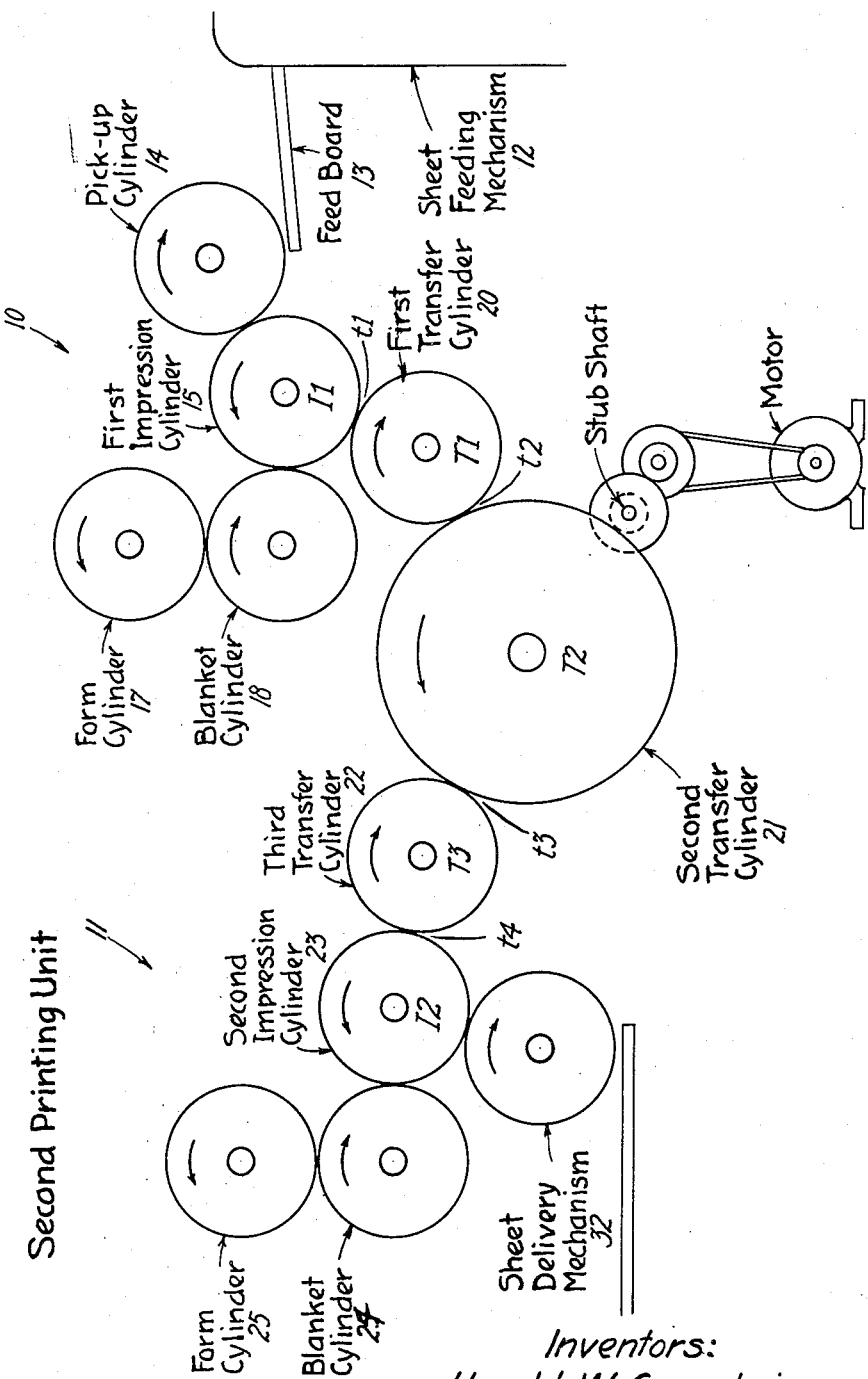
Fig. 1 is a schematic view from the operating side of a sheet-feeding printing press exemplifying the invention, indicating the relative positions and the directions of rotation of cylinders used in two printing units and of cylinders used for transfer of sheets from one unit to the other.
Figure 28:
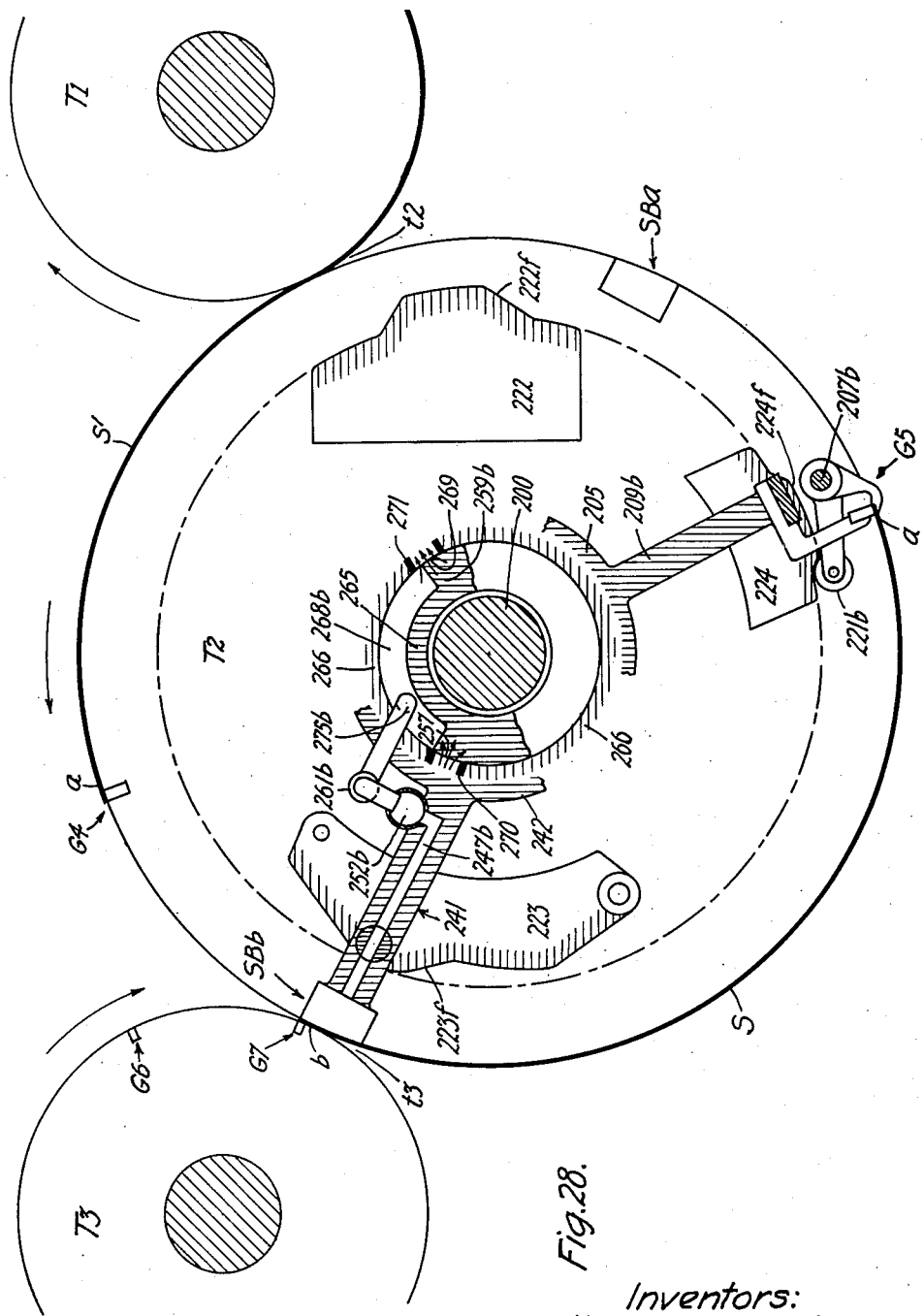
Figure 29:
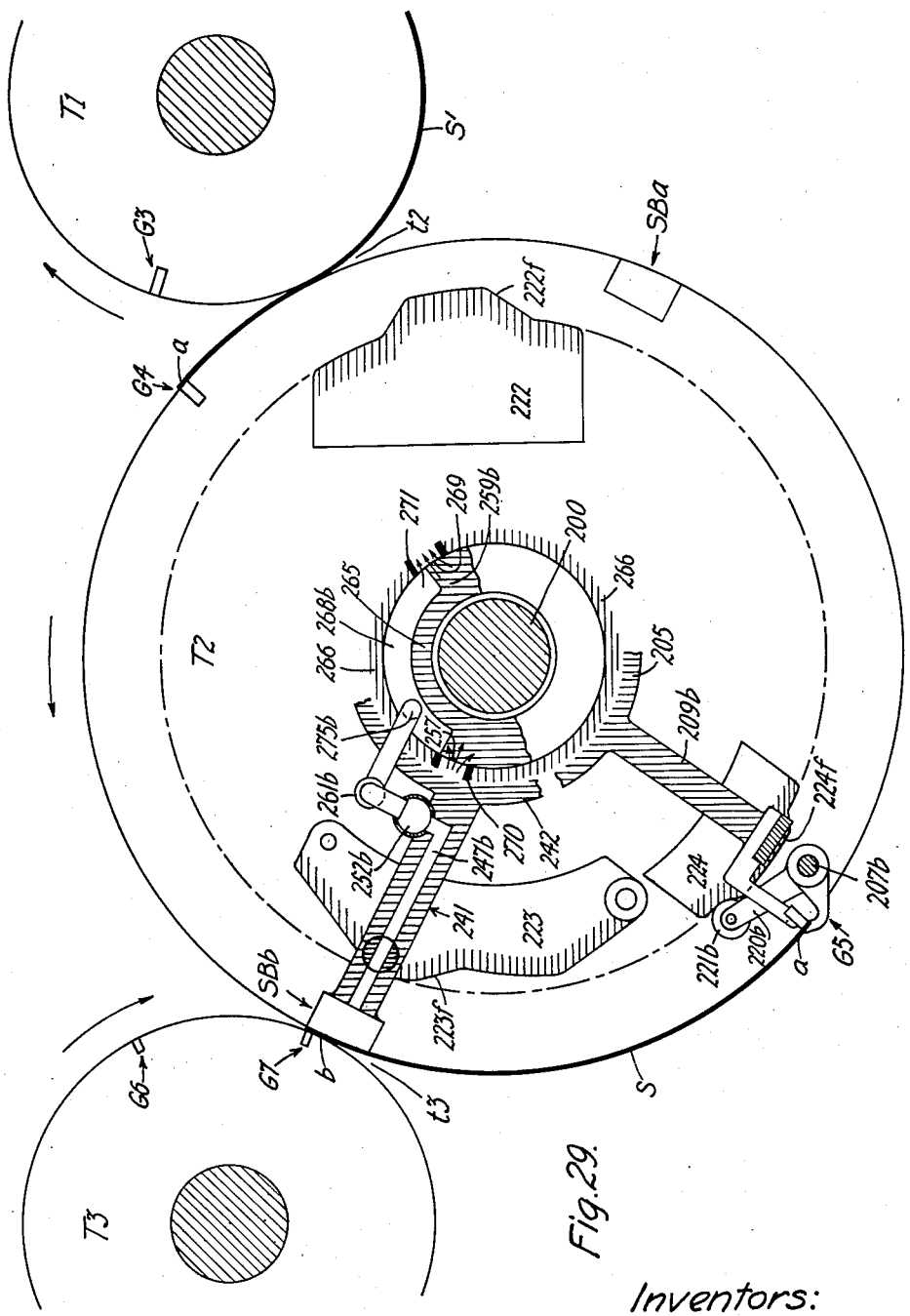
Figure 30:
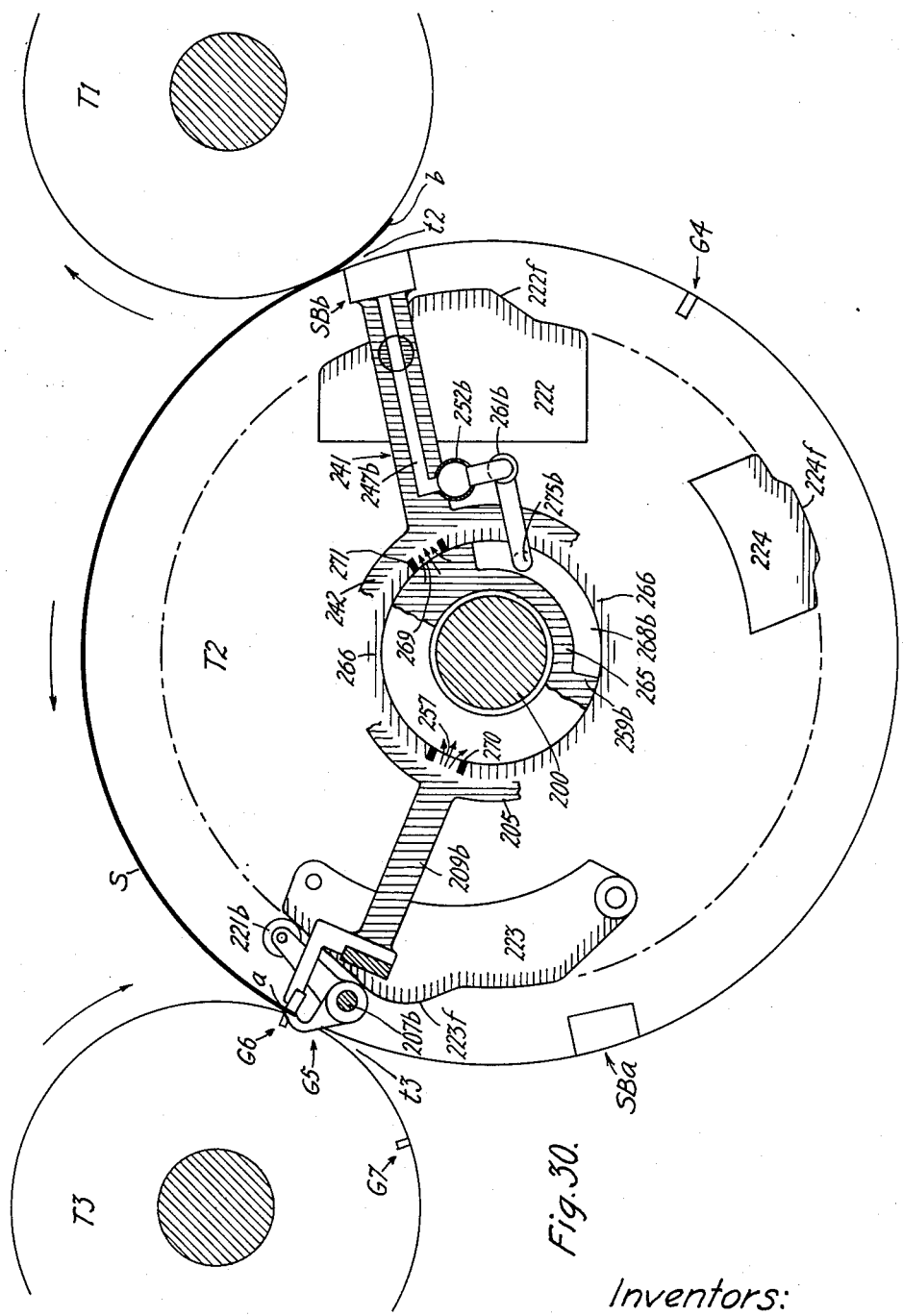
Figure 46:
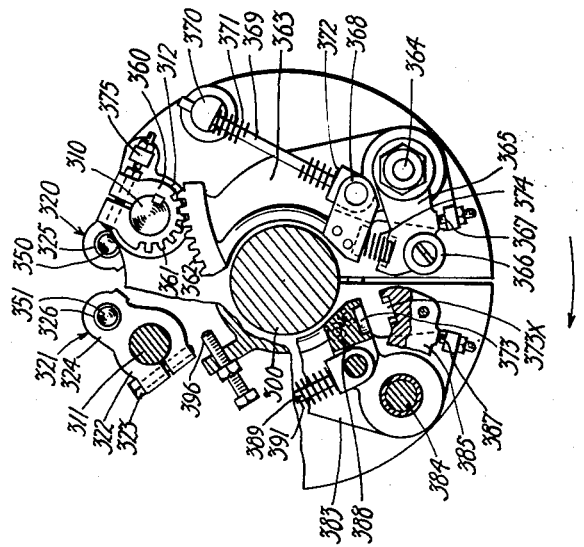
Figure 47:
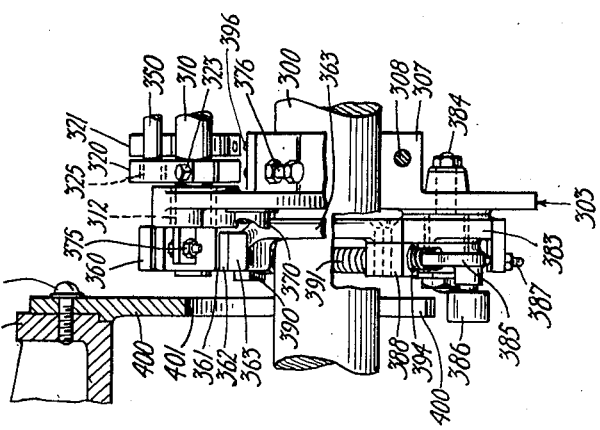
Figures 58, 59:
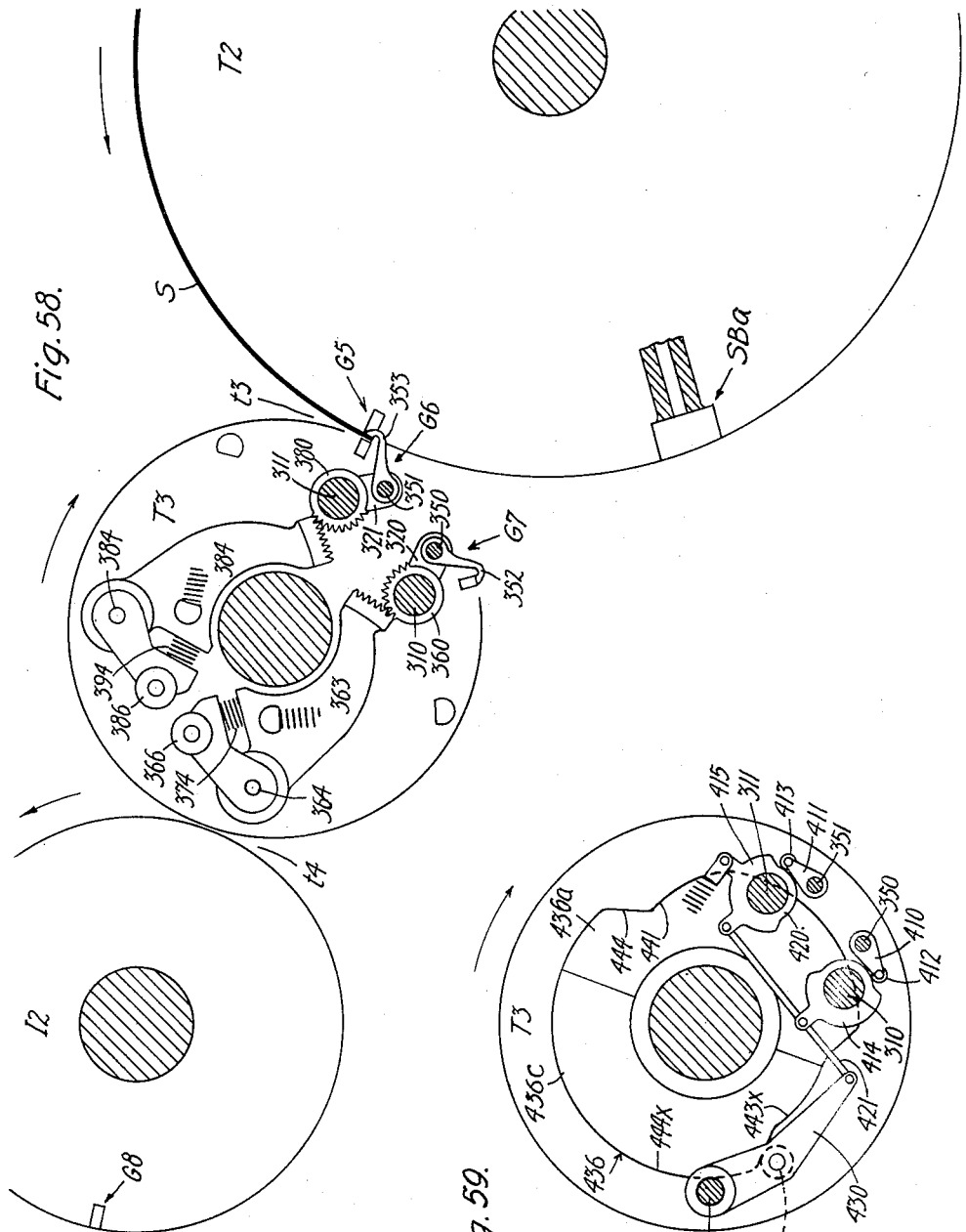
Figure 60:
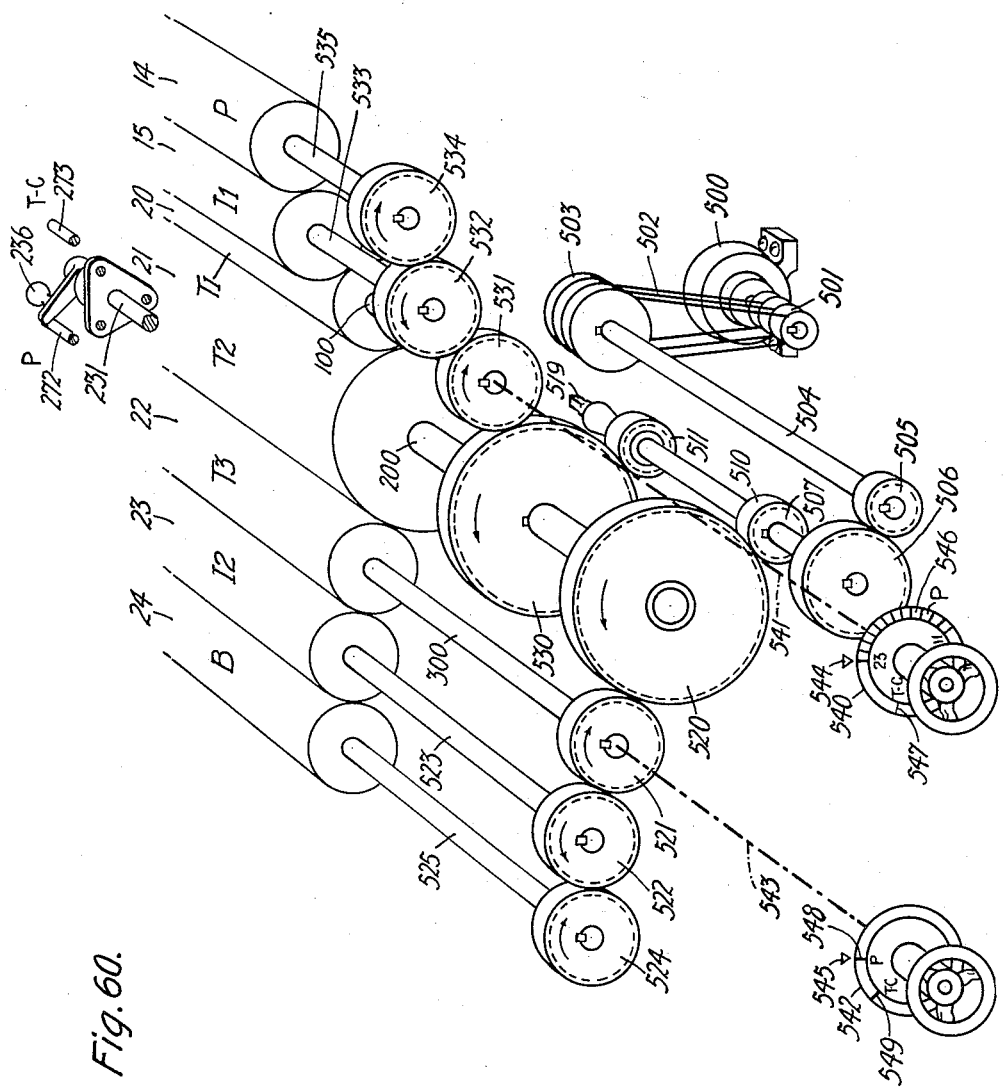
Figure 61:
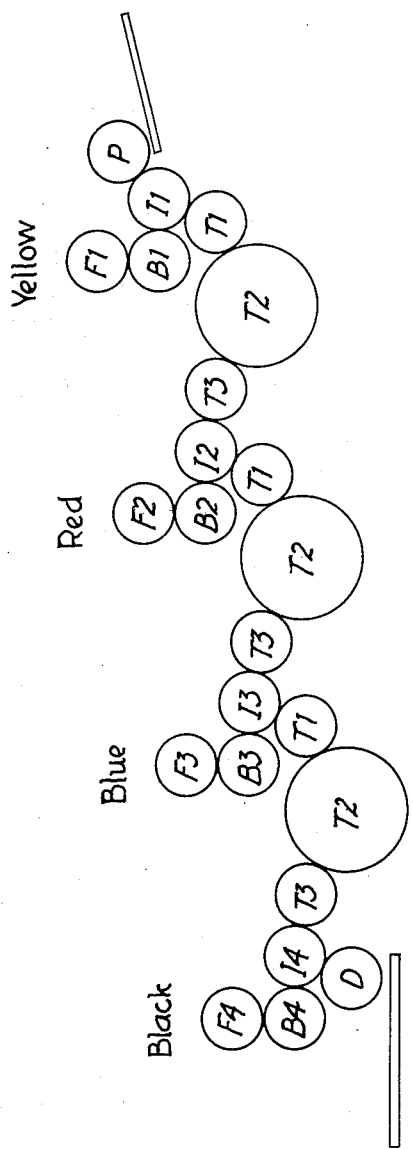

Figs. 27, 28, 29 and 30 are simplified operational end views of the second transfer cylinder showing its adjustment and cooperation with the first and third transfer cylinders in the transfer of a sheet under different operating conditions, namely: perfector operation with a long sheet, in Figs. 27 and 28, perfector operation with a short sheet, in Fig. 29, two-color operation with a long sheet, in Fig. 30;

Fig. 31 is a side view in elevation of the third one of the three transfer cylinders shown in Fig. 4 and is viewed from the feeding end of the press;

Figs. 32 to 39, inclusive, are cross-sectional views of the third transfer cylinder taken on the corresponding lines marked from 32—32 to 39—39 in Fig. 31, these views specifically showing certain elements adjusted for perfector operation;

Fig. 40 is an enlarged cross-sectional view combining the views in Figs. 32, 33 and 34;

Fig. 41 is a partial side elevation of the parts shown in Fig. 40;

Fig. 42 is a top elevation of the parts shown in Fig. 40;

Fig. 43 is an enlarged cross-sectional view corresponding to Fig. 36;

Fig. 44 is a partial side elevation of the parts shown in Fig. 43;

Fig. 45 is a top elevation of the parts shown in Fig. 43;

Fig. 46 is an enlarged cross-sectional view corresponding to Fig. 38;

Fig. 47 is a cross-sectional view taken along line 47—47 in Fig. 46;

Figs. 48 to 59, inclusive, are simplified operational end views of the third transfer cylinder showing its adjustment and cooperation with the second transfer cylinder and the second impression roller in the transfer of a sheet under different operating conditions, as follows: for perfector operation, five successive operating positions, in Figs. 48, 50, 52, 54, 56 for the operating end of the cylinder and corresponding Figs. 49, 51, 53, 55, 57 for the drive end of the cylinder; for two-color operation, one operating position in Fig. 58 for the operating end of the cylinder and in Fig. 59 for the drive end of the cylinder;

Fig. 60 is an exploded simplified perspective view of the gearing and driving means for the three transfer cylinders and some of the adjacent rollers in the two printing units including adjusting means used in setting up the press before starting for the different operating conditions; and Fig. 61 is a schematic end view of a sheet-feeding printing press similar to that shown in Fig. 1 but including four printing units and a set of transfer cylinders between successive units.

Figure 2:
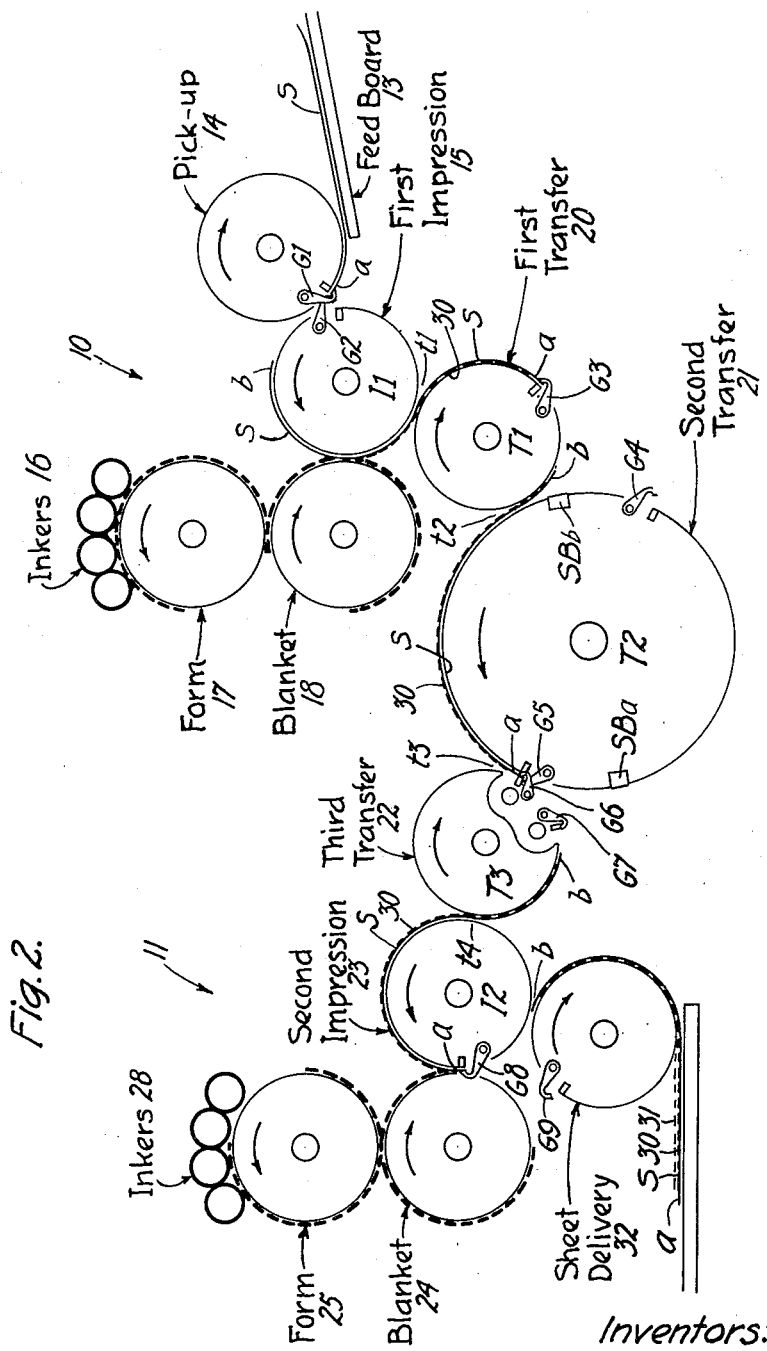
Fig. 2 is a schematic view similar to Fig. 1 but further indicating the passing and printing of a sheet when the machine is adjusted for two-color printing.
Figure 3:
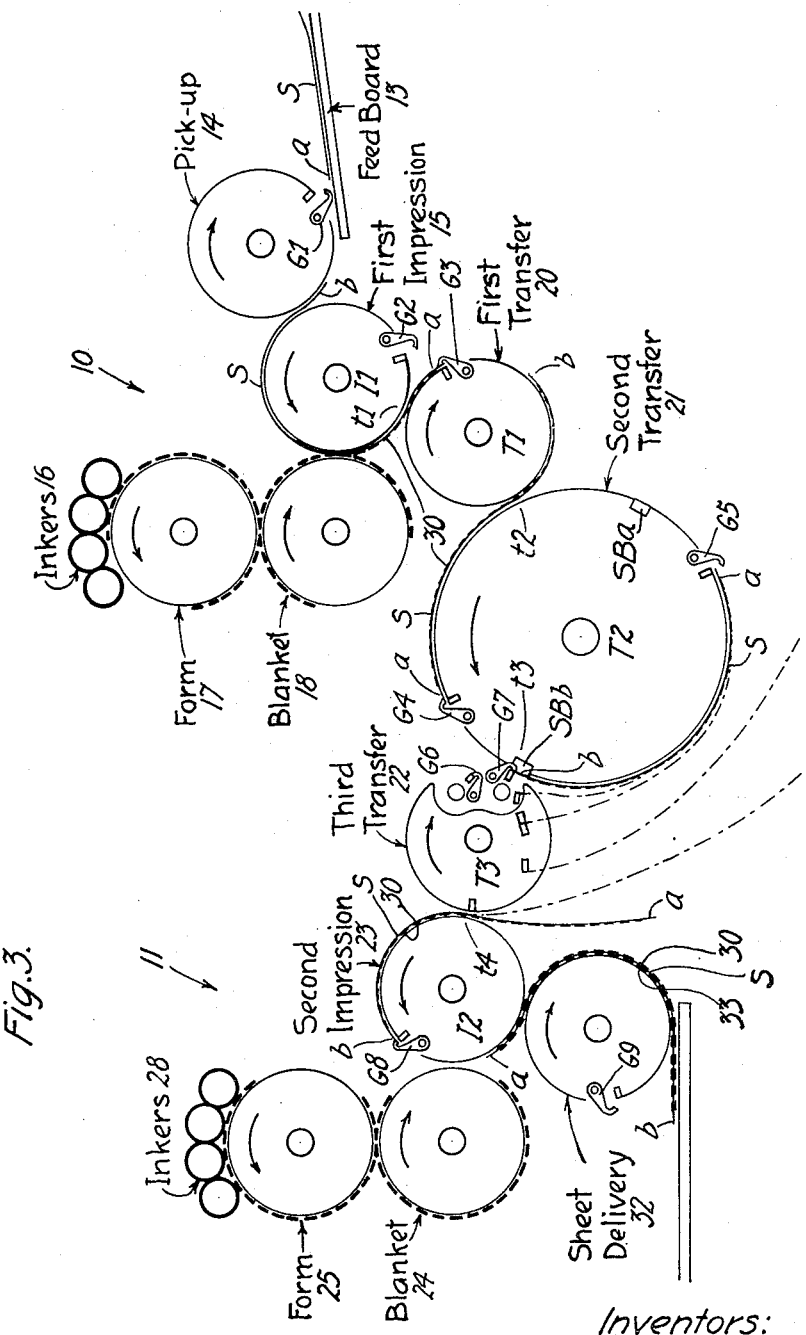
Fig. 3 is a schematic view similar to Fig. 1, but further indicating the passing and printing of a sheet when the machine is adjusted for perfector printing.

Referring now to the drawings in which like reference characters indicate similar parts, the nature of the invention and the operation of the press here shown for illustrative purposes may be ascertained from Figs. 1, 2 and 3, which are primarily diagrammatic. As shown in this illustrative embodiment, the press comprises two printing units 10 and 11, respectively called the First Printing Unit and the Second Printing Unit. In advance of the first unit 10 is a sheet-feeding mechanism 12 which delivers sheets from a pile on to a feed board 13 in succession and in timed relation with the speed of the press. The sheet-feeding mechanism for rotary sheet-fed presses are, of course, well known in the art and it will suffice to say that a sheet to be printed is fed down the feed board 13 for each revolution of the press.

For purpose of preliminary orientation and for a better understanding of the more detailed description set forth later, the travel of a single and typical sheet to be printed may be described, generally speaking, as follows: Referring to Figs. 1, 2 and 3, the sheet S is fed down the feed board 13 in timed relation with the speed of rotation of the press. The various cylinders are labeled for convenience of description and each rotates in the direction of the arrows when viewed from the operating side of the press. The leading edge of the sheet is grasped by gripper G1 on the pick-up cylinder 14. Pick-up cylinder 14 delivers the sheet to the first impression cylinder 15 labeled I1 on which its leading edge is grasped by grippers G2 on this cylinder. The sheet is printed on the obverse side on the first impression cylinder I1. This is done in the usual way. That is, inkers 16 (shown in Figs. 2 and 3) transfer ink to the form on form cylinder 17 which in turn transfers the ink to the blanket on blanket cylinder 18. The sheet, now printed on the obverse side is delivered by the impression cylinder I1 at tangent point t1 to the grippers G3 of first transfer cylinder 20, labeled T1. The first transfer cylinder delivers the sheet at tangent point t2 to the second transfer cylinder 21, labeled T2. The second transfer cylinder T2 is of a diameter approximately two times the diameter of the first transfer cylinder and has two sets of grippers G4 and G5 at 180° from each other. The second transfer cylinder T2 delivers the sheet at tangent point t3 to the third transfer cylinder 22, labeled T3, where, dependent upon the adjustment, either the leading edge of the sheet is grasped by one set of gripper G6 or the trailing edge of the sheet is grasped by another set of grippers G7.

The press can be adjusted so that the sheet can be printed in the second printing unit either on the same side as was printed in the first unit (the obverse side) or on the other side (the reverse side). That is, the press may be adjusted to operate as a two-color press or it may be adjusted to operate as a perfector press.

If adjusted to operate as a two-color press, the leading edge of the sheet S is grasped by grippers G6 on the third transfer cylinder T3 at tangent point t3 (as shown in Fig. 2). If the press is adjusted to operate as a perfector press, the trailing edge of the sheet delivered by the second transfer cylinder T2 is grasped by a different set of grippers G7 on the third transfer cylinder at tangent point t3 (as shown in Fig. 3). Grippers G6 are herein called the "two-color" grippers and grippers G7 are herein called "perfecting" grippers. The sheet is delivered from the third transfer cylinder T3 to the grippers G8 of the second impression cylinder 23, labeled I2, at tangent point t4, and it is printed on one side or on the other by the blanket on blanket cylinder 24 which is inked by the form on form cylinder 25 which is in turn inked by inkers 28, the inkers being shown in Figs. 2 and 3. Whether the second printing unit prints on the obverse or the reverse side of the sheet will depend on whether the press is adjusted to operate as a two-color or as a perfector press.

Referring now to Fig. 2, there is diagrammatically illustrated the operation of two-color printing; that is, printing a first color on the obverse side of the sheet in the first printing unit and a second color on the same side (the obverse side) in the second printing unit. It will be understood that the various cylinders are equipped with grippers and other necessary mechanisms later to be described, but since Fig. 2 is primarily diagrammatic it is deemed unnecessary to illustrate all the details in the diagram. The sheet S is printed on the obverse side in the first printing unit 10 as described above. That is, the sheet (see Fig. 2) is delivered from the feed board 13 to pick-up cylinder 14 and then to impression cylinder I1 where its leading edge a is picked up and the sheet is printed. It is delivered from the cylinder I1 to transfer cylinder T1 at tangent point t1 and then to the second transfer cylinder T2 at tangent point t2; the first color ink on the obverse side being indicated at 30. The sheet is then delivered to the third transfer cylinder T3 at tangent point t3, when grippers G6 grasp the leading edge a of the sheet and deliver it to the second impression cylinder I2 at tangent point t4 where it is grasped by grippers on this cylinder and then printed with the second color as it contacts the blanket on blanket cylinder 24, which is inked by the form on form cylinder 25, in turn inked by inkers 28. The sheet will now have two colors indicated at 31 on the obverse side. The second impression cylinder I2 delivers the printed sheet to sheet delivery mechanism 32. The sheet delivery mechanism 32 is of known kind and operates in conventional fashion. From the foregoing description taken in connection with Fig. 2, it will be seen that in two-color printing the leading edge of the sheet travels through the press always as the leading edge, the leading edge of the sheet S being designated a. The trailing edge is designated b. Also, it will be observed that the angular speed of rotation of each of the cylinders is the same except for the second transfer cylinder whose angular speed is one-half that of the other cylinders. The peripheral speed of each of the cylinders is the same. Moreover, when the press is running there is a sheet delivered from the press on each revolution of the impression cylinders. During normal operation of the press as a multi-color press, grippers G7 are not used for the sheet transferring operation.

Referring to Fig. 3, which shows diagrammatically the operation of the press as a perfector, the sheet S is delivered through the first printing unit 10 in the same manner as for two-color printing described above. The leading edge a of sheet S is delivered from the first transfer cylinder T1 to the second transfer cylinder T2 at tangent point t2 and the sheet has been printed on the obverse side, the ink being indicated at 30. However, the press is adjusted, as will be described later on in further detail, so that the sheet is printed in the second printing unit 11 on the reverse side. In this case, the leading edge a of the sheet is not delivered to the third transfer cylinder T3 by second transfer cylinder T2 at tangent point t3 and grasped by grippers G6 as is the case when printing "two-color" on the obverse side of the sheet. Instead, cylinder T2 (see Fig. 3) carries the leading edge beyond the tangent point t3 between cylinders T2 and T3, and the trailing edge b of the sheet is grasped by perfector grippers G7 on the third transfer cylinder T3 at the tangent point t3 and at this time the grippers G5 on transfer cylinder T2 release the leading edge a of the sheet. Then the trailing edge b of the sheet becomes the leading edge and as cylinder T3 continues in its rotation, the edge b of the sheet is transferred from grippers G7 to grippers G6, which latter mentioned grippers (G6) deliver the edge b to the second impression cylinder I2 at tangent point t4. It will be observed that as the sheet is transferred by cylinder T3 to cylinder I2, it is turned over or reversed so that when the sheet travels around on cylinder I2, it is printed on the reverse side. That is, the press operates as a perfector and the ink 33 applied by the second printing unit is printed on the reverse side of the sheet so that now the sheet has been printed on one side (the obverse side) in unit 10 and on the other (the reverse side) in unit 11. The printed sheets as they are delivered from the second impression cylinder I2 are then picked up and delivered by the sheet delivering mechanism 32.

Although in the illustrated embodiments shown diagrammatically in Figs. 1, 2 and 3, only two printing units are shown, it will be seen as the description proceeds that other printing units may be connected together by utilizing similar transfer mechanism comprising transfer cylinders T1, T2 and T3, so that a press capable of printing more than two colors is comprehended by the invention. And although the embodiment shown is a lithographic offset rotary press, mechanism embodying the invention may also be used on other types of sheet-fed printing machines.

Presses of the class selected to illustrate the invention comprise in general a main frame preferably made up of two side members and suitable cross members, which frame supports the printing units including a plate or form cylinder, a blanket cylinder and an impression cylinder all of which cylinders are integrated so that they will rotate at the same peripheral speed. In the illustrative embodiment shown herein the two main side frames are designated generally as 40 on the operating side of the press and 41 on the other or drive side (see Fig. 4). It will be understood that the main shafts of the rotating cylinders 14, 15, 17, 18, 20, 21, 22, 23, 24 and 25 shown diagrammatically in Figs. 1, 2 and 3, are mounted in suitable journals carried on the side frames.

The cylinders 14, 15, 17, 18, 20, 21, 22, 23, 24, 25 and 32 are mounted on shafts suitably journaled in the side frames 40 and 41 so that their respective axes of rotation are in the relative positions with respect to each other as shown in Figs. 1, 2 and 3. The feeding mechanism 12 and feed board 13 being known in the art, it is deemed unnecessary to describe them in detail. The pick-up cylinder 14 is also known and also the impression cylinder, form and blanket cylinders, and inkers (designated 14, 15, 17, 18, 23, 24 and 25) are of known construction. And it may here be mentioned that the feed board 13 and pick-up cylinder 14 may be provided with the registering mechanism described in copending application Serial No. 242,242, filed August 17, 1951, by Harold W. Gegenheimer.

*First transfer cylinder*

The first transfer cylinder T1 (see Figs. 5 to 9) comprises a shaft 100 mounted for rotation in suitable journals 101 in side frame 40 on the operating side of the press and 102 in the side frame 41 on the drive side of the press. Fixedly mounted on the shaft 100 are end disks 103x and 103y and center disk 104 which support a bar 130 on which is mounted journals 105x, 105y and 105z. Mounted between the end disks 103x and 103y are sheet supporting disks 106 and intermediate disks 107. It will be noted that the rims of the disks are interrupted or cut away (as indicated in Figs. 7, 8 and 9) to accommodate a gripper shaft 108 which is mounted for rotation in journals 105x, y, z. The rims 120 of the disks 106 provide surfaces upon which the paper sheet is supported as it is carried forward by the cylinder. Mounted on the gripper shaft are gripper fingers 109, each of which cooperates with a gripper pad 126 mounted on the disks; this set of grippers collectively being designated G3.

A typical gripper is illustrated in Figs. 10 and 11. It comprises a bored bracket 110 which is split at 111, this bracket being adjustably secured to the gripper shaft by a clamp screw 112. The outwardly extending gripper arm 113 is loose on the shaft and terminates in a gripper toe portion 125 which engages the gripper pad 126 when the gripper shaft 108 is rotated to close the gripper fingers. Each of the gripper fingers 109 is normally held closed by a spring 127 which urges the finger to closed position.

At the protruding end of the gripper finger shaft 108 (see Figs. 5 and 6) is secured a cam lever arm 114 having a cam roller or follower 115 which cooperates with a suitable gripper shaft actuating cam 116 which is secured to the other end of a sleeve bracket 117 secured to the side frame 41 on the drive side. From the foregoing it will be seen that as the cylinder shaft 100 and hence the cylinder T1 rotates on its axis, the gripper finger shaft 108 will be rotated on its axis as the cam roller 115 engages and travels over the cam 116. This will cause the gripper finger shaft to rock at the appropriate times. The gripper fingers are closed when the cam roller rides on the low side 118 of the cam. That is, when the cam roller engages the low side 118, the fingers 109 are closed and when it engages the high side 119 the fingers are open. This is illustrated diagrammatically in Fig. 12 wherein it will be seen that the cam 116 is positioned so that the gripper fingers 109 are open just before they reach the tangent point t1 between the periphery of impression cylinder I1 and the periphery of first transfer cylinder T1. Upon reaching this tangent point t1 the gripper finger shaft 108 is rocked to close the grippers 109 on to the leading edge a of the sheet that is delivered from the impression cylinder I1. When cam roller 115 reaches low side 118 of cam 116, cam lever arm 114 rotates gripper finger shaft 108 causing them to close under the pressure of springs 127. The gripper fingers 109 clamp the leading edge of the sheet between the toe 125 and gripper pad 126 (see also Figs. 10 and 11), and the gripper fingers G3 remain closed until they reach the tangent point t2 between the periphery of first transfer cylinder T1 and the periphery of second transfer cylinder T2 at which time the cam roller 115 reaches the high side 119 of cam 116 and rocks the shaft 108 to open the gripper fingers G3 for delivery of the sheet to the second transfer cylinder T2.

Mounted on and keyed to the cylinder shaft 100 on the operating side of the press is drive gear 531 which meshes with a drive gear 530 on the main shaft of the second transfer cylinder T2 as described later.

*Second transfer cylinder*

The second transfer cylinder T2 (see Fig. 13) comprises a main shaft 200 mounted for rotation in journals 201 and 202 on operating side frame 40 and drive side frame 41 respectively. Journal 202 is mounted in a shaft aligning plate 237 secured to the side frame. Mounted on the main shaft 200, on the operating side of the press, is a drive gear 530 keyed to this shaft and a similar gear 520 mounted for free rotation on this shaft. These are described further hereinafter in connection with the drive mechanism. Fixedly mounted on main shaft 200 are sheet supporting disks 203x, 203y, 204 and 204x. Each of these disks (see Fig. 18) comprises a hub portion 205 from which extend spokes which support sheet supporting rim portions 206a and 206b, it being noted that the rim is interrupted to accommodate gripper finger shaft 207a and its mountings, comprising the set of grippers G4, and gripper finger shaft 207b and its mountings comprising the set of grippers G5. Grippers G4 and G5 are 180° apart and the diameter of the transfer cylinder T2 is approximately twice that of transfer cylinders T1 and T3. The reason for making transfer cylinder T2 larger is to provide sufficient peripheral distance between grippers G4 and G5 to accommodate the full length of a sheet on the rim portions 206a and 206b that can be handled on the impression cylinder I1 because in perfecting printing, as stated in the foregoing, the leading edge of the sheet passes beyond the tangent point t3 between transfer cylinders T2 and T3 and the trailing edge of the sheet is delivered from cylinder T2 at tangent point t3; (see Figs. 1, 2, 3, for tangent points). Thus it may be seen that by making cylinder T2 larger, the machine is made capable of handling a wider range of sheet sizes than would be the case if cylinder T2 were the same size as the other cylinders. Or, putting it another way, the machine is capable of handling the same size sheets when set for perfecting as when set for two-color printing. While in the illustrative embodiment cylinder T2 is shown as twice the diameter of cylinder I1, it can be made larger so as to accommodate three or more sets of grippers so long as this cylinder is designed to rotate at the same peripheral speed as the peripheral or surface speed of the other transfer cylinders.

Gripper finger shaft 207a is mounted for rotation in pillow block bearings 208a secured to a bar 213a (see Figs. 13, 18) which are supported on spokes 209a of the disks 203x, 203y, 204 and gripper shaft 207b is mounted in similar pillow block bearings 208b on spokes 209b on the opposite side of the cylinder. That is, shafts 207a and 207b are 180° apart. Inasmuch as the construction of all disks 203 and 204 is substantially the same and each half arc of cylinder T2 is the same, it will suffice to describe only one side of the cylinder in detail.

A typical construction of the sheet supporting disks 203 is shown in Fig. 18 wherein it will be seen that spoke 209a provides a platform 210a, short of the periphery of the rim of the disk and an upstanding portion 211a which supports a gripper finger pad bar 212a. The pillow block bearings 208a are supported on crossbar 213a supported on platforms 210a. Adjustably but securely mounted on gripper finger shaft 207a are a series of gripper fingers 214a, there being a gripper finger on shaft 207a for each disk and a cooperating gripper pad on each of disks 203 and 204. This set of gripper fingers is designated G4. A typical gripper finger and cooperating pad is illustrated in Fig. 18 wherein it will be seen that the gripper finger comprises a bored split bracket 215 having an arm 216 terminating in a toe 217 which opens and closes on gripper pad 212a upon rocking shaft 207a on its axis. The bracket is adjustably clamped on the shaft by a screw 218 and the gripper finger is normally closed, being urged to closed position by a spring 219. In brief, the gripper fingers on shaft 207a are in all substantial respects like the gripper finger illustrated in Figs. 10 and 11 and they operate in substantially the same manner.

Mounted on the protruding end of shaft 207a is a cam lever arm 220a (see Figs. 13, 17, 22) having a cam roller or follower 221a which, upon rotation of main shaft 200 of transfer cylinder T2, engages fixed cam 222, a pivotally mounted cam 223 and an adjustable arcuately movable cam 224, all described later. The cams are appropriately mounted on the drive side of the press. This cam arrangement is such that at the appropriate times during the rotation of cylinder T2, gripper finger shaft 207a is rocked and in response thereto gripper fingers 214a (collectively referred to as G4) are opened and closed.

The foregoing description of gripper finger shaft 207a and its gripper fingers 214a and other mechanisms which comprise the set of grippers designated G4 will suffice, generally speaking, for describing the opposite set of grippers G5, for the construction of the two sets is the same, the corresponding parts bearing similar reference numerals with the sub-letter b. From the foregoing, it will be understood that grippers G5 follow the orbital path of travel of grippers G4 by 180°, upon rotation of cylinder T2, and their construction, operation and actuation are the same as grippers G4.

*Cam arrangement—second transfer cylinder*

The cam arrangement for the second transfer cylinder T2 is perhaps best shown in Figs. 15, 16, 17, 21, 22. Cam 222 is a fixed cam mounted on posts 225 fixed to side frame 41. Upon rotation of cylinder T2 on its axis, when cam roller 221a engages the cam face 222f, cam lever 220a is tripped and in response thereto gripper finger shaft 207a is rocked to open grippers G4 and when cam roller 221a passes beyond cam 222, grippers G4 close and remain so until again tripped when the cam roller engages cam face 223f of cam 223 (if it is adjusted to operative position). In response to this tripping, grippers G4 are again opened and are closed after passing cam 223. Then upon continued rotation of cylinder T2, grippers G4 are again tripped by cam 224 when cam roller 221a engages cam face 224f. Although arcuately adjustable, cam 224 is always in operative position. After passing cam 224, grippers G4 are again closed and remain so until again tripped by cam 222. Cam 222 is fixed and is positioned so that grippers G4 are always opened just before they reach tangent point t2 (see Figs. 1, 2, 3 for tangent points) between cylinders T1 and T2, and they close upon the leading edge a of the sheet S at this tangent point where grippers G3 on the first transfer cylinder T1 open and release the sheet. The grippers G3 on cylinder T1 are operated in a manner and by a cam arrangement described in the foregoing (see Figs. 5, 6, 12).

Of course, cam level 220b and its follower 221b follow in the same orbit as cam lever 220a and its follower 220b and hence grippers G5 on cylinder T2 will be actuated in the same manner, but the corresponding actuation takes place at a time following actuation of grippers G4 by 180° in the orbit of travel of the grippers G4 and G5. Consequently, it will suffice to describe in detail only the cam arrangement with respect to grippers G4.

Cam 223 is adapted to be moved in or out of the orbit of travel of the cam roller 221a. As shown in Figs. 17 and 22, this cam comprises a cam plate 223 of generally arcuate shape, the plate having an effective cam face 223f similar to cam face 222f of cam 222. Cam plate 223 is pivotally mounted at its lower end on a pivot pin 225x, which is mounted at the upper end of an arcuate shaped cam track member 226, which in turn is secured to laterally extending posts 227 fixed to plate 237 on side frame 41 (see Figs. 13, 15, 17). The upper end of cam plate 223 is provided with a slot 228 through which extends a pin 229. This pin, herein called a "cam throw" pin is square on its outer end but its inner end is cylindrical and is pivotally mounted on a "cam throw" block 230 secured to the inner end of a "cam throw" shaft 231 (see Figs. 16, 21, and 23). The cam throw shaft is mounted for rotation in a hollow bracket 232 which is secured to plate 237 on side frame 41. The outer end of cam throw shaft 231 extends beyond the plate 237 and it is provided with a lever handle 236 to facilitate rotation of the cam throw shaft 231. A helical tension spring 233, secured at one end to cam plate 223 and at the other to a pin 234 fixed to the side frame, normally urges plate 223 inwardly about pivot 225x. An adjustable stop 235 (see Figs. 16 and 21) limits the distance of rotation of cam throw block 230 which rotates with its pivot 231a in response to rotation of cam throw shaft 231 in clockwise direction as viewed in Figs. 15 and 16.

From the foregoing it will be seen that when the handle lever 236 is rotated counterclockwise (as viewed in Figs. 15, 16), shaft 231 is rotated likewise and in consequence cam throw block is rotated on pivot 231a. This causes cam throw pin 229 in slot 228 of cam plate 223 to move the plate inwardly to the position shown in Fig. 17 or clockwise on its pivot 225x. This will cause the cam face 223f of the cam to move out of the orbital path of travel of cam followers 221a and 221b. That is, counterclockwise movement of the shaft 231 to the position shown in Figs. 15, 16, 17 causes the pin 229 to move in slot 228 and causes this plate 223 to take the position shown in Fig. 17 so that cam face 223f is moved to inoperative position out of the orbital path of travel of cam rollers 221a and 221b. On the other hand, the reverse rotation of cam throw shaft 231 will rotate cam throw block 230 in clockwise direction (as viewed in Figs. 15, 16, 21) and pin 229 will move cam face 223f into the orbital path of travel of cam rollers 221a and 221b, as shown in Fig. 22, and maintain the cam in that position when it is desired to make the cam effective to actuate grippers G4 and G5. A stop 272 in side frame 41 limits counterclockwise rotation of lever handle 236 and a similar stop pin 273 limits clockwise movement of lever handle 236. Cam 223 is adjusted to operative position as shown in Fig. 22 when the press is set for two-color printing and to inoperative position as shown in Fig. 17 when the press is set for perfecting printing. When in operative position for two-color printing, cam 223 trips or rocks gripper finger shafts 207a and 207b to open the grippers G4 and G5 at the tangent point t3 between cylinders T2 and T3. When the cam rollers pass cam 223 the grippers are closed again but in the meantime grippers G6 on transfer cylinder T3 will have grasped the leading edge of the sheet delivered by transfer cylinder T2, it being assumed, as stated, that the press is now set for two-color printing. For convenience of description, cam 223 may be referred to as the "two-color" cam for the second transfer cylinder T2.

Cam plate 224 is mounted on an arcuate shaped cam track member 226 which is secured to the side frame by posts like 227 (Figs. 13 and 17). The cam face 224f is similar to cam faces 222f and 223f, but need not be so high as it needs to open the gripper fingers G4 and G5 only sufficient to release the sheet at the appropriate time. This cam plate 224 is slidable along the arcuate track 226 and may be set and clamped as by bolts 224x at any desirable position along the trackway while still maintaining the cam face 224f in the orbital path of travel of cam rollers 221a and 221b. For convenience of description this cam 224 may be referred to as the "perfector" cam for the second transfer cylinder T2.

The perfector cams 224 is made peripherally adjustable along trackway 226 so that the press can be set for variation in the length of sheets printed on the press when it is set for perfector printing. When the press is set for perfector printing, cam 223 is adjusted to inoperative position, as shown in Fig. 17, and cam 224 is adjustably set on cam track 226 so that gripper finger shafts 207a and 207b are tripped or rocked by cam levers 220a and 220b at the time the trailing edge of a sheet carried by cylinder T2 reaches the tangent point t3 between transfer cylinders T2 and T3; (see Figs. 1, 2 and 3 for tangent points); bearing in mind that the grippers G4 and G5 which grasp the leading edge of the sheet will not have been tripped by cam 223 as cylinder T2 rotates because in perfector printing cam 223 is adjusted to inoperative position. When the cam rollers 221a and 221b reach cam 224, grippers G4 and G5 are opened and in the meantime grippers G7 on transfer cylinder T3 grasp the trailing edge of the sheet at tangent point t3 (see Fig. 3). After the respective cam rollers pass cam 224, their respective grippers are again closed, until again tripped by cam 222 as cylinder T2 rotates on its axis. Although cam 224 is necessary only in perfector printing, it nevertheless remains in operative position when the press is set for two-color printing, but this is no cause for concern because in two-color printing the leading edge of the sheet will have been delivered at tangent point t3 and the grippers G4 and G5 when actuated by cam 224 do not need to perform any necessary function in two-color printing.

*Suction-blower mechanism—second transfer cylinder*

Transfer cylinder T2 is provided with means for controlling and securely holding on to it the trailing portion of each sheet carried by it from transfer cylinder T1 to transfer cylinder T3, in addition to the grippers G4 and G5 on cylinder T2 which, as stated above, grasp the leading edge. This sheet controlling means is very desirable when the press is set for perfector printing. It comprises a suction-blower arrangement so contrived that (when the press is set for perfector printing) at the time, or soon after, the trailing portion of a sheet carried on cylinder T2 passes the tangent point t2 between cylinders T1 and T2, suction is applied to the sheet to hold it securely to cylinder T2 and when the trailing portion of the sheet reaches tangent point t3 between cylinders T2 and T3 the suction is shut off and air pressure is applied to the sheet to blow it away from the perpihery of cylinder T2 after the trailing edge of the sheet has been grasped by grippers G7 of transfer cylinder T3. Blowing the trailing portion of the sheet from cylinder T2 provides clearance for the leading portion of the next oncoming sheet, carried on cylinder T2 and approaching cylinder T3. Although the suction-blower arrangement is very highly desirable when the press is used as a perfector, it is also very useful when the press is used for two-color printing. In the case of two-color printing, the suction on the sheet is timed so that suction is applied to the trailing portion of the sheet carried on cylinder T2 until it reaches tangent point t3 between cylinders T2 and T3 and even though at this point air force is applied when tangent point t3 is passed, this is no cause for concern because the leading edge of the sheet will have been grasped by grippers G6 (the press being set for two-color printing) and the forced air will merely be dissipated to atmosphere. Moreover, air pressure applied to the suction pipes quickly neutralizes or relieves the effect of the suction.

The suction-blower arrangement comprises two sets of radially extending oppositely disposed hollow arms terminating in heads having foraminous peripheral surfaces in the cylindrical surface at the periphery of cylinder T2. These heads for convenience of description are called "suction" heads although it will be understood that they serve also as blower heads since the arrangement is such that air can be sucked through them or blown through them.

As shown in the illustrative embodiment cylinder T2 is provided with two sets of oppositely disposed suction heads 240a and 240b each set consisting of four heads; the set 240a being collectively referred to as SBa and the set 240b being collectively referred to as SBb (see Figs. 13, 15, 16, 19, 20).

Each pair of oppositely disposed suction heads 240a, 240b is the same. A typical pair, as shown in Fig. 19, is mounted on a suction head bracket designated 241 which comprises a split ring hub portion 242 having a central bore for adjustably mounting the hub on the main shaft 200 of cylinder T2; a clamp screw 243 being provided for clamping the hub 242 to the shaft. Radially extending from hub 242 are a pair of oppositely disposed spokes 244a and 244b. Each of these spokes is the same and it therefore will suffice to describe only one in detail.

Spoke 244b at its outer end has an arcuate faced sheet supporting portion 245b which is located in advance of a hollow suction head 240b. The suction head has a foraminous sheet contacting face 246b (see Figs. 19, 24, 25, 26). The hollow head 240b communicates with a central bore 247b in spoke 244b which terminates short of the hub 242 and has a port 248b at its inner end. A manually rotatable valve 249b is provided to open and close the bore 247b, it being noted that the valve plug has a bore 250b. When the valve 249b is set as shown in Fig. 24, the valve is open and it is closed when it is set as shown in Fig. 26. The amount of suction can be regulated by a valve (not shown) located in the suction pipe between the suction pump (not shown) and the cylinder T2.

Each of the bores 247b of the four suction heads 240b (referred to collectively as SBb) is connected to communicate with distributor or header pipe 252b. The header pipe 252b extends along the cylinder T2 parallel to the axis of shaft 200. There is an arcuate slot 253b in each of disks 203 and 204 (see Fig. 18) in which the header pipe 252b is disposed. The header pipe 252b is held in a split bored header clamp bracket 254b (see Fig. 19) and clamped in position by screw 255b, there being a header clamp bracket on each of the spokes 244b of the four suction heads 240b as shown in Fig. 13. Header pipe 252b is closed at both ends and has a port 256b to register with each of ports 248b of the bores 247b (see Fig. 19). From the foregoing it will be understood that communication is provided from the header pipe 252b through bores 247b to each of the suction heads 240b (this set of four suction heads being designated SBb). Moreover, upon loosening clamp screws 243, the heads SBb may be moved and adjusted angularly about the axis of the main shaft 200 of cylinder T2 within the limits of the slots 253b (see Fig. 18 showing slots 253b and oppositely disposed corresponding slots 253a). Consequently, the suction heads SBb may be moved peripherally (within the angular limits of slots 253b) toward and away from grippers G5.

As stated above, the complementary and oppositely disposed set SBa of suction heads is the same as suction heads SBb. Their corresponding parts are designated by the same reference characters bearing subletter a. Consequently suction heads SBa are moved toward or away from grippers G4 when suction heads SBb are correspondingly moved.

Midway along the header pipe 252b (see Fig. 13) is an elbow 260b connecting the header pipe 252b with a flexible or bendable hose 261b which is connected with an elbow connection 262b secured to a rotary valve bracket 263 comprising two complementary halves 263a and 263b (see Figs. 16, 20), these complementary half brackets being clamped together by screws 264a, 264b, so that main shaft 200 of cylinder T3 will clear the bore of the bracket when the suction heads SBa and SBb are rotated toward or away from grippers G4 and G5 on cylinder T3. Valve bracket 263 has a laterally extending annular rotary valve 265 which surrounds main shaft 200 and extends into and rotates within a cylindrical stationary valve housing 266 (see Figs. 13, 15, 16, 20). The valve housing 266 is secured to plate 237 by means of screws through an annular flange 267 (see Fig. 15) which engages the plate 237 which in turn is secured to side frame 41. The rotary valve 265 is provided with two oppositely disposed arcuate grooves 268a and 268b, valve groove 268b communicates through a port 275b in the bracket with elbow connection 262b and hence with suction heads SBb through flexible hose 261b, header pipe 252b and bores 247b in the suction head brackets. Valve groove 268a communicates in similar fashion with the oppositely disposed set of suction heads 240a (designated collectively as SBa) through port 275a, elbow connection 262a (see Figs. 16 and 20), flexible hose 261a (not visible in Fig. 13), header pipe 252a, and bores 247a in the suction head brackets 241, a typical one of which is shown in Fig. 19. Inasmuch as suction heads 240a (designated collectively as SBa) and their connecting parts are the same as the suction heads 240b (designated collectively as SBb) and their connecting parts, a description in further detail of suction heads SBa is deemed unnecessary.

As shown in Figs. 13, 16, 20, the closed ends of header pipes 252a and 252b on the drive side of the press extend into registering bores 258a and 258b in valve bracket 263. Consequently, when bracket 263 is rotated relatively with respect to and about main shaft 200, the header pipes 252a and 252b are caused to travel correspondingly in their orbital path in arcuate slots 253a and 253b of the cylinder disks and in response thereto suction heads SBa are caused to move nearer to grippers G4 and suction heads SBb are caused to move nearer to grippers G5, on counterclockwise rotation of valve bracket 263 relatively to main shaft 200, as viewed in Figs. 16 and 18. On the other hand, clockwise rotation of bracket 263 relatively to shaft 200 causes suction heads SBa to move further away from grippers G4 and heads SBb to move a corresponding distance from grippers G5. To make an adjustment of the suction heads SBa and SBb screws 243 in suction head brackets 241 (see Fig. 19) are loosened to unclamp them from shaft 200. The suction heads are then moved bodily relatively to the shaft and then the screws 243 tightened to clamp the brackets 241 in the desired angular position on shaft 200.

The stationary valve housing 266 is provided with an air-pressure port 257 and an air-suction port 269 (see Fig. 15). An air-pressure pipe 270 is connected to air-pressure port 257 and this pipe is connected to a source of air under pressure (not shown). A suction pipe 271 is connected to suction port 269 and this pipe is connected to a source of vacuum (not shown). These ports 257 and 269 lie in the plane of rotation of grooves 268a and 268b.

From the foregoing it will be seen that as cylinder T2 rotates (counterclockwise as viewed in Figs. 15, 16, 19), the valve bracket 263 rotates with it, the suction heads move with the periphery of the cylinder and travel in its orbital path. Also, grooved valve 265 rotates in the stationary valve housing 266 at the same angular speed as main shaft 200. As valve groove 268b rotates, it periodically passes air pressure port 257 and communicates with the air under pressure in pipe 270. While the groove 268b is thus in communication with port 257, air under pressure passes through the groove outlet port 275b, through flexible hose 261b into header 252b and thence through the heads 240b (designated collectively SBb). When the trailing end of groove 268b passes port 257, the air pressure is shut off from the heads SBb as the solid arcuate portion 259b passes port 257. As valve 265 continues in its rotation the leading end of groove 268b reaches suction port 269 and provides communication with the suction (vacuum) in pipe 271. This provides communication through port 275b, elbow connection 262b, flexible hose 261b, and header 252b to the suction heads SBb. The suction on these heads continues until the trailing end of groove 268b passes suction port 269 when the suction is shut off from suction heads SBb by the solid portion 259b of the valve which closes the port.

It will be understood that the other set of suction heads 240a (designated collectively SBa) are connected in similar fashion but 180° from suction heads 240b (designated collectively SBb). Air pressure is applied to heads SBa when valve groove 268a is in communication with air pressure port 257 and suction is applied to these heads when groove 268a is in communication with suction port 269.

*Timing of suction-blower mechanism—second transfer cylinder*

The suction heads on transfer cylinder T2 are adjustable angularly and operate in such fashion that when the press is set for perfector printing suction is applied through the suction heads to the trailing portion of the sheet (as it is carried on cylinder T2 to cylinder T3) immediately after the trailing edge of the sheet passes the tangent point t2 between cylinders T1 and T2 (see Figs. 1, 2 and 3 for tangent points). The suction remains on (in perfector printing) until the trailing edge of the sheet reaches the tangent point t3, whereupon the suction is shut off from the suction heads. At the time the trailing edge of the sheet reaches the tangent point t3 between cylinders T2 and T3, air under pressure is blown through the suction heads; first, clearing out or neutralizing the suction effect in the heads and, then, actually blowing the trailing portion of the sheet away from the periphery of transfer cylinder T2; bearing in mind that in perfector printing the leading edge of the sheet is carried on cylinder T2 beyond the tangent point t3 (see Fig. 3) and the leading edge is not released by cylinder T2 until the trailing edge of the sheet reaches tangent point t3 between cylinders T2 and T3.

When the press is set for two-color printing the suction heads are adjusted so that suction is applied to the trailing portion of the sheet as it is carried on cylinder T2 to cylinder T3. In this case the suction is applied through the suction heads to the trailing portion of the sheet immediately after the trailing edge passes tangent point t2 between cylinders T1 and T2. The suction is released when the trailing edge reaches tangent point t3 between cylinders T2 and T3. Immediately thereafter air pressure is forced through the heads to clear out or neutralize the suction. Although the air continues to be forced through the suction heads after the trailing edge of the sheet has passed tangent point t3, it is merely dissipated to atmosphere since the leading edge of the sheet (in two-color printing) will have been delivered by transfer cylinder T2 to cylinder T3 at tangent point t3.

*Timing diagrams—second transfer cylinder—perfector printing*

The timing of the suction-blower mechanism for perfector printing may be better understood by reference to Figs. 27, 28, 29, which may be considered as "timing" diagrams. According to the scheme of these timing diagrams, stationary parts are indicated by horizontal shading lines and rotating parts by vertical shading lines. The various parts are represented by reference characters corresponding to the reference characters used to indicate the corresponding parts in other figures of the drawings. But it will be understood that the timing diagrams are schematic and diagrammatic and by reason of limitations imposed in illustrating various parts on a single plane when such parts in the physical embodiment are in different planes, there is in these figures what, without such explanation, might be thought to be distortion.

Referring now more particularly to Fig. 27, it illustrates the operation of that half of transfer cylinder T2 identified by reference numerals bearing the subletter "b" (see particularly Figs. 18 and 19). Although not shown in the timing diagrams, it will be understood that the opposite set of suction heads SBa and their cooperating grippers G4, operate in like fashion but following suction heads SBb and grippers G5 by 180°.

Transfer cylinder T2, as it rotates with main shaft 200, also rotates rotary valve 265 in valve housing 266 and also grippers G5. As shown diagrammatically in Fig. 27, grippers G5 are represented as having almost reached tangent point t2 between transfer cylinders T1 and T2. Valve groove 268b is in communication with air-pressure port 257 and air under pressure is passing from air-pressure pipe 270 (connected to a source of air under pressure, not shown) through port 275b, through pipe 261b into header pipe 252b, through the bores 247b and through suction heads 240b (collectively designated SBb). Cams 222, 223 and 224 are shown in their relative positions; cam 223 being shown in full lines in its inoperative position for perfector printing. Cam 224 is shown as adjusted on its arcuate track member 226 as in Fig. 17, this being the adjustment for the longest sheet which the press is designed to handle. Grippers 214b (designated collectively as G5) mounted on gripper shaft 207b, and cam lever 220b are shown in Fig. 27 with the cam roller 221b at the time the grippers G5 are opened ready to grasp the leading edge a of sheet S as it is being delivered from transfer cylinder T1; it being understood that the cam movement as described in the foregoing (see Figs. 5 and 6) will cause the grippers G3 on cylinder T1 to release the sheet at tangent point t2. The suction pipe 271 and its port 269 and air-pressure pipe 270 and its port 257 are represented in their relative positions in the stationary valve housing 266 (see Figs. 13 and 15). The peripheries of cylinders T1, T2 and T3 are indicated in solid lines in Fig. 27.

It should be noted that in all of the timing diagrams (Figs. 27, 28, 29, 30) only one set of grippers and its cooperating set of suction heads are represented since to indicate both sets of grippers and suction heads would tend to confuse. And it will be understood that each set of grippers with its cooperating set of suction heads operates in like fashion, one set following the other in angular rotation by 180°.

Referring again to Fig. 27 which represents the setting for perfector printing on the longest sheet the press is designed to handle, it will be seen that the angular setting of the suction heads is for the longest sheet the press will handle. The angular adjustment is performed by loosening the clamping screws 243 which clamp the hubs 242 of the suction head brackets 241 (see Figs. 13, 19) to main shaft 200 of cylinder T2. When the hubs are loosened all brackets move as a unit because they are all clamped to header pipes 252a and 252b. When in desired angular adjustment, the hubs 242 are then clamped.

Fig. 28 represents the parts shown in Fig. 27 in their relative positions when the trailing edge of the sheet has almost reached tangent point t3 and grippers G5 are ready to be opened to release the leading edge a of the sheet S, it being noted the cam roller 221b is just approaching cam face 224f for rocking gripper shaft 207b. Referring to Figs. 27 and 28, the sequence of the operation of the suction-blower mechanism may be described as follows: Immediately after the grippers G5 grasp the leading edge of sheet S delivered to cylinder T2 from cylinder T1 at tangent point t2, the sheet is carried on the periphery of cylinder T2 (which is rotating counterclockwise as viewed in Figs. 27 and 28). As the cylinder T2 rotates, the rotary valve 265 rotates with it about its axis. When the leading end of valve groove 268b reaches the suction port 269, this establishes suction in the groove 268b which is in communication with suction heads 240b (SBb) through port 275b, through pipe 261b, header pipe 252b and bores 247b. At this time the suction heads SBb will have rotated to a point beyond tangent point *t*2 and the trailing portion of the sheet will overlie the suction heads. The suction applied to the trailing portion of the sheet will cause the tail end of the sheet to hug the periphery of cylinder T2. The suction is continued in the heads SB*b* so long as valve groove 268*b* is in communication with the suction port 269. When the trailing end of groove 268*b* passes beyond suction port 269, the suction is cut off by the solid portion 259*b* of the rotary valve 265. This latter condition is illustrated in Fig. 28 wherein it will be seen that the suction is just about to be cut off and the leading end of groove 268*b* is about to reach the air-pressure port 257. At this time, the trailing edge of the sheet S is about to reach tangent point *t*3 between cylinders T2 and T3. Also grippers G5 are about to be opened by cam 224 to release the leading edge of the sheet. As cylinder T2 continues in its rotation grippers G5 are tripped by cam 224, releasing the leading edge of the sheet. In the meantime the perfector grippers G7 on cylinder T3 have grasped the trailing edge of the sheet. When the leading end of valve groove 268*b* reaches air-pressure port 257, air is blown through this groove, through port 275*b*, through pipe 261*b*, through header pipe 252*b*, through bores 247*b*, and finally through the suction heads SB*b*. Ordinarily the rotary valve is adjusted so that the leading end of groove 268*b* reaches air-pressure port 257 about one-eighth of an inch in advance of the trailing edge of the sheet reaching the tangent point *t*3. Air continues to be forced through suction heads SB*b* until the trailing end of valve groove 268*b* passes air-pressure port 257. In the meantime the trailing portion of sheet S is blown away from the periphery of cylinder T2 and also the trailing edge of the sheet has been grasped by the perfector grippers G7 on cylinder T3. Fig. 27 shows the trailing end of groove 268*b* approaching air-pressure port 257. When the trailing end of groove 268*b* passes air-pressure port 257, air pressure is shut off from groove 268*b* and hence from the suction heads SB*b*, but soon after this happens, the leading end of groove 268*b* will reach suction port 269 and the heads SB*b* will pass tangent point *t*2 between cylinders T1 and T2 ready to repeat the cycle.

In the meantime the other set of suction heads SB*a* and grippers G4 on cylinder T2 will travel and perform the same operations on alternate sheets delivered from cylinder T1, bearing in mind that cylinder T1 delivers a sheet each time it rotates a full revolution whereas cylinder T2 delivers two successive sheets to cylinder T3 for each revolution of cylinder T2. Therefore suction heads SB*a* and grippers G4 act only on every other sheet delivered from cylinder T1 and suction heads SB*b* and their cooperating grippers G5 act only on the other alternate sheets delivered from cylinder T1. In Fig. 28 one heavy black line represents a sheet S' being carried by the opposite set of grippers G4. Also, in perfector printing it should be borne in mind that two-color cam 223 is moved to its inoperative position as shown in full lines in Figs. 27, 28, 29 and therefore in perfector printing it serves no function.

Fig. 29 is a timing diagram to illustrate the operation of the suction-blower mechanism when the press is adjusted for perfector printing on the shortest sheets the press is designed to handle. The scheme employed for illustration in this figure is the same as that employed in Figs. 27 and 28. In this instance the suction heads are rotated on and relatively to main shaft 200 of cylinder T2 to bring them as close as possible to their respective cooperating grippers.

As pointed out above, the suction heads are angularly adjustable as a unit inasmuch as header pipe 252*a* is clamped to each of the suction head brackets and likewise header pipe 252*b* is clamped to each of the suction head brackets at the opposite side and these header pipes extend into registering bores in rotary valve bracket 263 (see Figs. 13, 16, 18, 19). By loosening clamp screws 243, the suction head brackets may be rotated on main shaft 200 within the limits of movement of header pipes 252*a* and 252*b* in the slots 253*a* and 253*b*. Consequently, for perfector printing on the shortest sheets the suction head brackets are rotated on and relatively to shaft 200 in counterclockwise direction (as viewed in Fig. 19) as far as possible and clamped. Of course, for sheets of intermediate lengths between shortest and longest, the suction heads are adjusted and clamped at the appropriate position relative to their respective grippers. Fig. 29, however, represents the adjustment for perfector printing on the shortest sheets.

Fig. 29 illustrates the conditions and relative positions of the various elements at the time the trailing edge of the sheet S reaches the tangent point *t*3 between cylinders T2 and T3 (the press being adjusted for perfecting). The leading end of rotary valve groove 268*b* is about to reach air-pressure port 257, cam roller 221*b* engaging the cam 224 ready to trip gripper shaft 207*b* to open grippers G5. It will be observed that cam 224 has been moved clockwise (as viewed in Fig. 29) from the position shown in Fig. 28. To make this adjustment cam 224 (see Fig. 17) is loosened by loosening screws 224*x* and moved clockwise along cam track 226 and then again secured in the desired position on the cam track so that cam 224 will trip cam lever 220*b* at the time the trailing edge of the sheet (see Fig. 29) reaches tangent point *t*3. It will be understood that cam 223 is in inoperative position for perfector printing.

When the leading end of groove 268*b* reaches port 257 air under pressure blows through suction heads SB*b* and blows the trailing portion of sheet S away from the periphery of cylinder T2 and meantime grippers G5 release the leading edge of the sheet and the trailing edge is grasped by the perfector grippers G7 of cylinder T3. Air under pressure continues to pass through suction heads SB*b* until valve groove 268*b* passes port 257. Meanwhile the grippers G5 approach tangent point *t*2 between cylinders T1 and T2 and are tripped at the tangent point to pick up an oncoming sheet from cylinder T1. Then as the sheet travels on cylinder T2, the leading end of valve groove 268*b* reaches suction port 269, and suction heads SB*b* reach the corresponding angular position and suction is applied to the trailing portion of the sheet which then overlies the suction heads SB*b*. Suction continues until the trailing edge of the paper reaches tangent point *t*3. This cycle is repeated for each revolution of cylinder T2 and, of course, the suction heads SB*a* and their cooperating grippers G4 go through the same cycle but 180° from the opposite group of heads SB*b* and grippers G4, one heavy line S' in Fig. 29 indicating a sheet being carried by grippers G4, 180° from grippers G5.

*Timing diagrams—second transfer cylinder—two-color printing*

Fig. 30 is a timing diagram illustrating the operation of two-color printing on the longest sheets the press is designed to handle. In this instance it will be observed that two-color cam 223 has been adjusted to operative position, that is in the position in which it will engage cam rollers 221*a* and 221*b* in their orbital path of travel (see Fig. 22). Also, it will be observed that suction heads SB*b* (and, of course, their corresponding opposite set SB*a*) have been angularly adjusted, as described in the foregoing, so that the trailing portion of the sheet S being printed will overlie suction heads SB*b* as the sheet is carried on cylinder T2.

In two-color printing, grippers G5 grasp the leading edge of the sheet S at tangent point *t*2 as it is delivered from transfer cylinder T1 to transfer cylinder T2. The sheet is carried on the periphery of cylinder T2 and immediately after the trailing edge of the sheet passes tangent point *t*2, the leading end of rotary valve groove 268*b* communicates with suction port 269, thereby producing suction in heads SB*b*. Suction is continued in the suction heads until the trailing end of groove 268b passes suction port 269. This happens just after the leading end of groove 268b reaches air-pressure port 257.

As shown in Fig. 30, cam roller 221b is approaching cam face 223f. As rotation of cylinder T2 continues, cam roller 221b engages cam face 223f and gripper finger shaft 207b is rocked to open grippers G5 at tangent point t3 between cylinders T2 and T3. Meantime two-color grippers G6 on cylinder T3 (see Fig. 2) grasp the leading edge of sheet S which is delivered to it by cylinder T2. (The adjustments for cylinder T3 are described hereinafter.) When the trailing edge of the sheet carried on cylinder T2 reaches tangent point t3, the trailing end of valve groove 268b will have passed suction port 269, and therefore suction is cut off from the suction heads SBb. Just before this takes place, the leading end of valve groove 268b will reach air-pressure port 257 and, as described above, air under pressure is forced through the heads and this quickly neutralizes the suction and releases the trailing portion of the sheet, the leading end of which has by that time been carried around on cylinder T3 by grippers G6 on that cylinder. Air continues to flow through the suction heads until the trailing end of valve groove 268b passes air-pressure port 257 but since the leading edge of the sheet has been delivered to cylinder T3 the air is merely dissipated to atmosphere while the suction heads SBb are traveling in the arc below the axis of cylinder T2 until it is cut off by the solid part 259b of the rotary valve as it passes port 257.

The opposite set of grippers G4 and suction heads SBa operate in the same fashion as grippers G5 and suction heads SBb but the cycle follows by 180°.

*Third transfer cylinder*

The third transfer cylinder T3 (see Figs. 31–47) comprises a main shaft 300 (see Fig. 31) mounted for rotation in journals 301 and 302 on operating side frame 40 and drive side frame 41 respectively. Mounted on and keyed to shaft 300 is a drive gear 521 described hereinafter in connection with the driving mechanism of the press. Fixedly mounted on main shaft 300 are a plurality of spaced disks, there being end disks 303 and 304, center disk 305, and intermediate sheet supporting disks 306 each of which has a hub portion 307 for clamping it to the shaft as by screws 308. A typical disk 306 is shown in Fig. 36 (see also Fig. 43) and it will be seen that each of the sheet supporting disks is interrupted or cut away at 309X at its sheet supporting periphery 309 to accommodate tumbling shafts 310 and 311 and their mountings; these shafts being mounted longitudinally of the cylinder T3 as described later. Tumbler shaft 310 is mounted for rotation about its axis in journal 312 carried on end disk 303 (on the operating side, see Figs. 31, 47); journal 313 carried on end disk 304 (on the drive side, see Figs. 31, 34, 42); and journal 314 on center disk 305 (see Fig. 31). Tumbler shaft 311 is mounted for rotation about its axis in corresponding opposite journal 315 (see Fig. 38) on end disk 303; journal 316 on end disk 304 (see Figs. 34, 42), and journal 317 on center disk 305. (This journal is opposite journal 314 (see Fig. 31) but is not seen as it lies behind journal 314 in this view.)

Adjustably clamped on tumbler shaft 310 are a plurality of gripper-finger-shaft tumbler brackets or arms 320, there being one at each end of the shaft 310 (see Figs. 31, 41, 42, 47) and two intermediate the ends. Likewise clamped on tumbler shaft 311 are a corresponding number of gripper-finger-shaft tumbler brackets or arms 321 oppositely disposed to those on shaft 310 but slightly offset (see Figs. 41, 42) so that the brackets of each oppositely disposed pair 320, 321 of brackets may be tumbled in and out without interfering with each other. A typical gripper-finger-shaft tumbling bracket (see Figs. 37, 46, 47) comprises a split hub portion 322, which may be clamped to the shaft as by a screw 323, an arm 324 extending from the hub portion, the arm having at its outer end a bore 325 in which a gripper-finger shaft may be mounted for rotation on its axis. Brackets 321 likewise have a bore 326 in which a gripper finger shaft may be mounted for rotation.

Also mounted on tumbler shaft 310 are a plurality of gripper pad brackets 340, there being one located at each of the sheet supporting disks 306 (see Fig. 31). There is a corresponding number of similar gripper pad brackets 341 mounted on tumbler shaft 311, there being one oppositely disposed to each gripper pad bracket 340 but slightly offset so that each bracket of each oppositely disposed pair may be rocked inwardly and outwardly without interference. A typical gripper pad bracket 340 (see Figs. 36, 43, 44, 45) comprises a split hub portion 342, an outwardly extending arm 343 and a gripper pad 344 and guide plate 345. A typical gripper pad bracket 341 comprises a split hub 346, arm 347, and gripper pad 348 and guide plate 349.

Mounted for rotation in the bores 325 of gripper-finger-shaft brackets 320 (on shaft 310) is a gripper finger shaft 350 (herein designated "perfector" gripper shaft). Mounted for rotation in the bores 326 of gripper-finger-shaft brackets 321 (on shaft 311) is a gripper finger shaft 351 (herein designated "two-color" gripper shaft). Mounted on perfector gripper shaft 350 are a plurality of "perfector" gripper fingers 352 and mounted on two-color gripper shaft 351 are a plurality of two-color gripper fingers 353. A typical perfector gripper finger 352 (see Fig. 43) comprises a split hub portion 354 which is clamped to the gripper shaft 350 as by screw 355, the tail of the hub 354 being connected by a compression spring 356 to its adjacent gripper pad bracket 340 so that shaft 350 is normally urged in clockwise direction. The gripper finger has a toe 357 which cooperates with and engages gripper finger pad 344 of its adjacent gripper pad bracket. There is a gripper finger 352 for each gripper pad bracket 340. The oppositely disposed two-color grippers 353 and cooperating gripper pad bracket is of the same construction but oppositely disposed on the two-color gripper finger shaft 351. It will be observed that the two-color grippers 353 and perfector grippers 352 form oppositely disposed pairs and they are offset as shown in Fig. 45.

It will be seen from the foregoing that upon rotation of tumbler shaft 310 counterclockwise (as viewed in the figures of the drawings) and of tumbler shaft 311 clockwise, the gripper shaft brackets 320 and 321 are rocked correspondingly to cause gripper finger shafts 350 and 351 to tumble inwardly. Also gripper finger shafts 350 and 351 may be rotated on their axes which will cause their respective gripper fingers to open and close with respect to their cooperating gripper pads.

*Tumbler mechanism—third transfer cylinder*

The means for rotating tumbler shafts 310 and 311 on their respective axes to rock arms 320 and 321 thereby to tumble gripper finger shafts 350 and 351, comprises mechanisms mounted on end disk 303 and shown perhaps best in Figs. 31, 38, 46, 47. The means for rotating gripper finger shafts 350 and 351 on their respective axes comprises mechanisms mounted on end disk 304 and shown perhaps best in Figs. 31, 33, 40, 41, 42.

Fixed to the end of perfector tumbler shaft 310 is a split hub pinion gear 360 (see Figs. 38, 46, 47) having gear teeth 361 which mesh with gear segment teeth 362 at the outer end of a segment gear arm 363 which is pivotally mounted at its opposite end for free rotation on a pivot pin 364 which is mounted on and extends through end disk 303. Also mounted for free rotation on pivot pin 364 is a cam roller arm 365 pivoted at one end on pin 364 and having a cam roller 366 at its opposite end. An adjustable stop 367 mounted on segment gear arm 363 limits counterclockwise rotation of cam roller arm 365. Secured to segment gear arm 363 is a bracket arm 368, to the outer end of which is pivotally secured a rod 369 which in turn is slidably secured in a post 370 extending outwardly from and fixed to the disk 303. A helical compression spring 371 is mounted on the rod 369, the ends of which engage a stop shoulder 372 on the rod 369 and the post 370. Consequently, spring 371 urges the gear segment arm 363 in a counterclockwise direction (viewed from the operating side as in Figs. 38 and 46). Mounted between bracket arm 368 and cam roller arm 365 in suitable pockets or seats 373 and 373x is a compression spring 374 which urges the cam roller arm 365 toward stop 367. An adjustable pinion gear stop 375 mounted on disk 303 limits rotation of perfector tumbler shaft 310 in clockwise direction. An adjustable stop 376 (Fig. 37) limits rotation of gripper shaft brackets 320 in counterclockwise direction. It will be seen from the foregoing description that the rotation of cam roller arm 365 in clockwise direction (as viewed in Figs. 38 and 46) about pivot 364 will cause compression spring 374 to move bracket arm 368 in clockwise direction about the same pivot against the force of compression spring 371 and at the same time gear segment arm 363 is rotated clockwise about the same pivot 364 and this will cause pinion hub 360 to rotate perfector tumbler shaft 310 in counterclockwise direction about its axis.

The tumbler mechanism for rotating tumbler shaft 311 is similar to the tumbler mechanism just described for rotating tumbler shaft 310 except it is other hand thereto; that is, the parts are image to each other, one being right hand, the other left hand. It is therefore deemed sufficient to state that pinion gear hub 380 (see Fig. 38) is secured to tumbler shaft 311. It has gear teeth 381 meshing with gear teeth 382 on gear segment arm 383 which is pivoted on pin 384, on which is pivoted cam roller arm 385 having cam roller 386. Cam roller arm 385 is limited in movement clockwise (as viewed in Fig. 46) by a stop 387. Bracket 388 secured to arm 383 is connected with a rod 389 in turn connected in guide post 390. A compression spring 391 is mounted on rod 389. A compression spring 394 is mounted between bracket arm 388 and cam roller arm 385. Adjustable stops 396 on the hubs of disks 303 limit rotation in clockwise direction of two-color gripper shaft brackets 321 (Fig. 37).

The cam rollers 366 and 386 on cam roller arms 365 and 385, during rotation of transfer cylinder T3, engage a stationary cam in the orbital path of travel of the rollers. This cam 400 (herein, for convenience of description, is referred to as the "perfector tumbler cam," see Figs. 31, 39, 47) comprises a plate having an internal cam face 401. The cam plate is secured by screws 402 to a supporting post 403 extending inwardly from side frame 40 so that the cam face lies in the orbital path of travel of cam rollers 366 and 386. The shape of the cam face 401 is as shown in Fig. 39 and is such that when the rollers engage and ride on the face, the gear segment arms 363 and 383 are actuated and they in turn cause the gripper shafts to tumble in and out as will be described further later on. The perfector tumbler cam 400 is used only when the press is set up for perfector printing. It is not necessary when the press is set up for two-color printing and is therefore removed, as tumbling action of the gripper shafts is then not necessary or desirable.

*Operation of the third transfer cylinder—perfector printing*

The arrangement of cams and cam roller arms connected with transfer cylinder T3 above described is such that in perfector printing the tumbler mechanism located on the operating side, during rotation of transfer cylinder T3, causes the gripper shafts 350 and 351 to tumble inwardly toward and outwardly from the center of the cylinder. The gripper finger actuating mechanism causes the perfector grippers to open just before they reach tangent point t3 between cylinders T2 and T3 and close upon the trailing edge of a sheet delivered by T2, then the perfector gripper shaft and the two-color gripper shaft are tumbled in toward the axis of cylinder T3, the two-color shaft slightly in advance of the perfector gripper shaft. When in their innermost position the perfector gripper fingers release the sheet and the two-color gripper fingers grasp the sheet. The gripper finger shafts return to their outward positions, the two-color gripper fingers reaching their normal outward position at the tangent point t4 between cylinders T3 and I2.

*Gripper actuating mechanism—third transfer cylinder*

Means for actuating the gripper fingers of transfer cylinder T3 are located on the drive side of the press. The arrangement is such that for perfector printing, the perfector gripper fingers (G7) receive the tail end of a sheet from transfer cylinder T2, then perfector gripper shaft 350 and two-color gripper shaft 351 are tumbled inwardly toward each other by the tumbler mechanism described above. When in their innermost position perfector gripper fingers (G7) release the sheet and two-color gripper fingers (G6) grasp the sheet. Then two-color gripper shaft 351 is returned to its outermost position before the then leading edge of the sheet reaches tangent point t4 between transfer cylinder T3 and impression cylinder I2 (see Fig. 3) at which point the two-color grippers (G6) release the sheet to impression cylinder I2.

The mechanism for actuating the gripper fingers comprises cams and cam levers, etc., as follows: Mounted on the end of perfector gripper shaft 350 is a split hub cam arm 410 clamped at its inner end to the gripper shaft and having a cam roller 412 at its outer end. (See Figs. 40, 41, 42.) Mounted on the end of two-color gripper shaft 351 is a similar oppositely disposed cam arm 411 having a cam roller 413. Mounted for rotation on the end of tumbler shaft 310 is a cam plate 414 and a similar cam plate 415 is mounted for rotation on tumbler shaft 311. Cam plate 414 is rotatable on shaft 310 and cam plate 415 is rotatable on shaft 311. Secured to cam plate 414 is a cam ring 416 which is provided with an external cam face having a high face portion 417 and a low face portion 418. Likewise secured to cam plate 415 is a cam ring 416x having a high face portion 419 and a low face portion 420. Extending radially from the periphery of cam plate 414 is an arm 422 having a bore to accommodate a pin 424 to link the arm 422 to a link 421 comprising two parts 421x and 421y. Cam plate 415 has a similar arm 423 having a bore to accommodate a pin 425 to pivotally connect arm 423 to the link 421, said link having corresponding bores. Cam plate 415 has also a radially extending arm 426 linked to a rod 427, which extends through a post 427x providing a shoulder against which a compression spring 428 on rod 427 may abut. The post 427x is mounted on end disk 304 (see Figs. 33 and 34). This spring 428 urges cam plates 414 and 415 to rotate in clockwise direction on shafts 310 and 311 (as viewed in Fig. 40). Link 421 is pivotally secured to a cam roller arm 430 at 431 which arm 430 is pivotally mounted at its opposite end on a pivot pin 432 extending through and carried by end disk 304 (see Figs. 31, 33 and 34). Cam roller arm 430 intermediate its ends has a cam roller 433 mounted for rotation on a stub pin 434 extending through the arm (see Fig. 42). An adjustable stop 435 mounted on end disk 304 limits the movement of cam roller arm 430 in an inward direction toward the center of cylinder T3. Mounted in the plane of the orbital path of travel of cam roller 433 is stationary cam 436. This cam is removably secured to a sleeve bracket 437, as by screws 438 (see Figs. 32 and 42). Sleeve bracket 437 is secured to side frame 41 and main shaft 300 of cylinder T3 extends through it. Cam 436 is made in two half parts 436a and 436b. The reason for this is that the cam 436a—436b as shown in Figs. 32 and 40 is used for perfector printing, whereas in two-color printing part 436b is removed and replaced by another half part 436c (see Fig. 59). It will be noted that the face of half part 436b (for perfector printing) differs in shape from the face of half part 436c which is substituted for 436b in two-color printing. Referring now more particularly to Fig. 32, the perfector cam 436 has alternate high and low face portions 440, 441, 442, 443, 444.

*Timing diagrams—third transfer cylinder—perfector printing*

The details of the operation of the third transfer cylinder T3 in perfector printing may perhaps be best understood by reference to Figs. 48 to 57 which are operating and timing diagrams shown in the positions of various parts, more or less schematically as a sheet progresses from transfer cylinder T2 to impression cylinder I2. The operation of cylinder T2 is described above in connection with the operating and timing diagrams Figs. 27–30.

Referring first to Figs. 48 and 49, the former represents the conditions of the tumbling mechanism when the tail end b of sheet S traveling on transfer cylinder T2 reaches the tangent point t3 between cylinders T2 and T3. Grippers G7 have grasped the tail end b of the sheet. Fig. 49 represents the relative positions of the gripper finger actuating mechanism on the drive side at the same time.

Cam roller 366 is engaging cam face 401 of tumbler cam 400 on the operating side of the press. The cam face (indicated by dotted lines) at this place permits spring 371 to swing gear segment arm 363 inwardly on its pivot 364. Pinion hub 360 has thereby rotated perfector tumbler shaft 310 clockwise on its axis as far as possible. Cam roller 386 is engaging cam face 401 and at this place spring 394 is exerting a force against gear segment arm 383, overcoming the force of compression spring 391 and is swinging segment arm 383 outwardly on its pivot 384. At this time tumbler shaft 311 is being rotated in clockwise direction. Rotation of shaft 310 counterclockwise will cause the perfector gripper shaft 350 to tumble inwardly on brackets 320. Rotation of shaft 311 clockwise has caused the two-color gripper shaft 351 to tumble inwardly on brackets 321, it being noted that two-color gripper shaft 351 thus moves in slightly in advance of perfector gripper shaft 350. In the meantime cam roller 433 (see Fig. 49) has passed the high face portion 442 on cam 436 (gripper perfector cam on the drive side of the press, shown in full line) where perfector grippers G7 had opened prior to reaching tangent point t3 as indicated in dotted lines 352X. In Fig. 48, grippers G7 have reached tangent point t3 and grasped the tail end b of the sheet S, because when cam roller 433 (see Fig. 49) enters the low face portion 443 of cam 436, cam arm 430 is swung inwardly on its pivot 432 by spring 428. This causes link 421 to rotate cams 414 and 415 which are freely rotatable on tumbler shafts 310 and 311. At this time cam roller 412 is engaging the low face portion of cam 414 in which position cam roller arm 410 maintains gripper shaft 350 in position to hold gripper fingers 352 (G7) closed thereby holding the edge b of sheet S on the cooperating gripper pads.

As cylinder T3 continues in its rotation from the position shown in Figs. 48 and 49, the gripper shafts 350 and 351 continue in their tumbling movement toward the center of the cylinder. The relative positions of the various parts when cylinder T3 has rotated through the angle from A to B are represented in Figs. 50 and 51. As indicated, air is being forced through suction heads SBb to blow the trailing portion of the sheet S from the periphery of transfer cylinder T2; the leading edge a of the sheet S having been released by the grippers of cylinder T2 when the trailing edge b reached tangent point t3. The trailing edge b of the sheet is being held by grippers G7. Meantime, cam roller 386 has advanced along cam face 401, causing segment gear arm 383 to swing further outwardly on its pivot 384 and hence two-color tumbler shaft 311 to rotate further in clockwise direction, thus rocking brackets 321 further inwardly to tumble two-color gripper shaft 351 inwardly. Two-color gripper fingers 353 (G6) are open, it being noted that cam roller 433 (see Fig. 51) of cam roller arm 430 (on disk 304 of cylinder T3) is in engagement with high face portion 444 of cam 436 (fixed on the frame on the drive side) so that link 421 has rotated cams 414 and 415 counterclockwise about tumbler shafts 310 and 311, and cam roller 413 is engaging high face portion 419 of cam 415 and cam roller 412 is engaging the low face portion 418 of cam 414.

Meantime cam roller 366 is forcing gear segment arm 363 outwardly about its pivot 364 and this rotates perfector tumbler shaft 310 counterclockwise so that perfector gripper shaft 350 is tumbling inwardly while gripper fingers 352 (G7) remain closed since cam roller 412 is then riding on low face portion 418 of cam 414.

As the cylinder T3 continues in its rotation the tumbler shafts 310 and 311 continue to rotate and consequently the gripper finger shafts 350 and 351 continue to tumble inwardly, the two-color shaft 351 slightly in advance of perfector gripper shaft 350. The relative positions of the parts when cylinder T3 has rotated through an angle from A to C is represented in Figs. 52 and 53. At this position the edge b of the sheet is being transferred from perfector gripper G7 to two-color grippers G6, tumbler shaft 310 having been rotated its full limit counterclockwise and tumbler shaft 311 its full limit clockwise, on their respective axes. Here it will be seen that gear segment tumbler arms 363 and 383 have reached their limits of outward movement. Gripper fingers 352 (G7) and gripper fingers 353 (G6) are closed on their respective gripper pads 344 and 348, and grasping the now leading edge b of the sheet S, the gripper pad brackets 340 and 341 on tumbler shafts 310 and 311 being in the position shown in Fig. 52. The gripper fingers G6 and G7 are closed since cam rollers 412 and 413 are now engaging the low face portions 418 and 420 of cams 414 and 415, it being noted that cam roller 433 of cam arm 430 is now riding down from high face portion 444 of cam 436 so that link 421 has rotated cams 414 and 415 to the positions shown in Fig. 53. Air is still being forced through suction heads SBb of transfer cylinder T2.

As cylinder T3 continues in its rotation grippers G7 open, grippers G6 remain closed on the sheet, gripper shafts 350 and 351 then tumble outwardly; shaft 351 moving outwardly slightly in advance of the outward movement of shaft 350. The relative positions of the parts when cylinder T3 has rotated through an angle A to D are represented in Figs. 54 and 55. Cam roller 386 is in engagement with cam face 401 and at this place spring 391 urges gear segment arm 383 inwardly on pivot 384 and hence tumbler shaft 311 is rotating counterclockwise on its axis and moving gripper fingers 353 (G6) and their cooperating pads and brackets 341 outwardly toward the periphery of the cylinder T3, meanwhile still grasping the sheet S. Meantime cam roller 366 permits spring 371 to urge gear segment arm 363 inwardly about its pivot 364. This causes perfector tumbler shaft 310 to rotate clockwise about its axis, returning gripper finger shaft 350 toward the periphery of cylinder T3; the gripper fingers 352 (G7) having previously released the sheet to grippers G6. Meanwhile grippers G6 are maintained in closed position still holding edge b of sheet S since cam roller 413 (see Fig. 55) is still riding on low face portion 420 of cam 415; cam roller 433 now engaging high face portion 440 of cam 436 so that cam arm 430 has moved link 421 and hence cams 414 and 415 to the positions shown in Fig. 55.

As cylinder T3 continues in its rotation, tumbler shafts 310 and 311 are rotated back to their normal position and perfector gripper shaft 350 and two-color gripper shaft 351 are returned to their normal positions toward the periphery of cylinder T3. The relative positions of the parts at the time the now leading edge $b$ of sheet S (originally the trailing edge while the sheet was traveling on cylinder T2) reaches the tangent point $t4$ (between cylinders T3 and I2) is represented in Figs. 56 and 57. At this point the now leading edge $b$ of the sheet is delivered to the second impression cylinder I2 at tangent point $t4$. Cam rollers 366 and 386 have now reached the place on cam face 401 which permits gear segment arms 363 and 383 to return to their outermost or normal positions; tumbler shafts 310 and 311 likewise are angularly rotated to their normal positions, gripper finger shafts 350 and 351 are now at their outermost positions and consequently grippers G6 and G7 are likewise at their normal positions toward the periphery of cylinder T3. Cam roller 433 as shown in Fig. 57 has reached a place when it is ready to ride down into low face portion 441 of cam 436. Cam arm 430 has moved link 421 so that cams 414 and 415 are in positions shown in Fig. 57, it being noted that cam roller 412 is engaging low face portion 418 of cam 414 (and therefore grippers G7 are closed) and cam roller 413 is engaging low face portion 420 of cam 415 (and therefore grippers G6 are still closed on the sheet).

Immediately cam roller 433 rides down to low face portion 441 (see Fig. 57), cam arm 430 moves inwardly about its pivot 432. This causes link 421 to rotate cams 414 and 415 (rotatable on tumbler shafts 310 and 311) so that cam roller 413 rides up on to high face portion 419 of cam 415. This causes gripper shaft 351 to rotate in clockwise direction on its axis. Upon this clockwise rotation of shaft 351 the two-color gripper fingers 353 (G6) mounted on this shaft are rocked correspondingly against the force of springs (spring 356 shown in Fig. 43), to open the gripper fingers 353, there being a like spring connected to each of the two-color gripper fingers 353 and perfector gripper fingers 352.

Meantime the now leading edge $b$ of the sheet S has been grasped by the gripper fingers G8 (see Fig. 1) on impression cylinder I2 which are of customary construction known in the art, the gripper fingers G8 being actuated by a cam arrangement as described in connection with transfer cylinder T1, and the sheet is then carried around on cylinder I2 in usual and known manner where it is printed. However, it will have been noted that in transferring sheet S from transfer cylinder T3 to impression cylinder I2, the sheet will have been turned over so that the reverse side is printed on the second impression cylinder I2.

*Adjustment of cams—two-color printing*

In two-color printing, that is, printing one color on the obverse side of a sheet in the first printing unit and then printing the same or a different color on the same (obverse) side of the sheet in the second printing unit, it is necessary to change the fixed cams associated with the third transfer cylinder, and to adjust the movable cams associated with the second transfer cylinder, and also to adjust the relative angular positions of the transfer cylinders. Fixed cam 400 (see Figs. 31, 39) on the operating side of the press is removed. Then there is no means for actuating the segment arms 363 and 383 and they remain in their innermost positions as shown in Fig. 38. The tumbler shafts 310 and 311 will then remain in this position (that is, they do not rotate on their axes notwithstanding the rotation of cylinder T3). Consequently, tumbler brackets 320 and 321 (see Fig. 37) do not rock but remain in their outermost positions toward the periphery of cylinder T3. However, perfector gripper finger shaft 350 and two-color gripper finger shaft 351 (see Fig. 43) are free to rotate on their respective axes.

Fixed cam 436 (see Figs. 31, 32, 42) is also changed for two-color printing. Half part 436b (shown in Fig. 32) is removed and replaced by a half cam part 436c (see Fig. 59) so that the full cam will now comprise parts 436a and 436c as shown in full line in Fig. 59.

The arrangement of the cams associated with transfer cylinder T2 in two-color printing has been described in the foregoing. Suffice it to say here that cam plate 223 (see Fig. 22) which is mounted on side frame 41 is adjusted as shown in Fig. 22 so that its high face portion 223f is positioned in the orbital path of travel of cam rollers 221a and 221b. When so adjusted, grippers G4 and G5 on transfer cylinder T2 are actuated to release the leading edge $a$ of sheet S to transfer cylinder T3 at tangent point $t3$ between cylinders T2 and T3 (see Fig. 30).

Proper angular adjustment having been made (as described hereinafter in further detail), the leading edge $a$ of the sheet S (in two-color printing), is delivered by transfer cylinder T1 to transfer cylinder T2 at tangent point $t2$, in the same way as for perfector printnig. It will be understood, of course, that the sheet has been printed on the obverse side in the first printing unit. Assuming grippers G5 have taken the leading edge $a$ of the sheet as shown, for example, in Fig. 30, the leading edge $a$ of the sheet S is delivered to transfer cylinder T3 because cam face 223f will have caused grippers G5 to open and release the sheet at tangent point $t3$.

*Timing diagrams—third transfer cylinder—two-color printing*

Referring now to Figs. 58 and 59 which represent the relative positions of the parts of transfer cylinder T3 at the time the leading edge $a$ of the sheet is delivered to the two-color grippers G6 of cylinder T3, it will be noted that cam 401 has been removed. Consequently, gear segment arms 363 and 383 do not swing inwardly or outwardly but remain in the relative position shown in Fig. 58. Hence, tumbler shafts 310 and 311 do not rotate on their axis in their circular orbital path of travel when transfer cylinder T3 rotates. As a result, perfector gripper finger shaft 350 and two-color gripper finger shaft 351 do not tumble inwardly or outwardly but travel in a circular orbital path as cylinder T3 rotates. However, the gripper finger shafts are free to rotate on their respective axes to open and close their gripper fingers. The gripper finger shafts are then actuated by the cam arrangement on the drive side of cylinder T3 cooperating with cam 436a–c (see Fig. 59) which is fixed to the side frame on the drive side of the press.

As indicated in Fig. 59 cam roller 433 of cam arm 430 has passed low face cam portion 443x and is about to ride up onto high face portion 444x. Inasmuch as gripper fingers 352 (G7) (although actuated in two-color printing) do not perform any function of grasping the sheet, their action need not be described further than to say that they are tripped by the various cam movements but the movement does not interfere in any way with the action of gripper fingers 353 (G6) which are the only ones which act upon the sheet in two-color printing. While the cam roller 433 is riding on low face portion 443x, cam lever arm 430 causes link 421 to rotate cams 414 and 415 to a position where the cam roller 413 of cam arm 411 rotates two-color gripper finger shaft 351 to maintain gripper fingers 353 open. As shown in Fig. 59, with roller 433 riding up on high face portion 444x, the roller 413 is riding on low face portion 420; therefore, fingers 353 are closed on leading edge $a$ of the sheet S. As cylinder T3 continues in its rotaiton, cam roller 433 continues to ride on high face portion 444x of cam 436a–c until it reaches offset 444 where it drops on to low face portion 441. When this happens link 421 rotates cam 415 on two-color shaft 311 so that cam roller 413 rides up onto high face portion 419 of cam 415, thus rotating two-color gripper finger shaft 351 to open gripper fingers 353 (G6) to release the leading edge *a* of sheet S to the grippers G8 on the second impression cylinder I2. The actuation to open two-color grippers G6 takes place when these grippers have reached the tangent point *t*4 between cylinders T3 and I2, and is similar to that shown in Fig. 57.

The leading edge *a* of sheet S having been delivered to grippers G8 on cylinder I2, the sheet is carried around on cylinder I2 in the usual and known way and given a second impression on the same side (obverse side) as printed in the first printing unit. It is then delivered to the sheet delivery mechanism (see Fig. 2).

After the two-color grippers G6 pass the tangent point *t*4 they remain partially closed until just before they reach tangent point *t*3 between cylinders T2 and T3. In the meantime cam arm 430 has rotated cam 415 through link 421 so that gripper fingers are opened to receive a sheet from transfer cylinder T2 and closed on the leading edge of the oncoming sheet at tangent point *t*3 between cylinders T2 and T3 and the cycle repeated.

*Drive mechanism and index dials*

The general arrangement of the driving mechanism of the press is illustrated in Fig. 60, which is an exploded view and primarily schematic for simplification. Reference is also made to other figures, wherein similar reference characters denote similar parts.

The press is driven by a prime mover, in this instance shown as a motor 500 having drive pulleys 501 over which are trained V-belts 502 which in turn drive pulleys 503 fixed to an end of a cross shaft 504 extending crosswise under the press from the drive side to the operating side. Keyed to the cross shaft is a pinion gear 505 meshing with a gear 506 keyed to a stub shaft 507. Cross shaft 504 extends through a journal 508 in side frame 40 and stub shaft 507 through a journal 509 (see Fig. 13). Mounted on stub shaft 507 on the inside of side frame 40 are two pinion gears 510 and 511. Pinion 510 is keyed to stub shaft 507 whereas pinion 511 is not keyed but may be rotated on this shaft. However, pinion 511 may be locked to the shaft 507 or unlocked therefrom for free rotation upon it.

The arrangement for locking pinion 511 to stub shaft 507, and unlocking it for free rotation, is shown best in Fig. 14 wherein it will be seen that pinion 511 has an outwardly extending ring flange 512 which has a hollow conically shaped and outwardly flared internal bore 513. Fitted into this conical bore is a hollow split conically shaped clamping cone 514, the external surface of which engages the internal surface of bore 513. The clamping cone 514 has an annular groove 515 into which fits an annular flange 516 on an internally threaded clamping nut 517, having a locking set screw 517X. The clamping nut 517 threads on threads 518 on the end of stub shaft 507, it being noted also that the end of the shaft is provided with a squared end portion 519 on to which a key crank may be placed to facilitate rotation of the stub shaft when it is desired to rotate the press manually for adjusting the relative angular positions of the cylinders of the two printing units.

When clamping nut 517 is tightened on shaft 507, clamping cone 514 is forced inwardly against the flared internal surface 513 of pinion 511 thus locking the pinion to the shaft. In this case both pinions 510 and 511 rotate with shaft 507 as a unit. When the clamping nut is loosened, this unlocks pinion 511 from stub shaft 507 and permits pinion 511 to rotate freely on the stub shaft, but pinion 510 must rotate with this shaft because it is keyed to it.

Keyed pinion gear 510 meshes with a large drive gear 520 which is mounted for free rotation on main shaft 200 of transfer cylinder 21 (T2) (see Fig. 13). Gear 520 meshes with a drive gear 521 keyed to main shaft 300 of transfer cylinder 22 (T3). Gear 521 meshes with a drive gear 522 keyed to main shaft 523 of impression cylinder 23 (I2) and gear 522 meshes with a drive gear 524 keyed to the main shaft 525 of blanket cylinder 24. Gear 524 meshes with gears (not shown in Fig. 60) through the usual and well known train for driving the form cylinder 25 and inkers 28, and sheet delivery mechanism 32 of the second printing unit (see Fig. 3). It will now be seen that upon rotation of stub shaft 507 drive gear 520 may rotate freely on shaft 200 and at the same time the cylinders of the second printing unit must also rotate in unison.

Pinion gear 511 meshes with a large drive gear 530 which is keyed to main shaft 200 of transfer cylinder 21 (T2). Gear 530 meshes with a drive gear 531 keyed to main shaft 100 of transfer cylinder 20 (T1). Gear 531 meshes with a drive gear 532 keyed to main shaft 533 of impression cylinder 15 (I1) and gear 532 meshes with drive gear 534 keyed to main shaft 535 of pick-up cylinder 14. Gear 532 meshes with a drive gear keyed to the main shaft of blanket cylinder 18 (not shown in Fig. 60) and through the usual and known train of gears for driving the blanket, and form cylinders 18 and 17 and inkers 16 (see Fig. 3). Also, the train of gears of the first printing unit is arranged to drive the sheet feeding mechanism in usual and known manner.

It will now be seen that when pinion 511 is locked to stub shaft 507, gear 530 drives transfer cylinder 21 (T2), transfer cylinder 20 (T1), and the entire first printing unit and at the same time gear 520 drives transfer cylinder 22 (T3) and the entire second printing unit so that both printing units operate in unison. When pinion 511 is unlocked from stub shaft 507, rotation of shaft 507 will rotate the second printing unit but the first printing unit will remain at rest. Thus it is seen that the angular positions of the cylinders of the first printing unit may be adjusted as a whole relatively to the angular positions of the cylinders of the second printing unit as a whole. This is used when changing the press from a two-color to a perfector press or vice versa.

To facilitate the adjustment of the relative positions of the two printing units for two-color printing or for perfector printing, there is provided indexed dials, one of which is fixedly secured to the end of main shaft 100 of transfer cylinder 20 (T1) and accessible at the operator's side of the press. Such a hand wheel dial 540 (herein called the "first printing unit dial") is illustrated in Fig. 60 which is an exploded view, it being noted that dot-dash line 541 indicates that the hand wheel dial 540 is mounted on the end of shaft 100. Another indexed hand wheel dial 542 (herein called the "second printing unit dial") is fixedly secured to the end of main shaft 300 of transfer cylinder 22 (T3) and also accessible at the side of the press; dot-dash line 543 indicating in the exploded view that hand wheel dial 542 is mounted on the end of shaft 300. Indexed dial 540 cooperates with a fixed reference pointer 544 on the side frame and indexed dial 542 cooperates with a fixed reference pointer 545 on the side frame. The periphery of the first unit hand wheel dial 540 carries a linear index 546 (labeled P), used in setting the press for perfector printing; each division representing one inch with relation to the length of the sheet to be printed. Dial 540 also carries a two-color index mark 547 (labeled T—C), used in setting the press for two-color printing. The periphery of the second unit hand wheel dial 542 carries a perfector index mark 548 (labeled P), used in setting the press for perfector printing, and a two-color index mark 549 (labeled T—C), used in setting the press for two-color printing.

Dial 540 is set and fixed on shaft 100 so that the index mark 547 (labeled T—C) registers with the reference pointer 544 (fixed to the side frame) when the gripper fingers G4 or G5 of transfer cylinder T2 are at the tangent point *t*3 between transfer cylinder T2 and transfer cylinder T3. The lineal peripheral index 546 is positioned on the dial 540 so that it corresponds to the angular amount transfer cylinder T2 must be changed in order to carry the trailing edge of a sheet to tangent point $t3$ before the sheet is released from transfer cylinder T2.

Dial 542 is set and fixed on shaft 300 so that index mark 549 (labeled T—C) registers with reference pointer 545 (fixed to the side frame) when two-color gripper fingers G6 of transfer cylinder T3 are at the tangent point $t3$ between transfer cylinder T2 and transfer cylinder T3. Index mark 548 (labeled P) is placed on the dial to register with reference pointer 545 when perfector gripper fingers G7 are at the tangent point $t3$ between cylinders T2 and T3. The use and operation of these hand wheel dials 540 and 542 is described later in connection with the adjustment and operation of the press.

*Setting up and operation of press—two-color printing*

In setting up the press for two-color printing the press is rotated so that the index mark 547 (T—C) on the first printing unit dial 540 registers with fixed finger pointer 544 on the side frame. Lock nut 517 is loosened to release clamping cone 516 which permits pinion gear 511 to rotate freely on pinion drive stub shaft 507. Now, the first printing unit remains at rest while the second printing unit may be rotated. Then the second printing unit is rotated by hand until the index mark 549 (T—C) on the second printing unit dial 542 registers with fixed finger pointer 545 on the side frame. Re-engage pinion 511 to pinion drive shaft 507 by tightening lock nut 517 so that cone 516 locks pinion 511 to the shaft. Rotate hand lever 236 counterclockwise (as viewed from the drive side of the press) until it engages stop 273. This rotates cam plate 223 on its pivot 225x so that its effective cam face 223f is in the orbital path of travel of cam rollers 221a and 221b (as shown in Fig. 22; see also Figs. 13, 21, 23), so that girppers G4 and G5 on transfer cylinder T2 release the leading edge of the sheet from transfer cylinder T2 to two-color grippers G6 at tangent point $t3$ after grippers G6 have closed on the leading edge of the sheet. Normally, no adjustment need be made for rotating the suction heads SBa and SBb of transfer cylinder T2, as in general there will be no need to hold down the trailing edge of the sheets on cylinder T2. However, in some cases, where, for example, there has been a solid ink coverage of the sheet, it will be of advantage to provide suction on the trailing edge of the sheet to keep it from flapping. The suction heads can then be used to advantage. They may be rotated about main shaft 200 of cylinder T2 to the position where they will engage the trailing portion of the sheet. This may be done by loosening screws 243 to unclamp the suction head brackets 241 (see Figs. 13, 19) from main shaft 200, rotating the suction heads SBa and SBb bodily to proper position and then reclamping brackets 241 to shaft 200 by screws 243. Remove tumbler cam 400 (see Figs. 31, 39) located on the inside of side frame 40 on the operating side of the press. For two-color operation no tumbling of gripper finger shafts 350 and 351 is needed. Install half cam part 436c (see Fig. 59) in place of cam part 436b (see Fig. 32) so that cam 436 (see Fig. 31) which is fixedly mounted on bracket 437 (on the drive side frame 41) comprises half cam parts 436a and 436c as shown in Fig. 59.

After making the known normal routine adjustments such as adjusting the feeder and registering mechanisms and the form plates on both printing units, the press operates as a two-color press as follows:

Sheets S from a pile are fed down the feed board 13 in succession, one for each revolution of the press. The travel of a typical sheet S through the press will illustrate the entire operation. Reference may be had to Figs. 1 and 2 wherein the arrows represent the direction of rotation of the various cylinders. The leading edge $a$ of sheet S is first registered and picked up by pick-up cylinder 14 in known fashion by grippers G1 on this cylinder and delivered to grippers G2 on the first impression cylinder 15 (I1) on which it is carried and is printed on the obverse side by contact with blanket cylinder 18. After the impression, the grippers on cylinder I1 deliver the leading edge $a$ of the sheet to grippers G3 on the first transfer cylinder 20 (T1) (see also Figs. 3 and 5 to 12). The leading edge $a$ of the sheet is delivered to grippers G3 on cylinder T1 at tangent point $t1$; grippers G3 being opened just before reaching the tangent point $t1$ by reason of actuation of cam lever 114 whose roller 115 engages cam 116. Grippers G3 close on the leading edge of the sheet and then grippers G2 immediately open to release the sheet.

The sheet (now printed on the obverse side) is carried around on the first transfer cylinder T1 and its leading edge $a$ is delivered to one set of the two sets of grippers G4 and G5. In this particular instance it may be assumed that the sheet is grasped by grippers G5 to conform with the detailed description of operating diagram Fig. 30. Grippers G3 on transfer cylinder T1 remain closed on the leading edge of the sheet until it reaches tangent point $t2$ between cylinders T1 and T2. Grippers G5 of cylinder T2 open just prior to the time they reach tangent point $t2$ and then close at the tangent point on the leading edge $a$ of the sheet and immediately after grippers G5 have grasped the sheet, grippers G3 open. Grippers G5 are closed by reason of actuation of cam lever 220b whose roller 221b engages the cam face 222f of fixed cam 222 on the drive side frame 41 (see Figs. 13, 22). Grippers G3 on transfer cylinder T1 are opened by reason of actuation of cam lever 114 whose roller 115 engages cam 116 on the drive side frame 41 (see Figs. 5, 6, 12).

Grippers G5 on transfer cylinder T2 remain closed on the leading edge $a$ of the sheet as it is carried on the cylinder until the leading edge $a$ reaches tangent point $t3$ between cylinders T2 and T3. If the suction is applied to the suction heads (although this may not be necessary), suction is applied through suction heads BSb which travel under the trailing portion of the sheet. Suction is applied until the trailing portion of the sheet reaches tangent point $t3$ when air pressure is applied through the suction heads SBb to clear out the partial vacuum. This operation is controlled by the rotary valve 265 and its arrangement heretofore described.

Just prior to the time grippers G5 reach tangent point $t3$ between cylinders T2 and T3, two-color grippers G6 on transfer cylinder T3 open and at the tangent point grippers G6 close on the leading edge $a$ of the sheet (Fig. 58). Immediately after grippers G6 grasp the sheet, grippers G5 on cylinder T2 open and release the sheet. Grippers G6 on cylinder T3 are opened and closed at this place by reason of actuation of two-color cam lever arms 411 whose roller 413 engages cam 415 rotatable on shaft 311 on cylinder T3 which cam 415 is actuated by link 421 connected to cam lever arm 430 pivoted to disk 304 on cylinder T3, whose cam roller 433 engages cam 436 (now consisting of half cam part 436a and half cam part 436c) which is fixed to operating side frame 41, (see Figs. 31, 59). Grippers G5 on transfer cylinder T2 are actuated at this place by reason of actuation of cam lever arm 220b whose roller 221b engages cam face 223f of cam plate 223 which is pivoted to side frame 41 and which has, as stated, been moved to operative position by handle lever 236 (see Figs. 13, 21, 22, 23).

Two-color grippers G6 on transfer cylinder T3 remain closed on the leading edge $a$ of the sheet until they reach tangent point $t4$ where gripper fingers G8 on the impression cylinder I2 of the second printing unit are opened just prior to reaching the tangent point $t4$ and at the tangent point are closed on the leading edge $a$ of the sheet. Immediately after grippers G8 on cylinder I2 grasp the sheet, two-color grippers G6 on transfer cylinder T3 are opened to release the sheet. Grippers G8 on cylinder I2 are opened and closed by reason of actuation of a cam lever arm whose roller engages a fixed cam on the drive side of the press. This cam and cam lever arrangement is substantially the same as that for actuation of grippers G3 on transfer cylinder T1. Furthermore, this arrangement is well known in the art and it is deemed unnecessary to describe or illustrate it in further detail.

The sheet is then carried on the second impression cylinder I2 by grippers G8 which remain closed on the leading edge $a$ of the sheet until they reach the sheet delivery mechanism 32 where grippers G8 are opened to release the sheet to grippers on the delivery mechanism in known fashion. In the meantime, the sheet has been printed (given a second impression) on the same obverse side of the sheet as it is carried around on cylinder I2 in contact with blanket cylinder 24.

As mentioned in the foregoing, a sheet is fed to the press for each revolution. It will have been observed, however, that transfer cylinder T2 has a diameter about twice that of the other cylinders and that it is arranged with two sets of grippers G4 and G5 and two sets of suction heads SB$a$ and SB$b$. Consequently, transfer cylinder T1 delivers a sheet to grippers G4 on cylinder T2 only on every other revolution of cylinder T1 and on the alternate revolutions of cylinder T1, it delivers a sheet to grippers G5 on cylinder T2. And it will be understood, of course, that inasmuch as a sheet is fed to the press for each revolution and a sheet delivered from the press for each revolution, there are a number of sheets progressing through the press in timed relation at any given time.

*Setting up and operation of press—perfector printing*

In making ready, setting up, and adjusting the press for perfector printing, it is important first to measure accurately (within one-thirty-second of an inch) the length of the sheet to be printed (measured in the direction of travel of the sheet through the press). It may be noted here that the press selected for illustrative purposes herein is designed to handle sheets 11″ x 17″ to 23″ x 36″.

In setting up, rotate the press until the first printing unit dial 540 reaches a position where the fixed pointer 544 registers with the linear index 546 at the index mark indicating the length of the sheet measured.

Disengage drive pinion 511, by loosening locking nut 517, which releases clamping cone 514. This permits free rotation of pinion 511 on shaft 507 and hence the first printing unit now will remain at rest.

Rotate the second printing unit to the position where index mark 548 (labeled P) of second printing unit dial 542 registers with fixed pointer 545. This will bring perfector grippers G7 to the place where they will reach tangent point $t3$ between cylinders T2 and T3 at the time the trailing end of a sheet carried on T2 reaches this tangent point.

Tighten locking nut 517 to lock pinion 511 to shaft 507 through clamping cone 514.

Rotate lever handle 236 clockwise (viewed from the drive side) until it engages stop 272 (as shown in Fig. 60). This rotates cam plate 223 on its pivot 225$x$ inwardly so that its cam face 223$f$ is in inoperative position out of the orbital path of travel of cam rollers 221$a$ and 221$b$ of transfer cylinder T2. Consequently, when cylinder T2 rotates, its grippers G4 and G5 are not actuated when they reach tangent point $t3$ between cylinders T2 and T3 but remain closed on the leading edge of the sheet until actuated later by cam 224 when the trailing edge of the sheet reaches tangent point $t3$.

Install perfector tumbler cam 400 on its bracket 403 on the inside of operating side frame 40 (see Figs. 31, 39). This cam actuates the tumbler shafts 310 and 311 on transfer cylinder T3 to tumble gripper finger shafts 350 and 351 inwardly and outwardly.

Remove half cam part 436$c$ and install half cam part 436$b$ (see Fig. 32) so that cam 436 now consists of half part 436$a$ and half part 436$b$. This cam is mounted on the inside of drive side frame 41 (see Fig. 31).

Jog a trial sheet through the press until the trailing edge is at tangent point $t2$ between cylinders T1 and T2. Loosen screws 243 in suction head brackets 241 (see Figs. 13, 19) to unlock the brackets from the shaft 200 so that the brackets may be rotated on the shaft together with the suction heads SB$a$ and SB$b$ as a unitary assembly. Rotate the assembly to a position where one of the sets of suction heads will engage the trailing end of the sheet. Tighten screws 243 to lock the suction head assembly in that position on shaft 200 of transfer cylinder T2, and turn on the suction pump for this unit. The suction pump is not shown in detail in the drawings as such means for producing a source of vacuum are, of course, well known.

Rotate the press until the trailing edge of the trial sheet is at tangent point $t3$ between cylinders T2 and T3. At this point the perfector grippers of cylinder T3 have grasped the trailing edge of the sheet. Adjust movable cam plate 224 along its trackway 226 so that cam face 224$f$ is engaged by cam rollers 221$a$ or 221$b$ to trip gripper finger shafts 207$a$ or 207$b$ to open and release grippers G4 or G5 from the leading edge of the sheet at the time the trailing edge of the sheet reaches tangent point $t3$ between cylinders T2 and T3. Cam 224 is locked in proper position on trackway 226 by screw bolts 224$x$ (see Fig. 17).

Assuming that the usual normal routine adjustments such as adjusting the feeder and registering mechanism and the form plates have been made, the press is now set up and ready to print as a perfecting unit and will operate as follows:

Sheets from a pile are fed to and printed on the obverse side in the first printing unit and delivered to the first transfer cylinder T1 and by it to the second transfer cylinder T2 in the same manner as when the press is set up for two-color printing which is described in the foregoing. Referring to the travel of a typical sheet S, its leading edge is delivered to transfer cylinder T2 at tangent point $t2$. Assuming grippers G5 of cylinder T2 receive the sheet, these grippers are opened just before they reach the tangent point and then close on the leading edge $a$ of the sheet and immediately thereafter grippers G3 on transfer cylinder T1 are opened to release the sheet. Grippers G5 are opened and then closed at this place by reason of actuation of cam lever 220 whose roller 221$b$ engages the cam face 222$f$ of fixed cam 222 on the drive side frame 41 of the press (see Figs. 13, 17). Grippers G3 on cylinder T1 are opened by reason of actuation of cam lever 114 whose roller 115 engages cam 116 on the drive side frame 41 (see Figs. 5, 6, 12).

Grippers G5 have been selected as carrying the sheet in this instance to conform with timing diagrams, Figs. 27 to 29. Grippers G5 remain closed on the leading edge $a$ of sheet S until the trailing edge $b$ of the sheet reaches tangent point $t3$ between cylinders T2 and T3. When trailing edge $b$ reaches this tangent point, perfector grippers G7 on transfer cylinder T3 grasp the trailing edge $b$ and immediately thereafter grippers G5 on cylinder T2 are opened to release the sheet. In the meantime suction heads SB$b$ have been traveling in contact with the trailing portions of the sheet in its travel on cylinder T2 from the time the trailing edge left tangent point $t2$ until it reaches tangent point $t3$. Suction is applied to the suction heads SB$b$ in their arc of travel from tangent point $t2$ to tangent point $t3$ through rotary valve 265 and when the trailing edge $b$ reaches tangent point $t3$ air under pressure is forced through heads SB$b$ through rotary valve 265 (see Figs. 15, 27 to 29). This air pressure quickly releases the vacuum in the suction heads and then blows against the trailing portion of the sheet S to aid in moving it away from cylinder T2 as it is being carried forward on to cylinder T3 by the perfector grippers G7 which are now closed on the trailing edge $b$ (now the leading edge $b$) of the sheet S. Meantime, grippers G4 on transfer cylinder T2 pick up the leading edge of the next sheet from cylinder T1. And they operate in the same fashion as grippers G5 except they follow by 180°. Grippers G5 released the leading edge *a* of the sheet when the trailing edge *b* reached tangent point *t*3 by reason of actuation of cam lever 220*b* whose roller 221*b* engages cam face 224*f* of cam 224. Perfector grippers G7 grasped the trailing edge *b* of the sheet at tangent point *t*3 by reason of actuation of cam lever 410 whose roller 412 is actuated by cam 414 in turn moved to its proper position by link 421 and cam lever 430 whose roller 433 engages cam 436 (see Figs. 48 to 57; see also Figs. 32 to 47).

Just prior to the time grippers G7 reach tangent point *t*3, two-color grippers G6 begin to tumble inwardly toward the center of cylinder T3. As cylinder T3 continues in its rotation, grippers G6 continue to tumble inwardly and immediately after perfector grippers G7 grasp the trailing edge *b* of the sheet at tangent point *t*3, they also begin to tumble inwardly. Both sets of grippers G6 and G7 continue to tumble inwardly by reason of the movement of segment gear arms 263 and 283 actuated by their cam and lever arrangement. Meantime the now leading edge *b* of the sheet is being drawn forward on cylinder T3.

Grippers G7 remain closed on the now leading edge *b* of the sheet until both sets of grippers G6 and G7 reach their innermost positions (see Fig. 52) whereupon grippers G6 close on the sheet and immediately thereafter grippers G7 open and release the sheet. Then grippers G6 begin their movement outwardly and continue to move out toward the periphery of cylinder T3. Then grippers G7 move outwardly, grippers G6 moving in advance of grippers G7.

Grippers G6 remain closed on the leading edge *b* until they reach tangent point *t*4 between transfer cylinder T3 and the second impression cylinder I2, these grippers G6 having by that time been returned to their normal position at the periphery of cylinder T3. When grippers G6 reach tangent point *t*4, grippers G8 on cylinder I2 close on the leading edge *b* of the sheet and immediately thereafter grippers G6 open to release the sheet. Grippers G8 are actuated by a cam and lever arrangement as described in connection with transfer cylinder T1. Grippers G6 are actuated at this point by reason of actuation of the cam lever arm 411, whose roller 413 engages cam 415 which is moved to proper position by link 421 connected to cam lever arm 430 whose roller engages cam 436 (see Figs. 56, 57).

Grippers G6 and G7 both are moved to their normal positions as cylinder T3 continues in its rotation and are ready to repeat the cycle on the next oncoming sheet from cylinder T2 carried by grippers G4.

The sheet S now has been turned over and as it is carried around on impression cylinder I2 the sheet is given an impression on the reverse side of the sheet by contact with the blanket on blanket cylinder 24. The sheet now printed on two sides is delivered by cylinder I2 to the delivery mechanism 32 in known manner.

As in the case of two-color printing, a sheet is fed to and a printed sheet is delivered for each revolution of the press when it is set up for perfector printing. And as in two-color printing, each complementary half of transfer cylinder T2 carries a sheet so that one set of grippers, for example, grippers G4, receive a sheet from cylinder T1 only on every other revolution of T1 while the other set of grippers G5 on cylinder T2 receive a sheet from T1 on the alternate revolutions.

*Press arrangement for more than two colors*

Although the foregoing description has, for illustrative purposes, dealt primarily with a two-color press (two printing units), it should be noted that the mechanism, provided and described in detail, for transferring sheets from the first printing unit to the second printing unit and adjustable for presenting either the obverse or reverse side of a sheet to receive the printed impression in the second printing unit, lends itself to combining, within practical limits, any number of consecutive printing units so that a sheet may be presented from any printing unit to the next succeeding printing unit so that either side of the sheet may receive the impression in that succeeding unit.

Such an arrangement is illustrated in Fig. 61 wherein is shown diagrammatically a press embodying the invention having four printing units, the first labeled "Yellow" for printing in yellow, the second labeled "Red," the third, "Blue," and the fourth, "Black," for printing those colors respectively. In this view (Fig. 61) the cylinders are labeled in a fashion corresponding to reference characters used in the foregoing description to indicate similar parts; it being noted that the first unit (Yellow) comprises pick-up cylinder P, impression cylinder I1, blanket cylinder B1, and form cylinder F1, the second printing unit (Red) comprises corresponding cylinders I2, B2 and F2. Transfer cylinders T1, T2 and T3 are interposed between the Yellow and Red printing units as described in the foregoing. The third (Blue) printing unit comprises cylinders I3, B3 and F3, and interposed between the Red and Blue printing units is the same arrangement of transfer cylinders as between the Yellow and Red units, namely, T1, T2, and T3. The fourth (Black) printing unit comprises cylinders I4, B4 and F4, and delivery mechanism D, and interposed between the Blue and Black printing units is a like arrangement of transfer cylinders, namely, T1, T2 and T3. From the foregoing it will be apparent that the transfer cylinders T2 and T3 between any two successive printing units may be set up for perfector printing or two-color printing independently of the set-up of the other transfer cylinders T2 and T3 so that a sheet may be printed on either or both sides, with some of the colors on each side or all colors on one side. With this brief description it is deemed that the diagrammatic illustration of Fig. 61 is self-explanatory and further detailed description is neither necessary nor desirable.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A sheet-fed rotary press which comprises a first printing unit for printing a first impression on a sheet, a second printing unit for printing a second impression on said sheet, a series of three cooperating transfer cylinders connecting said printing units, said transfer cylinders having cam operated grippers operative to carry a sheet printed on the obverse side in the first printing unit successively from said first to said second transfer cylinder and from said second to said third transfer cylinder and selectively to transfer said sheet from said first to said second printing unit with either the obverse side or the reverse side of the sheet presented to said second unit for printing a second impression on said sheet selectively either on the obverse or reverse side of said sheet, and suction heads mounted on said second transfer cylinder for rotation therewith and operative to maintain the trailing portion of a sheet in engagement with said second transfer cylinder while said sheet is being carried on said second transfer cylinder.

2. A sheet-fed rotary press which comprises a first printing unit including a rotatable impression cylinder on which a sheet is given an impression on the obverse side, a second printing unit including a rotatable impression cylinder on which said sheet is given another impression, rotatable transfer cylinders between said first and second printing units intergeared to rotate at the same peripheral speed and intergeared with said impression cylinders to rotate said impression cylinders at the same peripheral speed as said transfer cylinders, cam operated grippers on said transfer cylinders operative to carry a sheet which has been printed on the obverse side in the first printing unit and selectively to transfer said sheet from said first to said second printing unit with either the obverse side or the reverse side of said sheet presented to said impression cylinder of said second printing unit for giving a second impression to said sheet selectively either on the obverse or the reverse side of said sheet.

3. A sheet-fed rotary press which comprises a first printing unit including a rotatable impression cylinder on which a sheet is given an impression on the obverse side, a second printing unit including a rotatable impression cylinder on which said sheet is given another impression, a set of three successive rotatable transfer cylinders between said first and second printing units intergeared to rotate at the same peripheral speed and intergeared with said impression cylinders to rotate said impression cylinders at the same peripheral speed as said transfer cylinders, cam operated grippers on said transfer cylinders operative to carry a sheet printed on the obverse side in the first printing unit, operating means for the grippers and control means for the operating means whereby the operating means are operated selectively to transfer said sheet from said first to said second printing unit with either the obverse side or the reverse side of said sheet presented to said impression cylinder of said second printing unit for giving a second impression to said sheet selectively either on the obverse or the reverse side of said sheet, and means including suction heads on the second of said set of three transfer cylinders mounted to travel therewith at the same angular speed and operative to maintain the trailing portion of a sheet carried on said second transfer cylinder in engagement with said suction heads.

4. A sheet-fed rotary press which comprises a first printing unit including a rotatable impression cylinder on which a sheet is given an impression on the obverse side, a second printing unit including a rotatable impression cylinder on which said sheet is given another impression; rotatable first, second and third transfer cylinders between said first and second printing units intergeared to rotate at the same peripheral speed and intergeared with said impression cylinders to rotate said impression cylinders at the same peripheral speed as said transfer cylinders; cam operated grippers on said first transfer cylinder operative to carry a sheet printed on the obverse side in the first printing unit to said second transfer cylinder; cam operated grippers on said second transfer cylinder operative to cary said sheet a partial revolution on said second transfer cylinder; cam operated grippers on said third transfer cylinder, operating means for the last mentioned grippers and control means for the operating means whereby the operating means are operated selectively to transfer said sheet from said second transfer cylinder to said second printing unit with either the obverse side or the reverse side of said sheet presented to said impression cylinder of said second printing unit for giving a second impression to said sheet selectively either on the obverse or the reverse side of said sheet.

5. A sheet-fed rotary press which comprises a first printing unit including a rotatable impression cylinder on which a sheet is given an impression on the obverse side, a second printing unit including a rotatable impression cylinder on which said sheet is given another impression, rotatable first, second and third transfer cylinders between said first and second printing units intergeared to rotate at the same peripheral speed and intergeared with said impression cylinders to rotate said impression cylinders at the same peripheral speed as said transfer cylinders, cam operated grippers on said first transfer cylinder operative to carry a sheet printed on the obverse side in the first printing unit to said second transfer cylinder, cam operated grippers on said second transfer cylinder to carry said sheet a partial revolution on said second transfer cylinder, suction heads rotatable with said second transfer cylinder operative to hold the trailing portion of a sheet on said second transfer cylinder during said partial revolution, cam operated grippers on said third transfer cylinder, operating means for the last mentioned grippers and control means for the operating means whereby the operating means are operated selectively to transfer said sheet from said second transfer cylinder to said second printing unit with either the obverse side or the reverse side of said sheet presented to said impression cylinder of said second printing unit for giving a second impression to said sheet selectively either on the obverse or the reverse side of said sheet.

6. A sheet-fed rotary press which comprises a printing unit having an impression cylinder and means for printing a sheet on its impression cylinder, another printing unit having an impression cylinder and means for printing a sheet on its impression cylinder, transfer means connecting said printing units for selectively presenting a sheet which has been printed on said first-mentioned impression cylinder to said second-mentioned impression cylinder so that either the obverse side or the reverse side of said sheet is printed on said second-mentioned cylinder, said transfer means including a first transfer cylinder receiving the leading edge of said sheet from said first impression cylinder, a second transfer cylinder receiving the leading edge of said sheet from said first transfer cylinder, a third transfer cylinder receiving the sheet from said second transfer cylinder, said third transfer cylinder having gripper means thereon, operating means for the gripper means and control means for the operating means whereby the operating means are operated so that the gripper means selectively receive either the leading or trailing edge of the sheet delivered from said second transfer cylinder.

7. A sheet-fed rotary press which comprises a printing unit having an impression cylinder and means for printing a sheet on its impression cylinder, another printing unit having an impression cylinder and means for printing a sheet on its impression cylinder, transfer means connecting said printing units for selectively presenting a sheet which has been printed on said first-mentioned impression cylinder to said second-mentioned impression cylinder so that either the obverse side or the reverse side of said sheet is printed on said second-mentioned cylinder, said transfer means including a first transfer cylinder receiving the leading edge of said sheet from said first impression cylinder, a second transfer cylinder of greater diameter than said first transfer cylinder and receiving the leading edge of said sheet from said first transfer cylinder, valve controlled suction heads on said second transfer cylinder and positioned at its periphery for engaging the trailing portion of a sheet carried by said second transfer cylinder, a third transfer cylinder receiving the sheet from said second transfer cylinder, said third transfer cylinder having gripper means thereon, operating means for the gripper means and control means for the operating means whereby the operating means are operated so that the gripper means selectively receive either the leading or trailing edge of the sheet delivered from said second transfer cylinder.

8. In a sheet-fed rotary press; a transfer cylinder receiving sheets from a printing unit which prints on one side of a sheet, grippers on said transfer cylinder grasping the leading edge of said sheet delivered from said printing unit, another transfer cylinder receiving said sheet from said first mentioned cylinder and delivering said sheet to another transfer cylinder which delivers said sheet to another printing unit, gripper means on said last-mentioned cylinder being adjustable selectively to grasp the leading edge or the trailing edge of said sheet as it is delivered from said first-mentioned cylinder, said gripper means on said first-mentioned cylinder being operative to release the leading edge of said sheet when said selectively adjustable grippers are adjusted to grasp the leading edge of the sheet and to release the leading edge of said sheet when said selectively adjustable grippers are adjusted to grasp the trailing edge of said sheet.

9. Sheet transfer mechanism connecting two rotary printing units delivering sheets from the first of said printing units to the second of said printing units, which mechanism comprises first, second and third rotatable transfer cylinders arranged with their axes of rotation in parallel relation, and arranged with the periphery of the first transfer cylinder adjacent the periphery of the second cylinder at a tangent point and the periphery of the third transfer cylinder adjacent the periphery of the second transfer cylinder at a tangent point, said first transfer cylinder having grippers receiving the leading edge of a sheet delivered from the first of said printing units and delivering the leading edge of said sheet to said second transfer cylinder, grippers on said second transfer cylinder receiving the leading edge of said sheet at the tangent point between said first and second cylinders, grippers on said third transfer cylinder, operating means for the last mentioned grippers and control means for the operating means whereby the operating means are operated so that the last mentioned grippers selectively receive the leading edge or the trailing edge of said sheet at the tangent point between said second and third transfer cylinders.

10. Sheet transfer mechanism connecting two rotary printing units delivering sheets from the first of said printing units to the second of said printing units, which mechanism comprises first, second and third rotatable transfer cylinders arranged with their axes of rotation in parallel relation, and arranged with the periphery of the first transfer cylinder adjacent the periphery of the second cylinder at a tangent point and the periphery of the third transfer cylinder adjacent the periphery of the second transfer cylinder at a tangent point, said first transfer cylinder having grippers receiving the leading edge of a sheet delivered from the first of said printing units and delivering the leading edge of said sheet to said second transfer cylinder, grippers on said second transfer cylinder receiving the leading edge of said sheet at the tangent point between said first and second cylinders, suction heads on said second transfer cylinder operative to apply suction to the trailing portion of a sheet while being delivered by said second transfer cylinder from said first to said third transfer cylinder, grippers on said third transfer cylinder, operating means for the last mentioned grippers and control means for the operating means whereby the operating means are operated so that the last mentioned grippers selectively receive the leading edge or the trailing edge of said sheet at the tangent point between said second and third transfer cylinders.

11. Sheet transfer mechanism connecting two rotary printing units delivering sheets from the first of said printing units to the second of said printing units, which mechanism comprises first, second and third rotatable transfer cylinders arranged with their axes of rotation in parallel relation, and arranged with the periphery of the first transfer cylinder adjacent the periphery of the second cylinder at a tangent point and the periphery of the third transfer cylinder adjacent the periphery of the second transfer cylinder at a tangent point, said first transfer cylinder having grippers receiving the leading edge of a sheet delivered from the first of said printing units and delivering the leading edge of said sheet to said second transfer cylinder, two sets of grippers on said second transfer cylinder, one set being disposed 180° from the other set at the periphery of said second transfer cylinder, each of said sets of grippers being cam operated and receiving the leading edge of a sheet at the tangent point between said first and second cylinders, a set of suction heads for each of said sets of grippers mounted on and traveling with said second transfer cylinder having foraminous faces at the surface of the periphery of said second transfer cylinder, valve means connectible to a source of suction and a source of air pressure and operative to apply suction to said heads while they travel between said tangent point between said first and second transfer cylinders and said tangent point between said second and third transfer cylinders and to apply air force to said suction heads at said last-mentioned tangent point, and grippers on said third transfer cylinder operative selectively to receive the leading edge or the trailing edge of said sheet at said last-mentioned tangent point.

12. A sheet-fed rotary press comprising a plurality of printing units selectively adjustable for multi-color or perfector printing and mechanism connecting adjacent printing units and transferring a sheet printed on the obverse side in one of said units to its next following adjacent unit and adapted selectively to deliver said sheet for printing on the reverse side or on the obverse side of said sheet in said following unit, which mechanism comprises a series of transfer cylinders one of which carries a sheet after it is printed on the obverse side in one printing unit to a second cylinder of said series which delivers said sheet to a third cylinder of said series, said third cylinder of said series having mounted thereon a set of two-color grippers and a set of perfector grippers, gripper operating means operative selectively to cause said two-color grippers to grasp the leading edge of a sheet carried on the second of said series of cylinders when said press is adjusted for multi-color printing and to cause said perfector grippers to grasp the trailing edge of a sheet carried on the second of said series of cylinders when said press is adjusted for perfector printing, the third of said series of cylinders carrying said sheet to said following unit for printing on the obverse side when said press is adjusted for multi-color printing and for printing on the reverse side when said press is adjusted for perfector printing.

13. A sheet-fed rotary press comprising a plurality of printing units selectively adjustable for two-color or perfector printing, and mechanism connecting adjacent printing units and transferring a sheet printed on the obverse side in one of said units to its next following adjacent unit and adapted selectively to deliver said sheet for printing on the reverse side or on the obverse side of said sheet in said following unit, which mechanism comprises a series of transfer cylinders one of which carries a sheet after it is printed on the obverse side in one printing unit to a second cylinder of said series which delivers said sheet to a third cylinder of said series, valve controlled means including suction-blower heads on said second of said series of transfer cylinders providing suction and air force successively on the trailing portion of a sheet while said sheet is being carried thereon, said third cylinder of said series having mounted thereon a set of two-color grippers and a set of perfector grippers, gripper operating means operative selectively to cause said two-color grippers to grasp the leading edge of a sheet carried on the second of said series of cylinders when said press is adjusted for two-color printing and to cause said perfector grippers to grasp the trailing edge of a sheet carried on the second of said series of cylinders when said press is adjusted for perfector printing, the third of said series of cylinders carrying said sheet to said following unit for printing on the obverse side when said press is adjusted for two-color printing and for printing on the reverse side when said press is adjusted for perfector printing.

14. In a rotary sheet-fed press having a plurality of printing units, mechanism for transferring a sheet which has been printed on one of said printing units to its next adjacent printing unit which comprises a rotating cylinder which delivers the leading edge of said sheet from said first printing unit, a second rotating transfer cylinder, gripper means on said second cylinder which graps said leading edge and carry said sheet for a partial revolution of said second cylinder, a third cylinder receiving said sheet from said second cylinder, gripper means on said third cylinder which grasp the trailing edge of said sheet as it travels on said second cylinder, and means operative to actuate said gripper means on said second cylinder to release the leading edge of said sheet, and means to actuate said gripper means on said third cylinder simultaneously with the release of said leading edge causing the gripper means on said third cylinder to grasp said trailing edge, said third cylinder then carrying said trailing edge to said next adjacent printing unit.

15. In a rotary sheet-fed press having a plurality of printing units, mechanism for transferring a sheet which has been printed on one of said printing units to its next adjacent printing unit which comprises a first rotating transfer cylinder which delivers the leading edge of said sheet from said first printing unit, a second rotating transfer cylinder, gripper means on said second cylinder which grasp said leading edge and carry said sheet for a partial revolution of said second cylinder, a third rotating transfer cylinder receiving said sheet from said second cylinder, a first gripper means on said third cylinder which grasp the trailing edge of said sheet as it travels on said second cylinder, and means operative to actuate said gripper means on said second cylinder to release the leading edge of said sheet, and means to actuate said first gripper means on said third cylinder simultaneously with the release of said leading edge causing said first gripper means on said third cylinder to grasp said trailing edge, a second gripper means on said third transfer cylinder, means operative to actuate said first and second gripper means on said third transfer cylinder to transfer said trailing edge from said first to said second gripper means on said third transfer cylinder, and means operative to actuate said second gripper means to release said trailing edge for delivery to said next adjacent printing unit.

16. In a rotary sheet-fed press having a plurality of printing units, mechanism for transferring a sheet which has been printed on one of said printing units to its next adjacent printing unit which comprises a rotating cylinder which delivers the leading edge of said sheet from said first printing unit, a second rotating transfer cylinder, gripper means on said second cylinder which grasp the initial leading edge of said sheet and carry said sheet for a partial revolution of said second cylinder, valve controlled suction-blower means on said second transfer cylinder which hold the trailing portion of said sheet while being carried said partial revolution and blow it from said cylnder after being carried said partial revolution, a rotating third transfer cylinder receiving said sheet from said second transfer cylinder, a first gripper means on said third transfer cylinder which grasp the initial trailing edge of said sheet as it travels on said second transfer cylinder, means operative to actuate said gripper means on said second cylinder to release the initial leading edge of said sheet, cam operated means to actuate said first gripper means on said third cylinder simultaneously with the release of said initial leading edge and causing said first gripper means on said third cylinder to grasp said initial trailing edge, a second gripper means on said third transfer cylinder, means operative to cause said second gripper means to grasp said initial trailing edge and to cause said first gripper means to release said initial trailing edge whereby said initial trailing edge becomes the final leading edge, and cam operated means to cause said second gripper means to release said final leading edge for delivery to said next adjacent printing unit.

17. A sheet-fed rotary printing press which includes two printing units each of which includes an impression cylinder, means for printing a sheet on the impression cylinder of each of said units and transfer means to transfer a sheet after it is printed on the obverse side on the impression cylinder of the first unit to the impression cylinder of the second unit to be printed on the reverse side, said transfer means including a first rotating transfer cylinder having cam operated grippers thereon, a second rotating transfer cylinder having cam operated grippers thereon, a third rotating transfer cylinder in advance of the impression cylinder of the second unit rotating at the same peripheral speed as said first-mentioned transfer cylinder, said first and second transfer cylinders being mounted so that their peripheries adjoin each other at a first tangent point, said second and third transfer cylinders being mounted so that their peripheries adjoin each other at a second tangent point, means to actuate said grippers on said second transfer cylinder whereby said grippers on said second transfer cylinder grasp the leading edge of a sheet after it is printed on the reverse side in the first unit and delivered by said first transfer cylinder and carry said leading edge around the periphery of said second transfer cylinder beyond said second tangent point and release said leading edge when the trailing edge of said sheet reaches said second tangent point, a set of cam operated perfector grippers and a set of cam operated two-color grippers on said third transfer cylinder, and cam operated means operative upon rotation of said third transfer cylinder to cause said perfector grippers to grasp the trailing edge of said sheet at said second tangent point and thereafter to transfer it to said two-color grippers, and to cause said two-color grippers thereafter to carry said sheet and deliver it to said second unit for printing on the reverse side thereof on the impression cylinder of said second printing unit.

18. A sheet-fed rotary printing press which comprises a first printing unit which includes a first impression cylinder, means for printing a sheet on said first impression cylinder on the obverse side; a second printing unit which includes a second impression cylinder, transfer means to transfer a sheet after it is printed on the obverse side on the first impression cylinder to the second impression cylinder for printing on the reverse side of said sheet, said transfer means comprising a rotating first transfer cylinder, a rotating second transfer cylinder and a rotating third transfer cylinder in advance of the second impression cylinder all rotating at the same peripheral speed as said first impression cylinder, said first and second transfer cylinders being mounted so that their peripheries adjoin each other at a first tangent point, cam actuated grippers on said first transfer cylinder which grasp the leading edge of a sheet after it is printed on the obverse side on said first impression cylinder and which carry said leading edge around the periphery of said first transfer cylinder and release said leading edge at said first tangent point; said second and third transfer cylinders being mounted so that their peripheries adjoin each other at a second tangent point; cam actuated grippers on said second transfer cylinder which grasp the leading edge of said sheet at said first tangent point and carry said leading edge around the periphery of said second transfer cylinder beyond said second tangent point and release said leading edge when the trailing edge of said sheet reaches said second tangent point; a set of cam operated perfector grippers and a set of cam operated two-color grippers on said third transfer cylinder, and cam operated means operative upon rotation of said third transfer cylinder to cause said perfector grippers to grasp the trailing edge of said sheet at said second tangent point and thereafter to transfer it to said two-color grippers, and to cause said two-color grippers thereafter to carry said trailing edge of said sheet and deliver it to said second impression cylinder for printing on the reverse side of said sheet.

19. A sheet-fed rotary printing press which comprises a first printing unit which includes a first impression cylinder, means for printing a sheet on said first impression cylinder on the obverse side; a second printing unit which includes a second impression cylinder, transfer means to transfer a sheet after it is printed on the obverse side on the first impression cylinder to the second impression cylinder for printing on the reverse side of said sheet, said transfer means comprising a rotating first transfer cylinder, a rotating second transfer cylinder and a rotating third transfer cylinder in advance of the second impression cylinder all rotating at the same peripheral speed as said first impression cylinder, said first and second transfer cylinders being mounted so that their peripheries adjoin each other at a first tangent point, cam actuated grippers on said first transfer cylinder which grasp the leading edge of a sheet after it is printed on the obverse side on said first impression cylinder and which carry said leading edge around the periphery of said first transfer cylinder and release said leading edge at said first tangent point; said second and third transfer cylinders being mounted so that their peripheries adjoin each other at a second tangent point; cam actuated grippers on said second transfer cylinder which grasp the leading edge of said sheet at said first tangent point and carry said leading edge around the periphery of said second transfer cylinder beyond said second tangent point and release said leading edge when the trailing edge of said sheet reaches said second tangent point; valve controlled suction-blower heads on and mounted for rotation with second transfer cylinder for applying suction to the trailing portion of said sheet during its travel from said first and second tangent points and for applying air pressure against said sheet when its trailing edge passes said second tangent point; a set of cam operated perfector grippers and a set of cam operated two-color grippers on said third transfer cylinder, and cam operated means operative upon rotation of said third transfer cylinder to cause said perfector grippers to grasp the trailing edge of said sheet at said second tangent point and thereafter to transfer it to said two-color grippers, and to cause said two-color grippers thereafter to carry said trailing edge of said sheet and deliver it to said second impression cylinder for printing on the reverse side of said sheet.

20. A sheet-fed rotary printing press selectively adjustable for either two-color or perfector printing which comprises a first printing unit including an impression cylinder, a second printing unit including an impression cylinder rotating at the same peripheral speed as the impression cylinder of said first unit, a gang of transfer cylinders each rotating at the same peripheral speed as said impression cylinders and connecting said first and second units and adapted to receive a sheet printed on the obverse side in the first unit and by predetermined selective adjustment to transfer said sheet and present it for printing in the second unit on the same obverse side or on the reverse side, and means selectively adjustable to adjust said press for two-color or perfector printing, said gang of cylinders comprising first, second and third transfer cylinders, the peripheries of said first and second transfer cylinders being adjacent to each other at a first tangent point on the periphery of said second transfer cylinder and the peripheries of said second and third transfer cylinders being adjacent to each other at a second tangent point on the periphery of said second transfer cylinder, a set of cam operated grippers on said first transfer cylinder operative to grasp the leading edge of a sheet after it is printed on the obverse side in said first unit and to carry said leading edge to and release it at said first tangent point, a set of cam operated grippers on said second transfer cylinder operative to grasp said leading edge at said first tangent point when it is released by said grippers on said first transfer cylinder and in response to said adjustment, means selectively to carry said leading edge to and release it at said second tangent point when said adjusting means are adjusted for two-color printing and to carry said leading edge around the periphery of said second transfer cylinder and release it when the trailing edge of said sheet reaches said second tangent point when said adjusting means are adjusted for perfector printing, cam operated gripper means on said third transfer cylinder selectively operative to grasp the leading edge of said sheet at said second tangent point and carry it to said second unit when said adjusting means are adjusted for two-color printing and to grasp the trailing edge of said sheet at said second tangent point and carry it to said second unit when said adjusting means are adjusted for perfector printing.

21. A sheet-fed rotary printing press selectively adjustable for either two-color or perfector printing which comprises a first printing unit including an impression cylinder, a second printing unit including an impression cylinder rotating at the same peripheral speed as the impression cylinder of said first unit, a gang of transfer cylinders each rotating at the same peripheral speed as said impression cylinders and connecting said first and second units and adapted to receive a sheet printed on the obverse side in the first unit and by predetermined selective adjustment to transfer said sheet and present it for printing in the second unit on the same obverse side or on the reverse side, and means selectively adjustable to adjust said press for two-color or perfector printing, said gang of cylinders comprising first, second and third transfer cylinders, the peripheries of said first and second transfer cylinders being adjacent to each other at a first tangent point on the periphery of said second transfer cylinder and the peripheries of said second and third transfer cylinders being adjacent to each other at a second tangent point on the periphery of said second transfer cylinder, a set of cam operated grippers on said first transfer cylinder operative to grasp the leading edge of a sheet after it is printed on the obverse side in said first unit and to carry said leading edge to and release it at said first tangent point, a set of cam operated grippers on said second transfer cylinder operative to grasp said leading edge at said first tangent point when it is released by said grippers on said first transfer cylinder and in response to said adjustment, means selectively to carry said leading edge to and release it at said second tangent point when said adjusting means are adjusted for two-color printing and to carry said leading edge around the periphery of said second transfer cylinder and release it when the trailing edge of said sheet reaches said second tangent point when said adjusting means are adjusted for perfector printing, valve controlled suction-blower heads mounted on and rotatable with said second transfer cylinder for applying suction to the trailing portion of a sheet carried on said transfer cylinder from said first to said second tangent points and for applying air force against said trailing portion at said second tangent point when said adjusting means are adjusted for perfector printing, cam operated gripper means including a set of two-color grippers and a set of perfector grippers on said third transfer cylinder, said two-color grippers being selectively operative to grasp the leading edge of said sheet at said second tangent point and carry it to said second unit when said adjusting means are adjusted for two-color printing and said perfector grippers being selectively operative to grasp the trailing edge of said sheet at said second tangent point and to deliver said trailing edge to said two-color grippers for delivery of said trailing edge to said second unit when said adjusting means are adjusted for perfector printing.

22. In a multi-unit sheet-fed rotary printing press having a gang of interconnected transfer cylinders to carry a sheet from one printing unit to its next adjacent printing unit, a transfer cylinder in said gang of transfer cylinders which comprises, a rotatable main shaft, a plurality of sheet supporting disks fixed to said main shaft, a first gripper finger shaft mounted on said disks for rotation adjacent the periphery of said disks, a set of grippers fixed to said first gripper finger shaft which are opened and closed in response to rotation of said first gripper finger shaft, a second gripper finger shaft mounted on said disks for rotation adjacent the periphery of said disks and 180° from said first gripper finger shaft, a set of grippers fixed to said second gripper finger shaft which are opened and closed in response to rotation of said second gripper finger shaft, two sets of oppositely disposed suction heads, angularly adjustable brackets carrying said suction heads at the periphery of said disks and mounted on said main shaft, a rotary valve on said main shaft connectible to a source of suction and a source of air pressure, conduits connecting said rotary valve and suction heads, one of said sets of suction heads cooperating with one of said sets of grippers and the other of said sets of suction heads cooperating with the other of said sets of grippers.

23. In a sheet-fed rotary printing press having a transfer cylinder adapted selectively to pick up either the leading or trailing edge of a sheet from another cylinder on which said sheet is carried in its travel through the press, gripper means on said transfer cylinder which comprises dual sets of gripper fingers and dual sets of gripper pads against which said fingers open and close, one set of gripper fingers and pads operative to pick up the leading edge of said sheet from said other cylinder and the other set of gripper fingers and pads operative to pick up the trailing edge of said sheet from said other cylinder, a gripper finger shaft mounting one set of gripper fingers, a gripper shaft mounting said other set of gripper fingers, and means operative to rock said shafts and thereby cause said gripper fingers to open and close on their respective gripper pads.

24. In a sheet-fed rotary printing press having a plurality of printing units, a transfer cylinder mechanism adapted to turn over a sheet after it is printed on the obverse side in one unit so that said sheet is presented to the next following printing unit for printing in said following unit on the reverse side which comprises a rotatably mounted main shaft, spaced disks fixed to said shaft the peripheries of which provide a sheet supporting surface; a pair of tumbler shafts extending longitudinally along said main shaft, one of said tumbler shafts carrying a set of two-color gripper shaft brackets, the other of said tumbler shafts carrying a set of perfector gripper shaft brackets, a two-color gripper shaft mounted for rotation in said set of two-color gripper shaft brackets and a perfector gripper shaft mounted for rotation in said set of perfector gripper shaft brackets, a set of two-color grippers mounted on said two-color gripper shaft and a set of perfector grippers mounted on said perfector gripper shaft, a first pinion segment secured to said two-color tumbler shaft, a spring biased pivoted cam operated arm having a gear sector meshing with said first pinion segment and having a cam follower, a second pinion segment secured to said perfector tumbler shaft, a spring biased pivoted cam operated arm having a gear sector meshing with said second pinion segment and having a cam follower, a tumbler cam engaging said cam followers upon rotation of said transfer cylinder main shaft causing said tumbler shaft to tumble as it revolves about the axis of said main shaft, a cam on the two-color tumbler shaft, a cam lever on said two-color gripper shaft operated by said last-mentioned cam to rotate said two-color gripper shaft about its axis, a cam on said perfector tumbler shaft, a cam lever on said perfector gripper shaft operated by said last-mentioned cam to rotate said perfector gripper shaft on its axis, said mechanism being arranged so that said perfector grippers transfer a sheet delivered to said cylinder to said two-color grippers, during rotation of said cylinder.

25. In a rotary printing press, a first printing unit having an impression cylinder and means for printing a sheet on its impression cylinder; a second printing unit having an impression cylinder and means for printing said sheet on its impression cylinder; a first, second and third transfer cylinder connecting said first and second printing units, each of said cylinders having a main shaft; a drive gear fixedly mounted on said main shaft of said second transfer cylinder and a drive gear freely rotatable on said second transfer cylinder; a drive gear fixed to each of the other of said main shafts, the drive gears of the first printing unit being intergeared with one of said drive gears on said second transfer cylinder and the drive gears of the second printing unit being intergeared with the other of said drive gears on said second transfer cylinder; a rotatable drive shaft; means for driving said drive shaft; a pinion gear fixed to said drive shaft meshing with the freely rotatable drive gear on said second transfer cylinder; an angularly adjustable pinion gear on said drive shaft meshing with the fixedly mounted drive gear on said second transfer cylinder; and releasable locking means for locking said angularly adjustable pinion on said drive shaft in angularly adjusted position.

26. A printing press comprising a first printing unit for printing a first impression on a sheet, a second printing unit for printing a second impression on the sheet and transfer means for transferring the sheet from the first printing unit to the second printing unit, the transfer means including a first movable member adapted to carry the sheet and a second movable member adapted to take the sheet from the first movable member, the second movable member having gripping means and means operating the gripping means selectively to grip the leading edge of the sheet or the trailing edge of the sheet while the sheet is being carried by the first movable member and without deforming the sheet to advance the sheet toward the second printing unit with one side of the sheet positioned to be printed upon by the second printing unit when the leading edge of the sheet has been thus gripped and the other side of the sheet positioned to be printed upon by the second printing unit when the trailing edge of the sheet has been thus gripped.

27. Sheet handling apparatus comprising a first movable sheet carrying member, a second movable sheet carrying member, means for relatively moving the sheet carrying members, sheet holding means on the first sheet carrying member, sheet taking and holding means on the second sheet carrying member movable continuously as a whole in a path intersecting the path of movement of the trailing edge of a sheet held by the sheet holding means on the first sheet carrying member during relative movement of the sheet carrying members and means operating the sheet taking and holding means on the second sheet carrying member to take and hold by its trailing edge without deforming such edge the moving sheet held by the holding means on the first sheet carrying member when the sheet taking and holding means on the second sheet carrying member is in proximity to the trailing edge of the sheet.

28. Sheet handling apparatus comprising a first sheet carrying cylinder, a second sheet carrying cylinder, the cylinders being mounted in generally tangential relation, means for rotating the cylinders in opposite directions, sheet holding means on the first cylinder, sheet taking and holding means on the second cylinder movable continuously as a whole in a path intersecting the path of movement of the trailing edge of a sheet held by the sheet holding means on the first cylinder during relative rotation of the cylinders and means operating the sheet taking and holding means on the second cylinder to take and hold by its trailing edge without deforming such edge the moving sheet held by the holding means on the first cylinder when the sheet taking and holding means on the second cylinder is in proximity to the trailing edge of the sheet.

29. A method of handling a sheet comprising moving the sheet in a predetermined path, terminating such movement by taking the moving sheet by grippers adjacent its trailing edge, immediately transferring the sheet from said grippers to other grippers and by the second mentioned grippers moving the sheet away from said path with its originally trailing edge leading.

30. A method of handling a sheet comprising moving the sheet in a substantially cylindrical path, terminating such movement by taking the moving sheet by grippers adjacent its trailing edge, immediately transferring the sheet from said grippers to other grippers and by the second mentioned grippers moving the sheet away from said substantially cylindrical path with its originally trailing edge leading.

31. A method of printing comprising moving a sheet in a predetermined path, printing upon a face of the sheet during such movement, terminating such movement by taking the moving sheet by grippers adjacent its trailing edge, immediately transferring the sheet from said grippers to other grippers, by the second mentioned grippers moving the sheet away from said path with its originally trailing edge leading and printing upon the opposite face of the sheet during such movement.

32. A method of printing comprising moving a sheet in a substantially cylindrical path, printing upon a face of the sheet during such movement, terminating such movement by taking the moving sheet by grippers adjacent its trailing edge, immediately transferring the sheet from said grippers to other grippers, by the second mentioned grippers moving the sheet away from said substantially cylindrical path with its originally trailing edge leading and printing upon the opposite face of the sheet during such movement.

33. A method of handling a sheet comprising moving the sheet in a substantially cylindrical path, terminating such movement by gripping the moving sheet adjacent its trailing edge and moving the sheet into another substantially cylindrical path with its originally trailing edge leading and lying in said second mentioned path.

34. A method of printing comprising moving a sheet in a substantially cylindrical path, printing upon a face of the sheet during such movement, terminating such movement by gripping the moving sheet adjacent its trailing edge, moving the sheet in another substantially cylindrical path with its originally trailing edge leading and lying in said second mentioned path and printing upon the opposite face of the sheet during such movement.

References Cited in the file of this patent

UNITED STATES PATENTS

| | | |
|---|---|---|
| 666,325 | North | Jan. 22, 1901 |
| 742,247 | Spalckhaver | Oct. 27, 1903 |
| 1,895,080 | MacArthur | Jan. 24, 1933 |
| 1,949,001 | Albrecht | Feb. 27, 1934 |
| 2,071,191 | Whelan | Oct. 15, 1935 |
| 2,104,578 | Barber | Jan. 4, 1938 |
| 2,144,752 | Dudley | Jan. 24, 1939 |
| 2,220,283 | Ritzerfeld | Nov. 5, 1940 |
| 2,515,355 | Pritchard | July 18, 1950 |
| 2,629,323 | Baumgardner et al. | Feb. 24, 1953 |

FOREIGN PATENTS

| | | |
|---|---|---|
| 393,992 | Great Britain | June 19, 1933 |